US011647805B2

(12) United States Patent
Busbee

(10) Patent No.: US 11,647,805 B2
(45) Date of Patent: *May 16, 2023

(54) 3D PRINTED ARTICLES OF FOOTWEAR WITH SENSORS AND METHODS OF FORMING THE SAME

(71) Applicant: Kornit Digital Technologies Ltd., Rosh HaAyin (IL)

(72) Inventor: Travis Alexander Busbee, Somerville, MA (US)

(73) Assignee: Kornit Digital Technologies Ltd., Rosh HaAyin (IL)

( * ) Notice: Subject to any disclaimer, the term of this patent is extended or adjusted under 35 U.S.C. 154(b) by 21 days.

This patent is subject to a terminal disclaimer.

(21) Appl. No.: 17/188,490

(22) Filed: Mar. 1, 2021

(65) Prior Publication Data
US 2021/0321713 A1    Oct. 21, 2021

Related U.S. Application Data

(63) Continuation of application No. 15/907,137, filed on Feb. 27, 2018, now Pat. No. 10,932,515.
(Continued)

(51) Int. Cl.
*A43B 1/14* (2006.01)
*A43B 3/00* (2022.01)
(Continued)

(52) U.S. Cl.
CPC ................ *A43B 1/14* (2013.01); *A43B 3/34* (2022.01); *A43B 13/04* (2013.01); *A43B 17/003* (2013.01);
(Continued)

(58) Field of Classification Search
CPC ................ A61B 5/1036; A61B 5/1038; A61B 2562/0247; A61B 5/6807;
(Continued)

(56) References Cited

U.S. PATENT DOCUMENTS 3,053,454 A    9/1962 Waterfill
3,982,663 A    9/1976 Larkin
(Continued)

FOREIGN PATENT DOCUMENTS

CN    103371564    10/2013
CN    103909655    7/2014
(Continued)

OTHER PUBLICATIONS

International Preliminary Report on Patentability dated Sep. 6, 2019 From the International Bureau of WIPO Re. Application No. PCT/US2018/019993. (11 Pages).
(Continued)

*Primary Examiner* — Andre J Allen

(57) ABSTRACT

The present disclosure is related to three-dimensionally printed articles for use in footwear and associated systems and methods. In some embodiments, a three-dimensionally printed article may comprise a closed-cell foam. The closed-cell foam may have a gradient in and/or may be a single integrated material. In some embodiments, a three-dimensionally printed article may comprise a sensor. The use of such arrangements can, according to certain embodiments, allow for the production of improved articles of footwear and/or customized articles of footwear.

19 Claims, 19 Drawing Sheets

Related U.S. Application Data

(60) Provisional application No. 62/555,916, filed on Sep. 8, 2017, provisional application No. 62/555,904, filed on Sep. 8, 2017, provisional application No. 62/555,897, filed on Sep. 8, 2017, provisional application No. 62/464,364, filed on Feb. 27, 2017.

(51) Int. Cl.

| | | |
|---|---|---|
| *A43B 1/02* | (2022.01) | |
| *A43B 13/04* | (2006.01) | |
| *B33Y 70/00* | (2020.01) | |
| *B33Y 10/00* | (2015.01) | |
| *B33Y 30/00* | (2015.01) | |
| *B29D 35/12* | (2010.01) | |
| *A43D 1/00* | (2006.01) | |
| *B29D 35/00* | (2010.01) | |
| *A43D 999/00* | (2006.01) | |
| *A43B 3/34* | (2022.01) | |
| *B33Y 50/02* | (2015.01) | |
| *B29C 64/112* | (2017.01) | |
| *B29C 64/209* | (2017.01) | |
| *B29C 64/393* | (2017.01) | |
| *B29C 64/336* | (2017.01) | |
| *A43B 17/00* | (2006.01) | |
| *A43B 23/02* | (2006.01) | |
| *A43B 17/14* | (2006.01) | |
| *A43D 1/02* | (2006.01) | |
| *B33Y 80/00* | (2015.01) | |
| *B29K 75/00* | (2006.01) | |
| *B29K 105/04* | (2006.01) | |
| *B29L 31/50* | (2006.01) | |
| *A43B 5/00* | (2022.01) | |

(52) U.S. Cl.
CPC .......... *A43B 17/14* (2013.01); *A43B 23/0215* (2013.01); *A43D 1/00* (2013.01); *A43D 1/02* (2013.01); *A43D 999/00* (2013.01); *B29C 64/112* (2017.08); *B29C 64/209* (2017.08); *B29C 64/336* (2017.08); *B29C 64/393* (2017.08); *B29D 35/00* (2013.01); *B29D 35/12* (2013.01); *B33Y 10/00* (2014.12); *B33Y 30/00* (2014.12); *B33Y 50/02* (2014.12); *B33Y 70/00* (2014.12); *A43B 5/00* (2013.01); *A43D 2200/60* (2013.01); *B29K 2075/00* (2013.01); *B29K 2105/04* (2013.01); *B29K 2713/00* (2013.01); *B29L 2031/50* (2013.01); *B33Y 80/00* (2014.12)

(58) Field of Classification Search
CPC . A61B 2562/046; A61B 5/112; A61B 5/4528; A61B 5/6892; A61B 5/0816; A61B 5/447; A61B 5/0002; A61B 5/0205; A61B 5/103; A61B 5/11; A61B 5/1126; A61B 5/113; A61B 2560/0214; A61B 5/02055; A61B 5/024; A61B 5/4818; A61B 5/0031; A61B 5/076; A61B 5/1116; A61B 5/1118; A61B 2034/102; A61B 2090/064; A61B 2562/02; A61B 2562/0219; A61B 2562/166; A61B 5/02438; A61B 5/1071; A61B 5/1074; A61B 5/1112; A61B 5/1117; A61B 5/1121; A61B 5/1123; A61B 5/224; A61B 5/4504; A61B 5/4533; A61B 5/486; A61B 5/6811; A61B 5/6812; A61B 5/6829; A61B 5/7242; A61B 5/742; A61B 10/00; A61B 2017/564; A61B 2034/105; A61B 2034/2055; A61B 2090/3983; A61B 2503/04; A61B 2503/08; A61B 2503/10; A61B 2503/40; A61B 2505/00; A61B 2505/09; A61B 2560/0242; A61B 2560/0285; A61B 2560/0412; A61B 2560/0456; A61B 2560/0468; A61B 2560/0475; A61B 2562/0252; A61B 2562/0266; A61B 2562/0271; A61B 2562/0276; A61B 2562/12; A61B 34/10; A61B 34/20; A61B 5/0015; A61B 5/0022; A61B 5/0053; A61B 5/0064; A61B 5/015; A61B 5/021; A61B 5/02444; A61B 5/031; A61B 5/04; A61B 5/055; A61B 5/107; A61B 5/1076; A61B 5/1077; A61B 5/1102; A61B 5/1113; A61B 5/1114; A61B 5/1115; A61B 5/1122; A61B 5/1124; A61B 5/1127; A61B 5/14532; A61B 5/14542; A61B 5/22; A61B 5/4023; A61B 5/412; A61B 5/442; A61B 5/45; A61B 5/4519; A61B 5/4523; A61B 5/4824; A61B 5/4833; A61B 5/4842; A61B 5/4848; A61B 5/4851; A61B 5/4866; A61B 5/6803; A61B 5/6806; A61B 5/681; A61B 5/6831; A61B 5/6833; A61B 5/6843; A61B 5/6846; A61B 5/6887; A61B 5/6891; A61B 5/6893; A61B 5/6895; A61B 5/6898; A61B 5/721; A61B 5/7225; A61B 5/7246; A61B 5/7264; A61B 5/7275; A61B 5/7405; A61B 5/743; A61B 5/7455; A61B 6/03; A61B 6/0407; A61B 90/36; A61B 90/361; A43B 1/14; A43B 13/04; A43B 17/003; A43B 17/14; A43B 23/0215; A43B 3/34; A43B 5/00

USPC .......................................................... 73/172

See application file for complete search history.

(56) References Cited

U.S. PATENT DOCUMENTS

| | | | |
|---|---|---|---|
| 4,078,576 A | 3/1978 | Punch et al. | |
| 4,708,292 A | 11/1987 | Gammons | |
| 5,335,992 A | 8/1994 | Holl | |
| 5,385,953 A | 1/1995 | McClellan | |
| 5,820,354 A | 10/1998 | Wild et al. | |
| 5,979,787 A | 11/1999 | Scarpa | |
| 8,333,330 B2 | 12/2012 | Schuetze et al. | |
| 8,758,263 B1 | 6/2014 | Rahimian et al. | |
| 9,375,051 B2 | 6/2016 | Doremus et al. | |
| 9,421,565 B2 | 8/2016 | Lewis et al. | |
| 9,453,142 B2 | 9/2016 | Rolland et al. | |
| 9,491,987 B2 | 11/2016 | Antonelli et al. | |
| 9,788,600 B2 * | 10/2017 | Wawrousek | G06F 30/17 |
| 10,076,876 B2 | 9/2018 | Mark et al. | |
| 10,119,108 B2 | 11/2018 | Maggiore | |
| 10,254,499 B1 | 4/2019 | Cohen et al. | |
| 10,279,581 B2 * | 5/2019 | Ashcroft | A43B 5/02 |
| 10,327,700 B2 * | 6/2019 | Lee | A43B 3/34 |
| 10,442,910 B2 | 10/2019 | Baghdadi et al. | |
| 10,716,358 B2 | 7/2020 | Reinhardt et al. | |
| 10,806,208 B2 | 10/2020 | Buesgen et al. | |
| 10,932,515 B2 | 3/2021 | Busbee | |
| 2004/0126254 A1 | 7/2004 | Chen et al. | |
| 2004/0187714 A1 | 9/2004 | Napadensjy et al. | |
| 2006/0035034 A1 | 2/2006 | Matsumoto et al. | |
| 2006/0283044 A1 | 12/2006 | Lacey | |
| 2008/0026190 A1 | 1/2008 | King et al. | |
| 2008/0132597 A1 | 6/2008 | Nozawa et al. | |
| 2009/0143765 A1 | 6/2009 | Slocum et al. | |
| 2010/0140852 A1 | 6/2010 | Kritchman et al. | |

(56) References Cited

U.S. PATENT DOCUMENTS

| | | | |
|---|---|---|---|
| 2011/0189785 A1 | 8/2011 | Gutmann et al. | |
| 2011/0315291 A1 | 12/2011 | Abad et al. | |
| 2012/0023776 A1* | 2/2012 | Skaja | A43B 17/026 36/43 |
| 2012/0260527 A1 | 10/2012 | Noh | |
| 2013/0320598 A1 | 12/2013 | Atkins et al. | |
| 2014/0020191 A1 | 1/2014 | Jones et al. | |
| 2014/0020192 A1 | 1/2014 | Jones et al. | |
| 2014/0027952 A1 | 1/2014 | Fan et al. | |
| 2014/0137965 A1 | 5/2014 | Truitt et al. | |
| 2014/0182170 A1 | 7/2014 | Wawrousek et al. | |
| 2015/0230562 A1 | 8/2015 | Jones et al. | |
| 2015/0336298 A1 | 11/2015 | Dean | |
| 2015/0352787 A1 | 12/2015 | Humbert et al. | |
| 2016/0021969 A1 | 1/2016 | Lettow, II et al. | |
| 2016/0107396 A1 | 4/2016 | Berman | |
| 2016/0192741 A1 | 7/2016 | Mark | |
| 2016/0205963 A1 | 7/2016 | Saal et al. | |
| 2016/0219982 A1 | 8/2016 | Waatti | |
| 2016/0235158 A1 | 8/2016 | DesJardin et al. | |
| 2016/0299047 A1 | 10/2016 | Molla et al. | |
| 2016/0331082 A1 | 11/2016 | Weidl | |
| 2016/0374428 A1 | 12/2016 | Kormann et al. | |
| 2016/0374431 A1 | 12/2016 | Tow | |
| 2017/0050374 A1 | 2/2017 | Miinardi et al. | |
| 2017/0122322 A1 | 5/2017 | Zinniel et al. | |
| 2017/0164899 A1 | 6/2017 | Yang et al. | |
| 2017/0203406 A1 | 7/2017 | Ganapathiappan et al. | |
| 2017/0238870 A1 | 8/2017 | Lee et al. | |
| 2017/0251713 A1 | 9/2017 | Warner et al. | |
| 2017/0265582 A1 | 9/2017 | Walker et al. | |
| 2017/0319368 A1 | 11/2017 | Selner | |
| 2018/0029291 A1 | 2/2018 | Matzner et al. | |
| 2018/0133670 A1 | 5/2018 | Lewis et al. | |
| 2018/0353308 A1 | 12/2018 | Tompkins | |
| 2018/0369910 A1 | 12/2018 | Guenther et al. | |
| 2019/0037960 A1 | 2/2019 | Busbee | |
| 2019/0037961 A1 | 2/2019 | Busbee et al. | |
| 2019/0037969 A1 | 2/2019 | Busbee et al. | |
| 2019/0039299 A1 | 2/2019 | Busbee et al. | |
| 2019/0039309 A1 | 2/2019 | Busbee et al. | |
| 2019/0039310 A1 | 2/2019 | Busbee et al. | |
| 2019/0039311 A1 | 2/2019 | Busbee et al. | |
| 2019/0200703 A1 | 7/2019 | Mark | |
| 2019/0246741 A1 | 8/2019 | Busbee et al. | |
| 2019/0248089 A1 | 8/2019 | Busbee et al. | |
| 2019/0283394 A1 | 9/2019 | Ashcroft et al. | |
| 2019/0322884 A1 | 10/2019 | Bloomfield et al. | |
| 2019/0387839 A1 | 12/2019 | Dua et al. | |
| 2020/0181351 A1 | 6/2020 | Bailey et al. | |
| 2021/0037908 A1 | 2/2021 | Busbee | |
| 2021/0039306 A1 | 2/2021 | Busbee | |
| 2021/0039399 A1 | 2/2021 | Busbee | |
| 2021/0186151 A1 | 6/2021 | Gross | |
| 2021/0321713 A1 | 10/2021 | Busbee | |
| 2022/0000212 A1 | 1/2022 | Busbee | |

FOREIGN PATENT DOCUMENTS

| | | | |
|---|---|---|---|
| CN | 103909655 A | 7/2014 | |
| CN | 104191616 | 12/2014 | |
| CN | 104191616 A | 12/2014 | |
| CN | 104428126 | 3/2015 | |
| CN | 104786506 | 7/2015 | |
| CN | 104786506 A | 7/2015 | |
| CN | 104875389 | 9/2015 | |
| CN | 104875389 A | 9/2015 | |
| CN | 105073363 | 11/2015 | |
| CN | 105142450 | 12/2015 | |
| CN | 205058637 | 3/2016 | |
| CN | 205058637 U | 3/2016 | |
| CN | 205741716 | 11/2016 | |
| CN | 205741716 U | 11/2016 | |
| CN | 106331236 | 1/2017 | |
| CN | 106331236 A | 1/2017 | |
| CN | 110431000 | 11/2019 | |
| CN | 113271803 | 8/2021 | |
| EP | 3061545 | 8/2016 | |
| GB | 2508204 | 5/2014 | |
| WO | WO-2014100462 A1 * | 6/2014 | A43B 13/04 |
| WO | WO 2016/125170 | 8/2016 | |
| WO | WO-2016/170030 | 10/2016 | |
| WO | 2016/191329 A1 | 12/2016 | |
| WO | 2016/209872 A1 | 12/2016 | |
| WO | WO 2016/191329 | 12/2016 | |
| WO | WO 2016/209872 | 12/2016 | |
| WO | 2018/115874 A1 | 6/2018 | |
| WO | WO 2018/115874 | 6/2018 | |
| WO | WO 2018/144121 | 8/2018 | |
| WO | WO 2018/157146 | 8/2018 | |
| WO | WO 2022/047020 | 3/2022 | |

OTHER PUBLICATIONS

International Search Report and the Written Opinion dated Dec. 5, 2021 From the International Searching Authority Re. Application No. PCTIUS2021/047745. (24 Pages).

International Search Report and the Written Opinion dated Jul. 6, 2018 From the International Searching Authority Re. Application No. PCT/IL2018/020000. (15 Pages).

International Search Report and the Written Opinion dated Jun. 8, 2018 From the International Searching Authority Re. Application No. PCT/US2018/019993. (15 Pages).

International Search Report and the Written Opinion dated Jun. 8, 2018 From the International Searching Authority Re. Application No. PCTUS2018/01999. (13 Pages).

International Search Report and the Written Opinion dated Dec. 9, 2021 From the International Searching Authority Re. Application No. PCT/US2021/047738. (9 Pages).

Notice of Allowance dated Mar. 1, 2022 From the US Patent and Trademark Office Re. U.S. Appl. No. 17/003,118. (16 Pages).

Notice of Allowance dated Dec. 9, 2020 From the US Patent and Trademark Office Re. U.S. Appl. No. 15/907,137, (13 Pages).

Official Action dated Oct. 7, 2019 From the US Patent and Trademark Office Re. U.S. Appl. No. 15/907,147. (9 Pages).

Official Action dated Oct. 8, 2021 From the US Patent and Trademark Office Re. U.S. Appl. No. 17/003,118. (7 Pages).

Official Action dated Feb. 17, 2022 From the US Patent and Trademark Office Re. U.S. Appl. No. 15/907,147. (12 Pages).

Official Action dated May 18, 2020 From the US Patent and Trademark Office Re. U.S. Appl. No. 15/907,137. (9 Pages).

Official Action dated Jul. 24, 2020 From the US Patent and Trademark Office Re. U.S. Appl. No. 15/907,147. (7 Pages).

Official Action dated Apr. 29, 2021 From the US Patent and Trademark Office Re. U.S. Appl. No. 15/907,147. (7 Pages).

Restriction Official Action dated Feb. 14, 2020 From the US Patent and Trademark Office Re. U.S. Appl. No. 15/907,137. (7 Pages).

Supplementary European Search Report and the European Search Opinion dated Nov. 6, 2020 From the European Patent Office Re. Application No. 18757136.9. (10 Pages).

AirBoss Amtel Restructuring—Again, Rubber New: 4P.,Sep. 8, 2009.

Bauman "Surface-Modified Rubber Particles for Polyurethanes", Polymer Science and Technology Series book series (POLS, 1: 584-589, 1998.

Piszczyk el al. "Polyurethane/Ground Tire Rubber Composite Foams Based on Polyglycerol: Processing, Mechanical and Thermal Properties", Journal of Reinforced Plastics and Composites: 1-10, Apr. 2, 2015.

Sanjay "Effect of Crumb-Rubber Particle Size on Mechanical Response of Polyurethane Foam Composites", Oklahoma State University. ProQuest Dissertations Publishing, 1567387, 12P, 2014.

Shan et al. "Study of Flexible Polyurethane Foams Reinforced with Coir Fibres and Tyre Particles", International Journal of Applied Physics and Mathematics, 2(2):123-130, Mar. 2012.

(56) References Cited

OTHER PUBLICATIONS

Subramaniyan et al. "Mechanical Behavior of Polyurethane Composite Foams from Kenaf Fiber and Recycled Tire Rubber Particles", Applied Mechanics and Materials, 315: 861-866, Apr. 2013.
U.S. Appl. No. 15/907,122, filed Feb. 27, 2018, Busbee et al.
U.S. Appl. No. 15/907,128, filed Feb. 27, 2018, Busbee et al.
U.S. Appl. No. 15/907,160, filed Feb. 27, 2018, Busbee et al.
U.S. Appl. No. 15/907,147, filed Feb. 27, 2018, Busbee et al.
U.S. Appl. No. 15/907,085, filed Feb. 27, 2018, Busbee et al.
U.S. Appl. No. 15/907,100, filed Feb. 27, 2018, Busbee et al.
U.S. Appl. No. 17/003,089, filed Aug. 26, 2020, Busbee.
U.S. Appl. No. 17/003,106, filed Aug. 26, 2020, Busbee.
U.S. Appl. No. 17/003,118, filed Aug. 26, 2020, Busbee.
U.S. Appl. No. 17/320,094, filed May 13, 2021, Busbee.
PCT/US2018/019993, Jun. 8, 2018, International Search Report and Written Opinion.
Notification of Office Action and Search Report dated Jun. 16, 2022 From the State Intellectual Property Office of the People's Republic of China Re. Application No. 201880027271.2 and its Translation Into English. (29 Pages).
Official Action dated Apr. 3, 2020 From the US Patent and Trademark Office Re. U.S. Appl. No. 15/907,160. (28 Pages).
Official Action dated Jan. 25, 2021 From the US Patent and Trademark Office Re. U.S. Appl. No. 15/907,160. (29 Pages).
Official Action dated Aug. 27, 2021 From the US Patent and Trademark Office Re. U.S. Appl. No. 15/907,160. (12 Pages).
International Search Report and Written Opinion for PCT/US2018/019993 dated Jun. 8, 2018.
[No Author Listed], Amtel restructuring—again. Rubber News. Sep. 8, 2009. 4 pages.
Bauman, Surface-modified rubber particles for polyurethanes. Plastic Additives. Polymer Science and Technology Series. 1998;1:584-9.
Piszczyk et al., Polyurethane/ground tire rubber composite foams based on polyglycerol: Processing, mechanical and thermal properties. Journal of Reinforced Plastics and Composites. 2015;10 pages.
Sanjay, Effect of Crumb-Rubber Particle Size on Mechanical Response of Polyurethane Foam Composites. Oklahoma State University Masters Thesis. Jul. 2014. 55 pages.
Shan et al., Study of Flexible Polyurethane Foams Reinforced with Coir Fibres and Tyre Particles. International Journal of Applied Physics and Mathematics. 2012;2:123.
Subramaniyan et al., Mechanical Behavior of Polyurethane Composite Foams from Kenaf Fiber and Recycled Tire Rubber Particles. Applied Mechanics and Materials. 2013;315:861-6. Epub Apr. 10, 2013.
Cao et al. "Material Modem Design Theory and Method", Harbin Institute of Technology Press, p. 7, Apr. 30, 2002.
Notice of Allowance dated Jun. 17, 2022 from US Patent and Trademark Office Re. U.S. Appl. No. 17/003,118. (9 pages).
Notification of Office Action and Search Report dated Aug. 25, 2021 From the State Intellectual Property Office of the People's Republic of China Re. Application No. 201880027271.2 and its Translation of Office Action Into English. (52 Pages).
Decision of Rejection dated Nov. 18, 2022 From the State Intellectual Property Office of the People's Republic of China Re. 201880027271.2. (18 Pages).
International Preliminary Report on Patentability Mar. 9, 2023 From the International Bureau of WIPO Re. Application No. PCT US2021/047738. (6 Pages).

\* cited by examiner

3D PRINTED ARTICLES OF FOOTWEAR WITH SENSORS AND METHODS OF FORMING THE SAME

RELATED APPLICATIONS

This application is a continuation of U.S. application Ser. No. 15/907,137, filed Feb. 27, 2018, which claims priority under 35 U.S.C. § 119(e) to U.S. Provisional Application No. 62/464,364, filed Feb. 27, 2017, U.S. Provisional Application No. 62/555,897, filed Sep. 8, 2017, U.S. Provisional Application No. 62/555,904, filed Sep. 8, 2017, U.S. Provisional Application No. 62/555,916, filed Sep. 8, 2017, which are incorporated herein by reference in their entirety for all purposes.

FIELD

The present invention relates generally to three-dimensionally printed articles including sensors for use in footwear and associated systems and methods.

BACKGROUND

Footwear is typically mass produced from in large batches and with the use of complex supply chains. As a result, portions of a single article of footwear with different properties are typically formed from uniform components with standard sizes and properties which are adhered together or disposed on one another. This lowers the quality of the resultant footwear and makes its customization for specific users challenging. Accordingly, improved articles for use in footwear that allow greater integration and/or customization of different components and associated methods may be advantageous.

SUMMARY

The present invention generally relates to systems and methods involving three-dimensionally printed articles for use in footwear. The present subject matter of the present invention involves, in some cases, interrelated products, alternative solutions to a particular problem, and/or a plurality of different uses of one or more systems and/or articles.

In some embodiments, a 3D-printed article for use in footwear may comprise a plurality of sensors. In some embodiments, the sensors may be pressure sensors.

In some embodiments, a method for designing a personalized 3D-printed article for use in footwear may comprise acquiring information from a plurality of pressure sensors distributed within a first 3D-printed article. The method may also comprise printing a second 3D-printed article having a gradient in a property based on the information. In some embodiments, the property may be selected from the group consisting of average stiffness, average Shore A hardness, average pore size, and average density.

In one set of embodiments, 3D-printed articles for use in footwear are provided. The 3D-printed article may have a gradient in a property between a first portion and a second portion. In some embodiments, the property may be selected from the group consisting of average stiffness, average Shore A hardness, average pore size, and average density. In some embodiments, the 3D-printed closed-cell foam may be a single integrated material.

In another set of embodiments, methods are provided. A method may comprise 3D-printing an article having a gradient in a property between a first portion and a second portion. In some embodiments, the property may be selected from the group consisting of average stiffness, average Shore A hardness, average pore size, and average density. In some embodiments, the article foam may be a single integrated material.

Other advantages and novel features of the present invention will become apparent from the following detailed description of various non-limiting embodiments of the invention when considered in conjunction with the accompanying figures.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

Figure 1A:
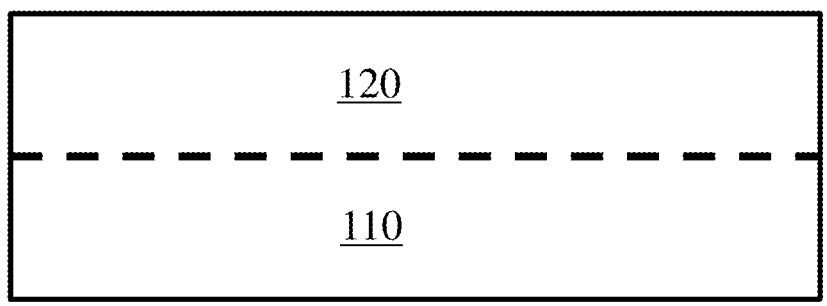
FIGS. 1A-1C illustrate 3D-printed articles according to certain embodiments of the invention.

DETAILED DESCRIPTION 3D-printed articles for use in footwear comprising a plurality of sensors and methods for designing personalized 3D-printed articles for use in footwear comprising acquiring information from a plurality of pressure sensors distributed within a 3D-printed article are generally provided. In some embodiments, a 3D-printed article comprising a plurality of sensors may be able to sense one or more conditions associated with a wearer of the 3D-printed article. Sensing information associated with a wearer of the 3D-printed article may allow the wearer of the 3D-printed article to learn valuable information about themselves, such as their health, their fitness, footwear designs that may be especially advantageous based on their biomechanics, and the like.

Inventive three-dimensionally printed (3D-printed) articles for use in footwear or other applications, and associated methods, are also generally described herein. In some embodiments, the 3D-printed article may comprise one or more features that are challenging or impossible to obtain in articles manufactured by other techniques. As an example, the 3D-printed article may be a single integrated material which comprises a gradient in one or more properties (e.g., average pore size, density, stiffness, stiffness of solid components of the article, Shore A hardness, degree of cross-linking, chemical composition, color, abrasion resistance, thermal conductivity, electrical conductivity, stiffness anisotropy, elastic modulus, flexural modulus, filler content, opacity, conductivity, breathability) between two or more portions of the material. This may be achieved using a 3D printing process by printing the 3D-printed article using an ink that can be dynamically changed as the article is printed (by, e.g., changing the ratios of different components that make up the ink, changing the temperature of the ink, and the like). In some embodiments, the 3D-printed article may have one or more features that are preferred by users of the 3D-printed article or footwear of which the 3D-printed article is one component. For example, the 3D-printed article may be a single integrated material and/or may lack seams, adhesives, and other features that are typically used to join two or more materials together. These and other 3D-printed articles may be more comfortable for users, and/or may be less subject to degradation or damage during normal usage of the article.

It should be understood that references herein to 3D-printed articles may encompass articles that include more than one layer (e.g., articles that comprise multiple layers printed on top of each other) and/or may encompass articles that include a single layer (e.g., articles in which a single layer of material has been printed). 3D-printed articles may encompass articles printed from 3D-printers and/or articles that extend macroscopically in three dimensions (e.g., with a minimal extent in each dimension of 50 microns, 100 microns, 200 microns, 500 microns, or 1 mm). Similarly, 3D-printing may encompass printing articles that include more than one layer and/or printing articles that include a single layer. 3D-printing may encompass printing articles on 3D-printers, printing articles extend macroscopically in three dimensions (e.g., with a minimal extent in each dimension of 50 microns, 100 microns, 200 microns, 500 microns, or 1 mm).

It should also be understood that articles other than 3D-printed articles and printing methods other than 3D-printing are also contemplated. For example, some embodiments relate to articles that have one or more of the features of the 3D-printed articles described herein (e.g., a gradient in one or more properties) but are not 3D-printed articles. Some articles may include both one or more 3D-printed components and one or more non-3D-printed components. Similarly, some embodiments relate to methods that have one or more features of the methods described herein (e.g., may comprise employing a multi-axis deposition system) but which do not include a 3D-printing step. Some methods may include both one or more 3D-printing steps and one or more non-3D-printing steps.

Certain methods (e.g., methods including exclusively 3D-printing steps, methods including exclusively non-3D printing steps, methods including both 3D-printing steps and non-3D-printing steps) comprise depositing one or more film(s) onto a 3D-surface. Some or all of the films, if more than one are deposited, may be thin film(s).

Certain methods (e.g., methods including exclusively 3D-printing steps, methods including exclusively non-3D printing steps, methods including both 3D-printing steps and non-3D-printing steps) comprise depositing a material that does not form a film on a substrate. For instance, a material may be deposited onto a substrate into which it infiltrates. As an example, a material may be deposited onto a porous substrate (e.g., a porous textile) and then infiltrate into at least a portion of the pores of the porous substrate. After it has been deposited onto the porous substrate, it may fill a portion of the pores of the porous substrate. The material may enhance the mechanical properties of the substrate. In some embodiments, a material deposited onto a substrate into which it infiltrates, such as a porous substrate, does not extend an appreciable distance (or at all) beyond the surface of the porous substrate.

In some embodiments, certain articles and/or methods described herein may include 3D-printed articles capable of sensing one or more properties of a user of the 3D-printed article, of an article of which the 3D-printed article forms one component, and/or of the 3D-printed article itself. Information sensed by the 3D-printed article may be used to recommend one or more properties of a second 3D-printed article for use in footwear and/or to may be used to provide a user of the 3D-printed article with information about themselves (e.g., health information, fitness information). Such methods and articles may allow individual users of footwear to learn about footwear designs that may be especially advantageous for them (e.g., footwear that is beneficial for a medical condition experienced by the user, footwear that is optimized for one or more sports engaged in by the user, footwear that has sufficient durability to undergo no or minimal damage during activities typically engaged in by the user, footwear that is inexpensive yet meets the needs of the user, etc.), which may enable a user to seek medical care and/or training guidance, and/or may allow the manufacture of customized 3D-printed articles of footwear that are advantageous for individual users.

In one set of embodiments, one or more methods for manufacturing 3D-printed articles as described herein may be advantageous in comparison to other methods for making articles for use in footwear. For example, a footwear manufacturer employing a method as described herein may be able to use fewer processes to create the article than would be employed in other comparable processes (e.g., the manufacturer may use a three-dimensional printer (3D printer) in a single process to make a component that would otherwise be made by a combination of several processes such as injection molding, lamination, and the like). This may allow for more rapid and/or more facile manufacturing. As another example, one or more of the methods described herein may not necessarily require the use equipment that is expensive to manufacture and whose cost is typically recovered only after repeated use (e.g., molds). Some of the methods described herein may instead employ a 3D printer to create articles whose design can be modified as desired with little or no added cost. In some embodiments, it may be economical for methods as described herein to create small batches of 3D-printed articles (e.g., batches of less than 100, less than 50, or less than 10). It is thus possible for manufacturers may employ some of the methods described herein to respond to changing market conditions, to create articles for use in footwear that are designed for individual users or groups of users, etc. In some embodiments, it may be advantageous to use one or more of the methods described herein to fabricate a 3D-printed article at the point of sale and/or to avoid long distance shipping.

A non-limiting example of a 3D-printed article for use in footwear is shown in FIG. 1A. In this figure, 3D-printed article 100 comprises first portion 110 and second portion 120. As used herein, a portion of an article may refer to any collection of points within the article (i.e., points that are within the portion of space bounded by the external surfaces of the article). Portions of the article are typically, but not always, volumes of space within the article (in some embodiments, a portion may be a surface within an article, a line within an article, or a point within an article). Portions of the article may be continuous (i.e., each point within the portion may be connected by a pathway that does not pass through any points external to the portion) or may be discontinuous (i.e., the portion may comprise at least one point that cannot be connected to at least one other point within the article by a pathway that does not pass through any points external to the portion). Portions of an article may be substantially homogeneous with respect to one or more properties (e.g., one or more properties of the portion may vary with a standard deviation of less than or equal to 1%, 2%, 5%, or 10% throughout the portion), and/or may be heterogeneous with respect to one or more properties (e.g., one or more properties of the portion may vary with a standard deviation of greater than or equal to 1%, 2%, 5%, or 10% throughout the portion).

Portions of an article may have any suitable size. In some embodiments, a portion may have a largest dimension and/or may comprise one or more features with a size of greater than or equal to 100 microns, greater than or equal to 200 microns, greater than or equal to 500 microns, greater than or equal to 1 mm, greater than or equal to 2 mm, greater than or equal to 5 mm, greater than or equal to 10 mm, greater than or equal to 20 mm, greater than or equal to 50 mm, greater than or equal to 1 cm, or greater than or equal to 2 cm. In some embodiments, a portion may have a largest dimension and/or may comprise one or more features with a size of less than or equal to 5 cm, less than or equal to 2 cm, less than or equal to 1 cm, less than or equal to 5 mm, less than or equal to 2 mm, less than or equal to 1 mm, less than or equal to 500 microns, or less than or equal to 200 microns. Combinations of the above-referenced ranges are also possible (e.g., greater than or equal to 100 microns and less than or equal to 5 cm). Other ranges are also possible.

In some embodiments, a 3D-printed article may comprise two or more portions, where one or more properties (e.g., average pore size, density, stiffness, stiffness of solid components of the article, Shore A hardness, degree of cross-linking, chemical composition, color, abrasion resistance, thermal conductivity, electrical conductivity, stiffness anisotropy, elastic modulus, flexural modulus, filler content, opacity, conductivity, breathability) of a first portion may differ from one or more properties of a second portion. The one or more properties may be structural properties (e.g., average pore size, density, surface roughness, filler content), chemical properties (e.g., average degree of cross-linking, chemical composition), mechanical properties (e.g., average stiffness, stiffness of solid components, Shore A hardness, abrasion resistance, stiffness anisotropy, elastic modulus, flexural modulus, strength, elongation at break, tensile elastic modulus, modulus at 100% strain), optical properties (e.g., color, opacity, reflectivity), and/or other properties (e.g., average thermal conductivity, electrical conductivity, conductivity, breathability, dimensional change upon heat activation). In some embodiments, the difference in properties between the first portion and the second portion may comprise a gradient of the one or more properties (e.g., the property or properties may vary relatively smoothly from a first value in the first portion to a second value in the second portion). In other embodiments, there may be a sharp change in one or more of the properties at a boundary of one or more of the first portion and the second portion.

It should be understood that while FIG. 1A shows the second portion positioned above the first portion, other arrangements of the first portion with respect to the second portion are also contemplated. For example, the first portion may be positioned beside the second portion, the first portion may surround the second portion, the first portion and the second portion may interpenetrate (e.g., a first portion may comprise a foam that interpenetrates with a second portion that comprises an elastomer), etc. It should also be noted that while FIG. 1A shows the second portion directly adjacent the first portion, this configuration should not be understood to be limiting. In some embodiments, the first portion may be separated from the second portion by one or more intervening portions positioned between the first portion and the second portion. As used herein, a portion that is positioned "between" two portions may be directly between the two portions such that no intervening portion is present, or an intervening portion may be present.

Similarly, while FIG. 1A only depicts two portions, it should also be understood that an article may comprise three portions, four portions, or more portions. In some embodiments, portions within a 3D-printed article as described herein may also further comprise sub-portions. Each portion and/or sub-portion may differ from each other (sub-)portion in at least one way (e.g., any two (sub-)portions may comprise at least one property that is different), or one or more (sub-)portions may be substantially similar to other (sub-)portion(s) of the 3D-printed article.

In some embodiments, two or more portions may be disposed relative to each other such that they may be connected by a pathway along which the 3D-printed article lacks an interface along which one or more properties (e.g., average pore size, density, stiffness, stiffness of solid components of the article, Shore A hardness, degree of cross-linking, chemical composition, color, abrasion resistance, thermal conductivity, electrical conductivity, stiffness anisotropy, elastic modulus, flexural modulus, filler content, opacity, conductivity, breathability) undergo step changes. In other words, the property or properties may vary smoothly along the pathway. The pathway may be a straight path pathway (e.g., it may be a line segment), or it may include one or more curves or corners (e.g., it may be a meander, as described more fully below). In some embodiments, the pathway may be a pathway along which material was deposited during formation of the 3D-printed article, such as a pathway travelled by a print head (or by a substrate with respect to the print head) during 3D-printing.

When two or more portions are connected by a pathway, the pathway may have any suitable length. In some embodiments, the pathway has a length of greater than or equal to 0.5 mm, greater than or equal to 1 mm, greater than or equal to 2 mm, greater than or equal to 5 mm, greater than or equal to 10 mm, greater than or equal to 20 mm, greater than or equal to 50 mm, greater than or equal to 100 mm, greater than or equal to 200 mm, greater than or equal to 500 mm, greater than or equal to 1 m, greater than or equal to 2 m, or greater than or equal to 5 m. In some embodiments, the pathway has a length of less than or equal to 10 m, less than or equal to 5 m, less than or equal to 2 m, less than or equal to 1 m, less than or equal to 500 mm, less than or equal to 200 mm, less than or equal to 100 mm, less than or equal to 50 mm, less than or equal to 20 mm, less than or equal to 10 mm, less than or equal to 5 mm, less than or equal to 2 mm, or less than or equal to 1 mm. Combinations of the above-referenced ranges are also possible (e.g., greater than or equal to 0.5 mm and less than or equal to 10 m, or greater than or equal to 0.5 mm and less than or equal to 50 mm). In some embodiments, the length of the pathway may have a certain relationship to the 3D-printed article (e.g., if the 3D-printed article is an article of footwear, the length of the pathway may be the length of the article of footwear). Other ranges are also possible.

When a first portion and a second portion are connected by a pathway, a property (e.g., average pore size, density, stiffness, stiffness of solid components of the article, Shore A hardness, degree of cross-linking, chemical composition, color, abrasion resistance, thermal conductivity, electrical conductivity, stiffness anisotropy, elastic modulus, flexural modulus, filler content, opacity, conductivity, breathability) may change along the pathway at a rate that is advantageous. The average rate of change of the property may be greater than or equal to 0.05% of the average of the property in the first portion per mm, greater than or equal to 0.1% of the average of the property in the first portion per mm, greater than or equal to 0.2% of the average of the property in the first portion per mm, greater than or equal to 0.5% of the average of the property in the first portion per mm, greater than or equal to 1% of the average of the property in the first portion per mm, or greater than or equal to 2% of the average of the property in the first portion per mm. The average rate of change of the property may be less than or equal to 5% of the average of the property in the first portion per mm, less than or equal to 2% of the average of the property in the first portion per mm, less than or equal to 1% of the average of the property in the first portion per mm, less than or equal to 0.5% of the average of the property in the first portion per mm, less than or equal to 0.2% of the average of the property in the first portion per mm, or less than or equal to 0.1% of the average of the property in the first portion per mm. Combinations of the above-referenced ranges are also possible (e.g., greater than or equal to 0.05% and less than or equal to 5%). Other ranges are also possible. It should be understood that the average rates of changed described above may apply to pathways that straight (e.g., pathways that are line segments), or to pathways that are curved.

In some embodiments, a first portion and a second portion as described herein may be components of a 3D-printed article that is a single integrated material. As used herein, two or more portions that together form a single integrated material are not separated by a separable interface. In some embodiments, a single integrated material may not separate into discrete parts during the course of normal use, and/or may be separated into discrete parts whose morphologies would not be predictable prior to normal use and/or along interfaces that would not be predictable prior to normal use. For instance, a single integrated material may lack seams and/or lack an adhesive that bonds two or more portions together. In some cases, the 3D-printed article as a whole may lack an interface at which one or more properties (e.g., average pore size, density, stiffness, stiffness of solid components of the article, Shore A hardness, degree of cross-linking, chemical composition, color, abrasion resistance, thermal conductivity, electrical conductivity, stiffness anisotropy, elastic modulus, flexural modulus, filler content, opacity, conductivity, breathability) undergo step changes as described above. In some cases, the property or properties may vary smoothly throughout the 3D-printed article.

In some embodiments, one or more portions may together form an 3D-printed article with one or more of the following features: macrovoids embedded within the article (e.g., a midsole) without an intersecting interface from overmolding, lamination, or ultrasonic welding; one or more open cell lattices; variations in density across geometries that would be challenging to form by molding; interpenetrating foams and elastomers that may, in some embodiments, not be separated by an interface due to molding or lamination; and/or one or more interfaces between different materials with extreme undercuts (e.g., materials with a negative draft angle, materials which cannot be injection molded using a single mold because they would be unable to slide out of the mold).

Figure 1B:
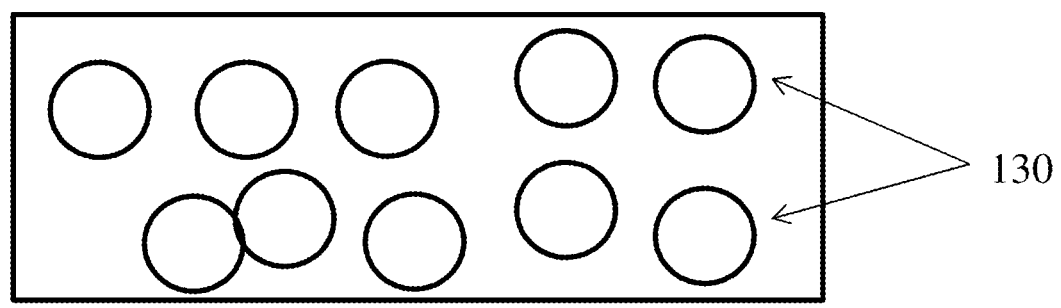

In some embodiments, a 3D-printed article (e.g., a 3D-printed article comprising two or more portions) may be a foam (e.g., a closed cell foam). For instance, FIG. 1B shows one non-limiting embodiment of a 3D-printed article 100 which is a foam comprising pores 130. The foam may be a material comprising a matrix and pores disposed within the matrix. Pores may be randomly distributed throughout the foam, or may be positioned at regular and/or pre-determined intervals. The material present within the pores of a foam is typically of a different phase than the material forming the matrix of the foam (e.g., a foam may comprise pores that comprise gas within a matrix that comprises a liquid and/or a solid). As would be understood to one of ordinary skill in the art, in a closed-cell foam, the cells of the foam are typically isolated or separated from each other. By contrast, in an open-cell foam, the cells of the foam are interconnected with each other; for example, they may be formed in an interconnected fashion, or the cells may be ruptured or become interconnected during or after formation of the foam. These conditions are typically more violent foaming conditions than those resulting in a closed-cell foam. The foam may be formed from a variety of polymers and gases. The gases may be introduced into the foam during formation (e.g., physically), and/or generated during formation (e.g., via chemical reaction). In addition, in some cases, a gas may be introduced by providing a liquid that forms a gas, e.g., upon a decrease in pressure or an increase in temperature. For instance, a liquid such as butane may be kept under pressure and/or cooled prior to introduction into the nozzle or the mixing chamber; a change in temperature and/or pressure may cause the liquid to form a gas. Without wishing to be bound by theory, closed cell foams and open cell foams may have different properties (e.g., closed cell foams may have different values of density, stiffness, Shore A hardness, and the like than otherwise equivalent open cell foams) and may be suitable for different applications. In some embodiments, closed cell foams may have properties that are better suited to footwear applications than open cell foams. In some embodiments, a 3D-printed article or a portion thereof may comprise an enclosed open cell foam, or an open cell foam surrounded by a layer of continuous material. In some cases, an enclosed open cell foam may be suitable for use as an air cushion, and/or may have tactile properties that may be varied by varying infill density.

It should also be understood that certain 3D-printed articles described herein may not be foams (i.e., they may not include any pores). For instance, certain embodiments may relate to 3D-printed articles that are not foams and that comprise one or more elastomers. In addition, in some cases, an article may be printed that can then be formed into a foam, e.g., using a chemical reaction to produce a gas within the article.

Figure 1C:
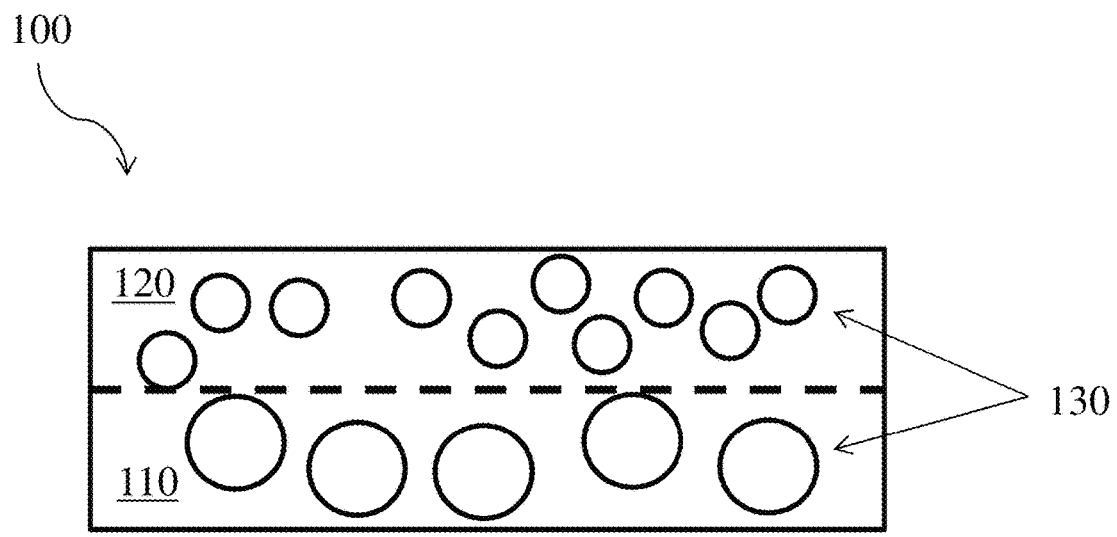

As shown in FIG. 1C, in some but not necessarily all embodiments, a 3D-printed article that is a foam (e.g., a closed-cell foam that is optionally a single integrated material) may comprise one or more portions having different properties. FIG. 1C shows 3D-printed article 100 comprising first portion 110, second portion 120, and pores 130. Although FIG. 1C depicts a 3D-printed article comprising an average pore (or cell) size in the first portion (i.e. a first average pore size) that is different from an average pore (or cell) size in the second portion (i.e., a second average pore size), in some embodiments the first portion and the second portion may have the same average pore size but may comprise differences in other properties (e.g., one or more of the density, stiffness, Shore A hardness, degree of cross-linking, chemical composition may be different in the first portion than in the second portion). Thus the pore sizes are presented here for illustrative portions only. Similarly, although FIG. 1C shows an average pore size in the first portion that is larger than the average pore size in the second portion, in some embodiments the average pore size of the first portion may be smaller than the average pore size of the second portion.

Figure 2:
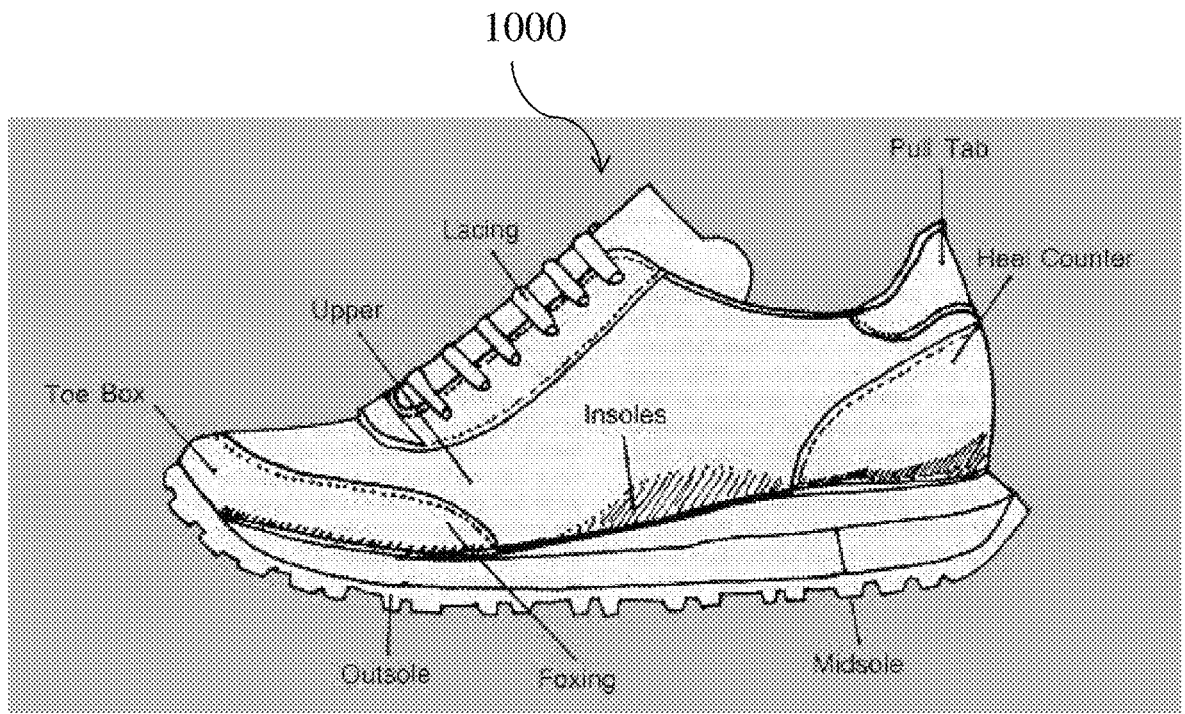
FIG. 2 illustrates an article of footwear according to certain embodiments of the invention.

In some embodiments, a 3D-printed article as designed herein may be suitable for use as a component of one or more articles of footwear. FIG. 2 shows one non-limiting embodiment of an article of footwear 100. The article of footwear comprises a sole, a toe box, an upper; lacing, a heel counter, and a pull tab. It should be understood that 3D-printed articles suitable for use in footwear may form any of the components or be a portion of any or all of the components shown in FIG. 2. In some embodiments, multiple 3D-printed articles may be positioned on a single article of footwear (e.g., a single article of footwear may comprise a 3D-printed article that is disposed on a sole or is a sole and a 3D-printed article that is disposed on an upper). In some embodiments, the 3D-printed article may be a sole or a sole component, such as an outsole, a midsole, or an insole. In some embodiments, the 3D-printed article may be an article that is printed onto a sole component, such as a midsole and/or insole that is printed onto an outsole (e.g., a commercially available outsole, an outsole produced by a non-3D printing process). In some embodiments, the 3D-printed article may be an upper. In some embodiments, the 3D-printed article may be an article that is printed onto an upper, such as a toe box, a heel counter, an ankle support, an eyestay, an article comprising a logo and/or embodying a logo, an eyelet, a quarter panel, a no sew overlay feature, and/or a pull tab. The upper may be one component of a fully assembled shoe which lacks the part(s) to be printed, or it may be an upper that has not been assembled with other footwear components. In some embodiments, a 3D-printed article may be a combination of two or more footwear components that are typically provided as separate articles. For example, the 3D-printed article may be able to serve as both a midsole and an insole, or may comprise a midsole and an insole that are a single integrated material. As another example, the 3D-printed article may be able to serve as both an outsole and an insole, or may comprise an outsole and an insole that are a single integrated material. In some embodiments, a 3D-printed article comprising two or more footwear components (e.g., a 3D-printed article comprising a midsole and an insole, a 3D-printed article comprising an outsole and an insole) may be printed using a single integrated process. Although FIG. 2 shows an athletic shoe, 3D-printed articles suitable for use in other types of footwear are also contemplated as described in further detail below. In some embodiments, the 3D-printed article may also or instead be suitable for one or more non-footwear components, such as orthotics and/or prosthetics.

Figure 3A:
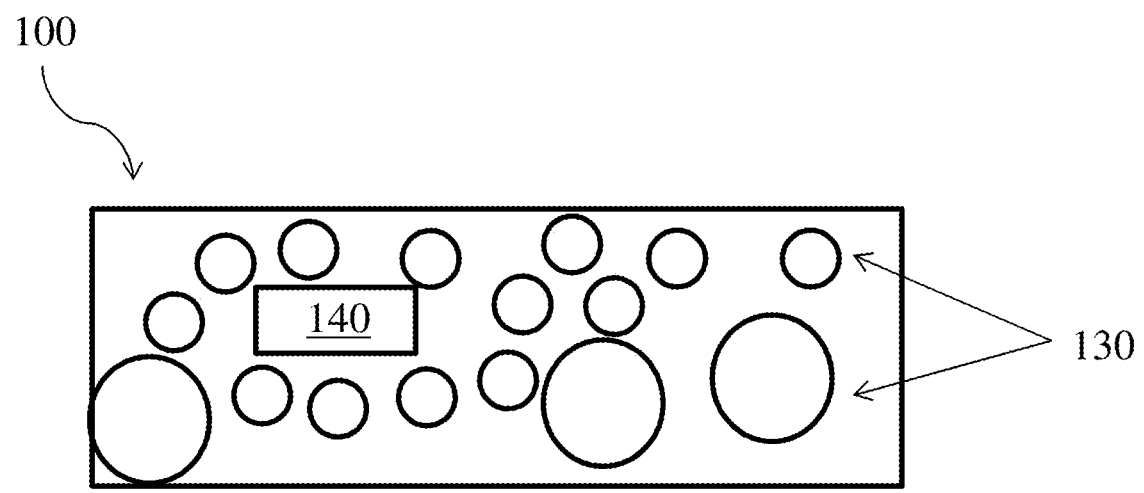
FIG. 3A illustrates a 3D-printed article comprising a sensor according to certain embodiments of the invention.

In some embodiments, a 3D-printed article (e.g., a foam that optionally is a closed-cell foam, is a single integrated material, and/or comprises two or more portions; an article that is not a foam; an article that comprises an elastomer, etc.) may comprise one sensor or may comprise a plurality of sensors. FIG. 3A shows one non-limiting embodiment where 3D-printed article 100 further comprises sensor 140. As described above, the sensor may be capable of sensing one or more properties of an article of footwear of which it is a component and/or of a user of an article of footwear of which it is a component. When present, the plurality of sensors may comprise sensors that are each identical to each other (e.g., the plurality of sensors may comprise identical sensors dispersed throughout the 3D-printed article) and/or may comprise different and/or complementary sensors (e.g., the plurality of sensors may comprise sensors that are capable of measuring different properties).

In some, but not necessarily all, embodiments, one or more properties of the 3D-printed article may vary with distance from one or more sensors. As an example, a 3D-printed article may comprise one portion adjacent a sensor or positioned near a sensor (e.g., positioned within 1 cm of the sensor) for which one or more properties are different than for a portion positioned further from the sensor (e.g., positioned at least 3 cm from the sensor). While FIG. 3A shows a 3D-printed article comprising pores with an average pore size varying with distance from the sensor, it should be understood that the 3D-printed article may not comprise pores (i.e., it may not be a foam) or that the average pore size may not vary with distance from the sensor, and/or one or more other properties (e.g., one or more of the density, stiffness, Shore A hardness, degree of cross-linking, chemical composition may be different in the first portion than in the second portion) may vary with distance from the sensor. For example, the 3D-printed article could have a first stiffness in a first portion adjacent the sensor that is different from a second stiffness in a second portion positioned further from the sensor. Without wishing to be bound by theory, a higher stiffness adjacent a sensor may prevent the sensor from undergoing significant strain, which may be beneficial for certain types of sensors. For other types of sensors, such as strain sensors, it may be beneficial for the sensor to undergo significant strain. Similarly, although FIG. 3A shows average pore size increasing with distance from the sensor, it is also possible for average pore size to decrease with distance from the sensor.

Figure 3B:
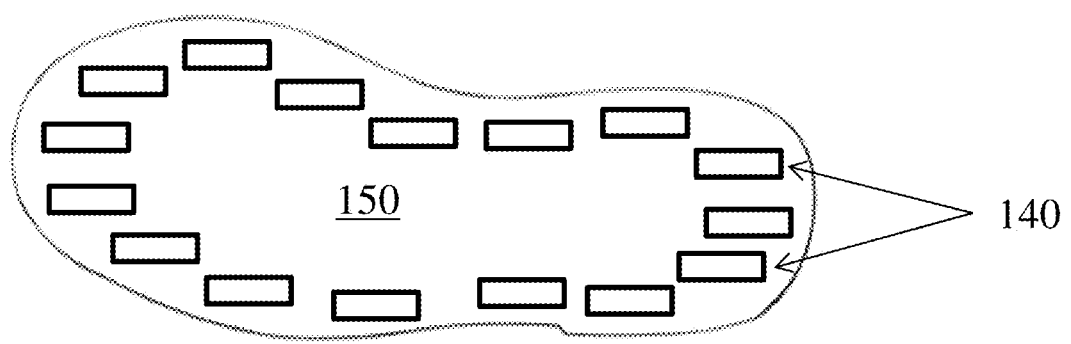
FIG. 3B illustrates a 3D-printed article comprising a plurality of sensors according to certain embodiments of the invention.

When present, the plurality of sensors may be disposed with respect to each other in any suitable manner. In some embodiments, it may be advantageous for certain sensors to be positioned in specific locations or in predetermined locations. For instance, as shown in FIG. 3B, in some embodiments it may be beneficial for sensors 140 to be positioned along the outer edge of sole 150. As another example, in some embodiments it may be advantageous for one or more sensors to be positioned in the heel of an article of footwear, in the arch of an article of footwear, on the bottom of a sole, or in any other location in an article of footwear. Without wishing to be bound by theory, sensors in different locations may be capable of sensing different properties and/or being useful for different applications. For example, pressure sensors positioned around the outer edge of a sole may be able to determine whether a user is pronating, where on their foot the user is placing the majority of their weight, whether the user is running and/or walking with good form, and/or the weight of the user. Such data may be useful in, e.g., fitness and athletic applications. As another example, one or more strain sensors positioned within an arch may be able to determine whether the arch is beginning to degrade. Data obtained from such sensors may be used to alert users that footwear replacement is recommended. As a third example, one or more sensors disposed on the bottom of a sole may be able to sense characteristics of the environment that the user is walking over (e.g., temperature, roughness, incline, and the like).

Non-limiting examples of suitable sensors include strain sensors, force sensors, position sensors, and capacitance sensors. In some embodiments, a single sensor may be capable of sensing two or more properties (e.g., a single sensor may be capable of sensing both velocity and acceleration, both position and force, and the like). In some embodiments, the plurality of sensors may be capable of sensing one or more properties as a function of time.

In some embodiments, the plurality of sensors may comprise one or more sensors (e.g., strain sensors) formed by a 3D-printing process as described herein. For example, a sensor may be formed by 3D-printing a conductive material, such as an ionic liquid and/or a material that comprises conductive particles. In some embodiments, the plurality of sensors may comprise one or more sensors that are stretchable (e.g., a sensor that can undergo an elastic strain of greater than or equal to 100%, 200%, 300%, 400%, or more).

Figure 4:
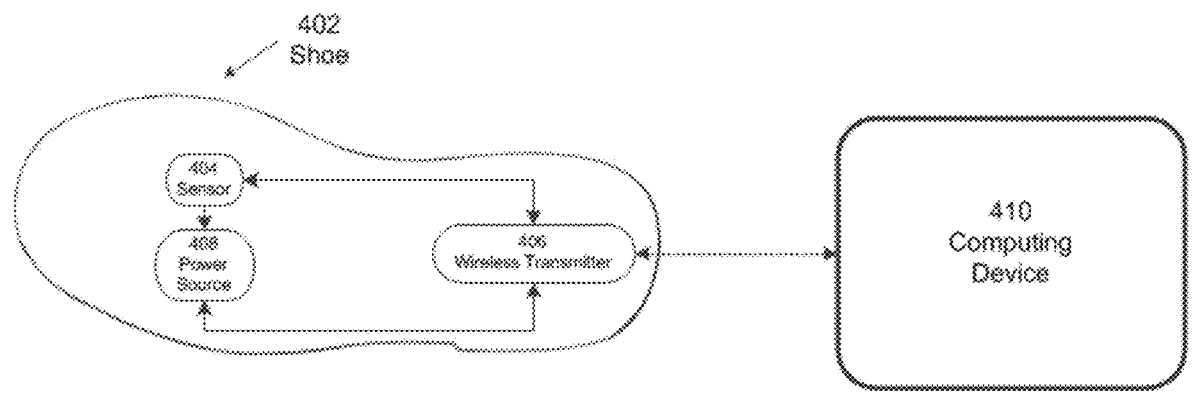
FIG. 4 illustrates a 3D-printed article in communication with a computing device according to certain embodiments of the invention.

As described above, certain inventive articles and methods relate to 3D-printed articles (e.g., 3D-printed articles for use in footwear) which comprise a plurality of electronic devices (e.g., sensors) which are capable of transmitting information to a computing device. These articles and methods may relate to electronic devices. For example, one or more sensors may be integrated into the shoe and information from the sensors may be transmitted to a computing device over a wireless communication link. An example of such a shoe in communication with a computing device is shown in FIG. 4 by article of footwear 402. As shown, article of footwear 402 comprises a sensor 404, a wireless transmitter 406, and a power source 408. The wireless transmitter 406 may be configured to establish a wireless communication link with a computing device 410 comprising a display 412 and a transducer 414.

The wireless transmitter 406 may receive sensor information from the sensor 404 indicative of the particular parameter sensed by the sensor 404 and communicate the received sensor information to the computing device 410 over a wireless communication link. For example, the wireless transmitter 406 may be implemented as a BLUETOOTH transmitter and establish a BLUETOOTH wireless communication link with the computing device 410.

The power source 408 may provide power to the wireless transmitter 406. The power source 408 may comprise an energy storage device, such as a battery, to store energy and provide the stored energy to the wireless transmitter 406. Additionally (or alternatively), the power source 408 may comprise an energy harvester device that are configured to capture energy from environmental sources, such as sunlight, temperature changes, and movement. The energy generated by the energy harvester device may be employed to charger an energy storage device and/or directly power the wireless transmitter 406. Example energy harvesting devices include photovoltaic devices, piezoelectric devices, and thermoelectric devices.

The computing device 410 may receive sensor information from the wireless transmitter 406 and interpret the received sensor information. This process will be described in further detail below in relation to FIG. 6.

Figure 5:
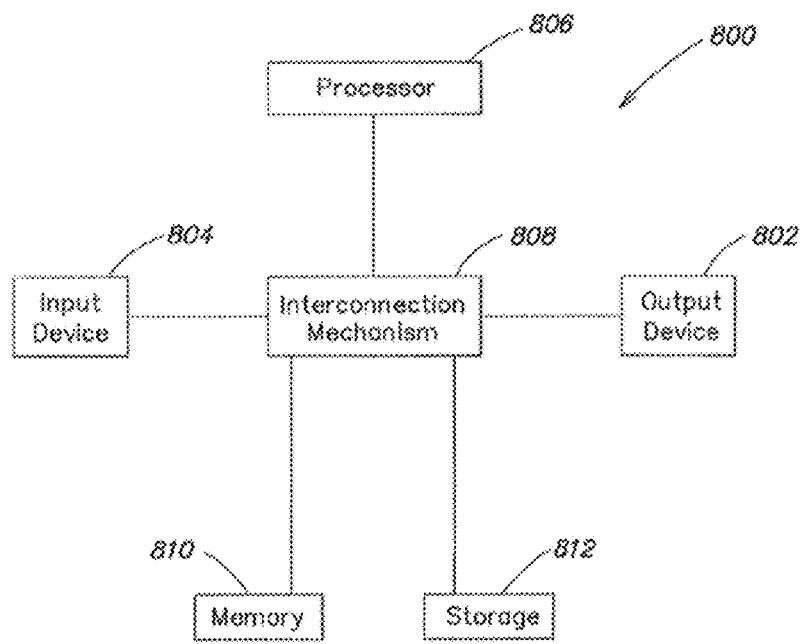
FIG. 5 illustrates an implementation of a computing device according to certain embodiments of the invention.

The computing device 410 may be implemented in any of a variety of ways. For example, the computing device 410 may be implemented as a tablet, a mobile phone, a laptop, a desktop, or a server. An example implementation of the computing device 410 is shown in FIG. 5 by computer system 500. As shown in FIG. 5, the computer system 500 includes a processor 506 connected to a memory device 510 and a storage device 512. The processor 506 may manipulate data within the memory 510 and copy the data to storage 512 after processing is completed. The memory 510 may be used for storing programs and data during operation of the computer system 500. Storage 512 may include a computer readable and writeable nonvolatile recording medium in which computer executable instructions are stored that define a program to be executed by the processor 506. According to one embodiment, storage 512 comprises a non-transient storage medium (e.g., a non-transitory computer readable medium) on which computer executable instructions are retained.

Components of computer system 500 can be coupled by an interconnection mechanism 508, which may include one or more busses (e.g., between components that are integrated within a same machine) and/or a network (e.g., between components that reside on separate discrete machines). The interconnection mechanism enables communications (e.g., data, instructions) to be exchanged between system components of system 500. The computer system 500 may also include one or more input/output (I/O) devices 502 and 504, for example, a keyboard, mouse, trackball, microphone, touch screen, a printing device, display screen, speaker, wireless communication components, etc. to facilitate communication with other systems and/or a user.

The computer system 500 may include specially-programmed, special-purpose hardware, for example, an application-specific integrated circuit (ASIC). Aspects of the present disclosure can be implemented in software, hardware or firmware, or any combination thereof. Although computer system 500 is shown by way of example, as one type of computer system upon which various aspects of the present disclosure can be practiced, it should be appreciated that aspects of the present disclosure are not limited to being implemented on the computer system as shown in FIG. 5. Various aspects of the present disclosure can be practiced on one or more computers having a different architectures or components than that shown in FIG. 5.

Various embodiments described above can be implemented using an object-oriented programming language, such as Java, C++, Ada, or C# (C-Sharp). Other programming languages may also be used. Alternatively, functional, scripting, and/or logical programming languages can be used. Various aspects of the present disclosure can be implemented in a non-programmed environment (e.g., documents created in HTML, XML or other format that, when viewed in a window of a browser program, render aspects of a graphical-user interface (GUI) or perform other functions). The system libraries of the programming languages are incorporated herein by reference. Various aspects of the present disclosure can be implemented as programmed or non-programmed elements, or any combination thereof.

Figure 6:
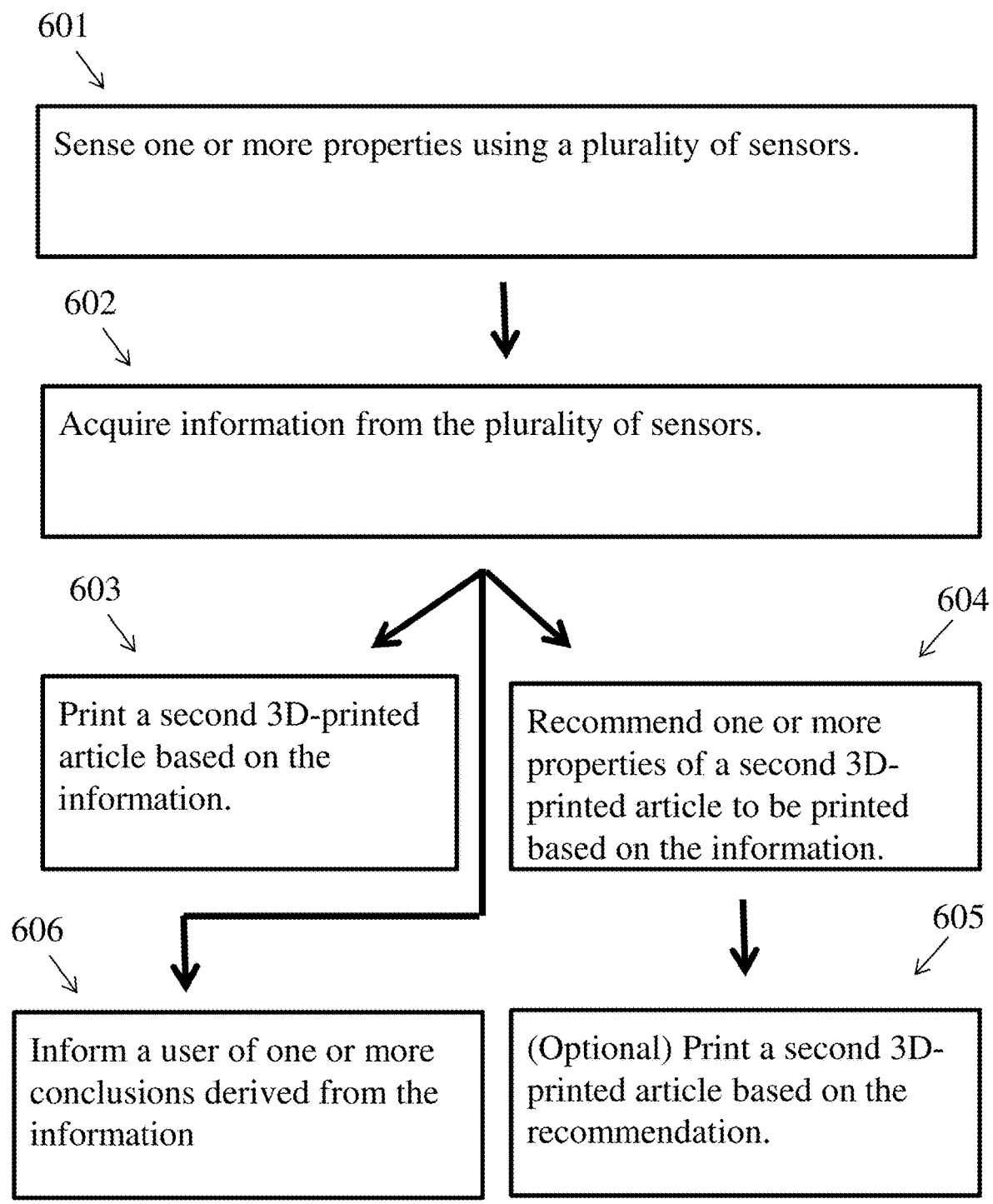
FIG. 6 is a flow chart illustrating a method according to certain embodiments of the invention.

As described above, in certain embodiments a computing device may receive and/or process information obtained from a plurality of sensors. FIG. 6 shows one non-limiting example of a process that could be employed. As shown therein, the process may comprise a first step 601 of sensing one or more properties using the plurality of sensors. Next, as in step 602, information may be acquired from the sensors by, for example, receiving data transmitted from the plurality of sensors. Then, the information gathered in step 602 may be used in one or more ways. For instance, as in step 603, the information may be used to print a second 3D-printed article. As another example, as in step 604, the information may be used to generate a recommendation for one or more properties of a second 3D-printed article. Step 604 may optionally be followed by step 605, in which a second 3D-printed article is formed based on the recommendation generated in step 604. As a third example, shown as step 606, the computing device may alert a user of one or more conclusions derived from information acquired from the plurality of sensors. The information may be related to the health and/or fitness of the user (e.g., weight, distance traveled, running form), related to an article of footwear of which the 3D-printed article forms one part (e.g., whether or not the article of footwear has worn out), and/or related to a recommendation for footwear designs or footwear component designs that may be suitable for the user (e.g., designs for insoles). It should be understood that methods for fabricating 3D-printed articles informed by data gathered from one or more sensors may possibly additional steps not shown in FIG. 6 and/or may not comprise one or more steps shown in FIG. 6. In some embodiments, information used as described herein may be obtained from several different 3D-printed articles worn by a single user at different times. For instance, a user may test 3D-printed articles with different designs (e.g., insoles with different designs) which each are capable of transmitting data to a computing device.

For the methods described above, it should be appreciated that a second 3D-printed article if printed or recommended may be the same type of article as the first article (e.g., both the first article and the second article may be midsoles), or the second 3D-printed article may be a different type of article than the first article (e.g., the second 3D-printed article may be a sole and the first 3D-printed article may be an insole, the second 3D-printed article may be a midsole and the first 3D-printed article may be an insole). In some embodiments, the second 3D-printed article may be the same type of article as the first 3D-printed article, but may be an employed in a different type of footwear than the first 3D-printed article (e.g., the second 3D-printed article may be an insole for a dress shoe and the first 3D-printed article may be an insole for an athletic shoe). In some embodiments, it may be possible to 3D print identical or substantially similar articles for use in different types of footwear (e.g., identical or substantially similar insoles may be printed for dress shoes, sandals, athletic shoes, etc.).

As described above, certain articles as described herein may be formed by a process involving one or more 3D-printing steps. In some embodiments, an article may be formed by a process involving both one or more 3D-printing steps and one or more non-3D-printing steps. For example, an article may be formed by a first 3D-printing step followed by a first non-3D-printing step which is optionally followed by one or more further 3D-printing steps or non-3D-printing steps. For example, a sole or sole component may be 3D-printed into a mold to form a first portion and then a material may be injection molded or compression molded above the first portion to form the second portion. Third, fourth, fifth, and/or higher numbered portions may then optionally be formed on the second portion (by, e.g., 3D-printing). As another example, a non-3D printing step may comprise directly bonding two materials by pressing a first material (e.g., a non-3D-printed material, an upper) into a second 3D-printed material (e.g., a 3D-printed midsole) prior to full curing of the second material. As a third example, an inkjet finishing process may be applied to deposit one or more materials (e.g., one more pigments) on a 3D-printed article or on a material disposed on a 3D-printed article (e.g., a material injection molded or compression molded on a 3D-printed article). In some embodiments, an inkjet finishing process may enhance the surface quality of the article that is subject to it.

A variety of suitable inkjet processes may be combined with 3D-printing processes described herein. In some embodiments, an inkjet process may be employed to deposit one or more layers of material onto a 3D-printed article. For instance, two or more layers may be deposited consecutively to increase the thickness of a surface finishing layer and/or to form a 3D structure on the surface of the 3D-printed article. The layer(s), or other structure(s) formed by an inkjet process, may comprise one or more translucent portions (e.g., may be translucent) and/or may comprise one or more non-translucent portions (e.g., may be non-translucent). The layer(s) or other structure(s) may cover one or more portions of the 3D-printed article (e.g., may cover one or more portions of the 3D-printed article and not cover one or more portions of the 3D-printed article) or may cover the entirety of the 3D-printed article. The layer(s) or structure(s) may have a variety of surface properties. In certain embodiments, the layer(s) or other structure(s) may increase the surface roughness of the article, cause the article to have a matte finish, and/or reduce the reflectivity of the article (e.g., reduce the reflectivity of its surface).

Figure 7A:
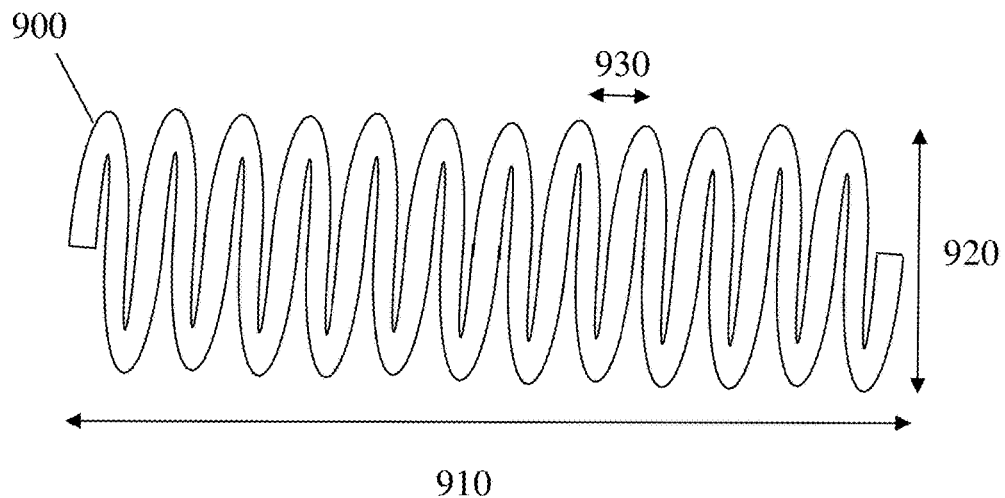
FIGS. 7A and 7B are schematic illustrations of meanders, according to some embodiments of the invention.
Figure 7B:
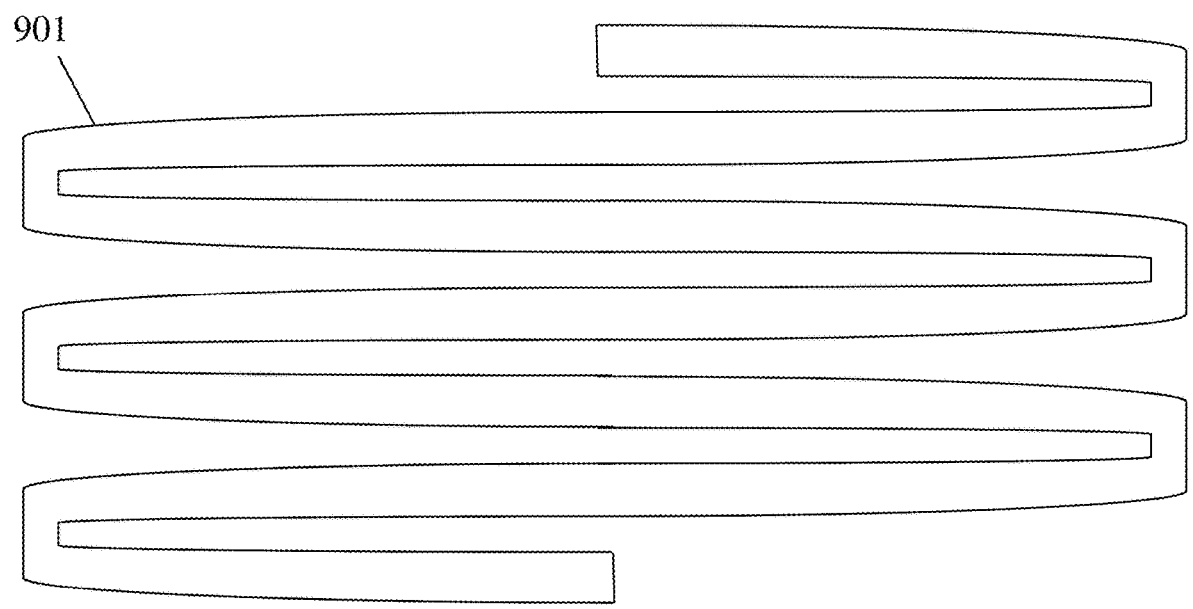

As will be described in further detail below, in 3D-printed articles may be formed by depositing a material from a nozzle onto a substrate. The nozzle may be translated with respect to the substrate (and/or the substrate translated with respect to the nozzle) during this process. In certain cases, the nozzle and/or substrate may be translated such that the deposited material meanders (i.e., forms a meander on the substrate). Meanders typically have a length, width, and repeat period. FIG. 7A shows one non-limiting example of a meander 900, with length 910, width 920, and repeat period 930. The meander may have other relative proportions of length, width, and repeat period. For example, FIG. 7B shows a meander 901 with a relatively larger width and smaller length than meander 900. It should be noted that meanders may have different shapes than those shown in FIGS. 7A and 7B (e.g., they may have repeat periods along two or more distinct axes). In some cases material may be deposited in meanders that do not have a repeat period, or have a repeat period including some irregularities. For example, the meander may be a meander where the width and/or repeat period changes (e.g., with position, such as along the length of the meander), the meander may be an irregular curve, etc. If the width and/or repeat period of the meander changes, it may do so monotonically or may increase in some portions of the meander and decrease in other portions of the meander.

Figure 8A:
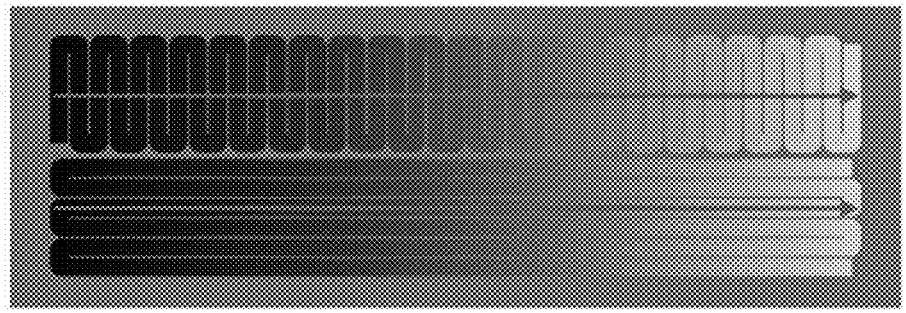
FIG. 8A is a schematic illustration of meanders parallel and perpendicular to gradients, according to some embodiments of the invention.
Figure 8B:
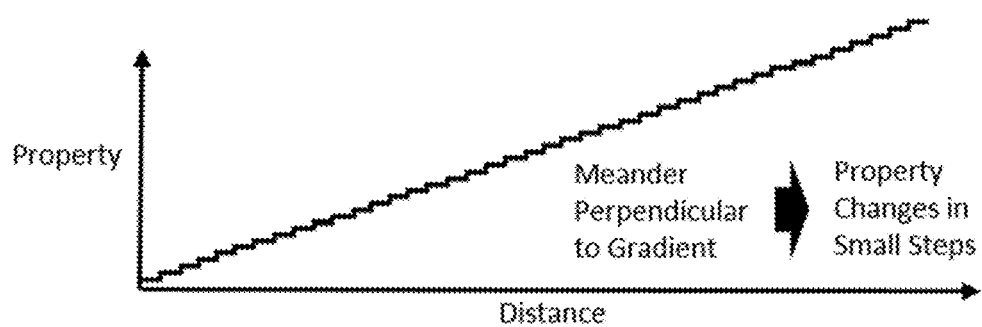
FIG. 8B is a plot showing a stepped gradient, according to some embodiments of the invention.
Figure 8C:
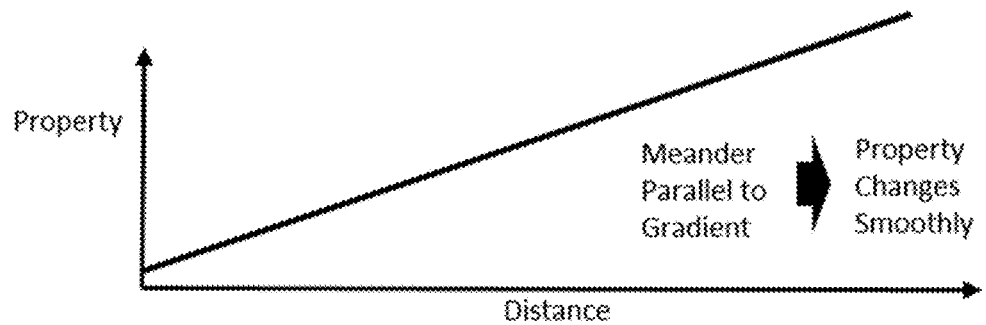
FIG. 8C is a plot showing a smooth gradient, according to some embodiments of the invention.

In some cases, one or more properties of the material being deposited by the nozzle may change as a function of time and/or position, which may result in changes in one or more properties of the 3D-printed article as a function of printing time and/or position. As one example, a gradient in a property (e.g., average pore size, density, stiffness, stiffness of solid components of the article, Shore A hardness, degree of cross-linking, chemical composition, color, abrasion resistance, thermal conductivity, electrical conductivity, stiffness anisotropy, elastic modulus, flexural modulus, filler content, opacity, conductivity, breathability, etc.) may be generated by varying one or more properties of the material being deposited by the nozzle. In some cases, a material may be deposited on a substrate in a meander (which may be regular or irregular) and a gradient may be formed along the meander or perpendicular to the meander. FIG. 8A shows a non-limiting schematic depiction of a gradient that is parallel to a meander and a non-limiting schematic depiction of a gradient that is perpendicular to a meander. FIG. 8B shows a non-limiting example of the change in the value of a property as a function of distance along the gradient when the gradient is formed perpendicular to the meander. Gradients of this type are stepped gradients, or gradients encompassing step changes. FIG. 8C shows a non-limiting example of the change in the value of a property as a function of distance along the gradient when the gradient is formed parallel to the meander. Gradients of this type are smooth gradients, or gradients that lack step changes. The rate of change of the gradient, in a smooth gradient, may be constant (i.e., a linear gradient), or the rate of change may result in a non-linear smooth gradient. It should be understood that both smooth and stepped gradients are encompassed by the use of the term gradient, and that gradients referenced herein, if not otherwise specified, should be understood to include smooth gradients in some embodiments and stepped gradients in other embodiments. In addition, some gradients may comprise one or more smooth portions and one or more stepped portions.

In certain embodiments, an article (e.g., a portion, an article of footwear, a component of an article of footwear) as described herein may be produced on a multi-axis deposition system, and/or a method as described herein may include at least one step (e.g., a 3D-printing step, a non 3D-printing step) that is performed on a multi-axis deposition system. It should be understood that articles of apparel (e.g., an article of apparel such as a sports bra, a component of an article of apparel such as a sports bra) may also be produced on a multi-axis deposition system as described herein. In general, and as described further below, multi-axis deposition systems include a print head and a substrate. The print head may be any suitable print head configured to deposit a material onto the substrate. The substrate may be any suitable substrate onto which a material may be deposited; in some embodiments, one or more articles (e.g., a component of an article of footwear, an upper, a sock liner) may be disposed on the substrate. In certain embodiments, one or both of the print head and substrate may be translated along one or more axes and/or rotated around one or more axes. Translation and/or rotation of the print head and/or substrate may enable the position of the print head with respect to the substrate to be changed prior to, during, and/or after a printing process. In some cases, translation and/or rotation of the print head and/or the substrate may allow the print head to deposit material onto a wide variety of substrate surfaces and/or allow the print head to deposit material onto the substrate at a wide variety of angles. In some embodiments, the print head may be configured to be rotated and/or translated such that it can deposit material onto each surface of the substrate.

Figure 9:
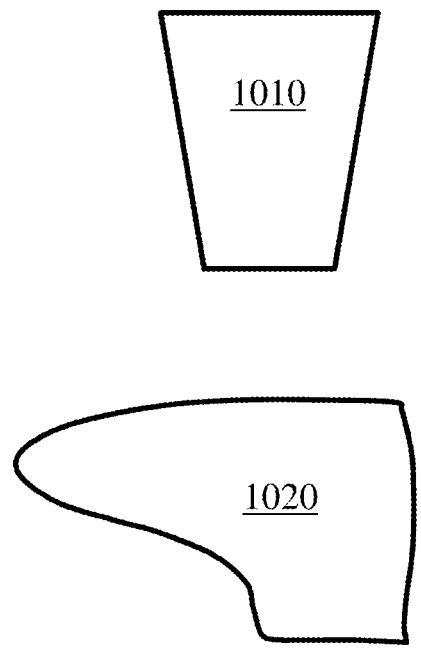
FIG. 9 is a schematic depiction of a print head and a substrate, according to certain embodiments of the invention.

FIG. 9 shows one non-limiting embodiment of a multi-axis deposition system 1000 comprising print head 1010 and substrate 1020. The print head, substrate, and multi-axis deposition system will be described in further detail below.

A print head in a multi-axis deposition system may be any suitable print head configured to deposit a material of interest onto the substrate. In some embodiments a multi-axis deposition system may comprise two or more print heads. Non-limiting examples of suitable print heads include a direct write head, a mixing nozzle as described further below, an ink jet head, a spray valve, an aerosol jet print head, a laser cutting head, a hot air gun, a hot knife, an ultrasonic knife, a sanding head, a polishing head, a UV curing device, an engraver, an embosser, and the like. In some embodiments, it may be advantageous for the multi-axis deposition system to comprise a first print head that comprises a mixing nozzle and a second print head that does not comprise a mixing nozzle. As also described below, in some embodiments, the print head may be configured to accept one or more material inputs (e.g., one material input, two material inputs, etc.). When two or more material inputs are present, the inputs may be substantially the same or they may differ. In some embodiments, the print head may be configured to mix two or more reactive material inputs to form a reactive mixture that may be deposited onto a substrate while the first and second material inputs are reacting and/or after the first and second material inputs have reacted. For example, the print head may be configured to mix a polyol and an isocyanate to form a reactive polyurethane mixture. Other examples of suitable reactive mixtures include reactive polyurea mixtures, reactive mixtures comprising reactive polyurethane and reactive polyurea blends (e.g., polyurethane/polyurea hybrid formulations), reactive mixtures comprising epoxy groups and amine groups, and reactive silicone mixtures.

A substrate in a multi-axis deposition system may be any suitable substrate capable of receiving the material deposited by the print head. In some cases, the substrate may have a shape that enables facile deposition of the material of interest in a morphology of interest by the print head. As an example, the substrate may have a shape that substantially corresponds to the morphology of interest, such as a footwear last for footwear applications (e.g., as shown in FIG. 9). In other embodiments, the substrate may have a shape that substantially corresponds to a morphology of interest for an article of apparel (e.g., a bra cup for sports bra applications and/or for bra lining applications, an article substantially corresponding to the shape of a knee for knee brace applications, an article substantially corresponding to the shape of an ankle for ankle brace applications, an article substantially corresponding to the shape of a wrist for wrist brace applications, an article substantially corresponding to the shape of a shoulder for shoulder brace applications, and/or an article substantially corresponding to the shape of an arm for arm band applications). As another example, the substrate may be a mold or a portion of a mold. As a third example, the substrate may comprise a portion that is curved, and/or the substrate as a whole may be curved. For instance, the substrate may have a spherical shape, or a hemispherical shape. As a fourth example, the substrate may comprise two or more surfaces that are joined at facets. In some such cases, the substrate may be a platonic solid or may comprise a portion that is a platonic solid. In some embodiments, the substrate may be substantially flat. Other types of substrates are also possible.

In some embodiments, a multi-axis deposition system may comprise a substrate that is removable. The substrate may be configured to be positioned in the multi-axis deposition system during material deposition and removed after material deposition. In some embodiments, a multi-axis deposition system may comprise multiple substrates that may be added to the multi-axis deposition system prior to material deposition and/or removed from the multi-axis deposition system after material deposition. Each substrate may have a different shape (e.g., a different shoe size, a different cup size, a mold for a different type of apparel), or two or more substrates may have substantially the same shape.

As described above, one or more articles may be disposed on the substrate prior to material deposition and/or during material deposition using the a multi-axis deposition system. The article(s) disposed on the substrate may be configured to be positioned on the substrate during material deposition and, optionally, removed from the substrate after material deposition. In some embodiments, a multi-axis deposition system may be configured to deposit material onto a multiple articles successively, each of which may be added to the multi-axis deposition system prior to material deposition and/or removed from the multi-axis deposition system after material deposition. For example, a textile (e.g., a non-flat textile, an upper, a woven textile, a knit textile) may be disposed on the substrate prior to material deposition, during material deposition, and/or after material deposition. In some embodiments, a multi-axis deposition system may be employed to deposit a reactive mixture as described above onto a textile to form a 3D-printed material on the textile and/or on a succession of textiles sequentially added to the substrate.

It should be noted that the print head(s) and the substrate in a multi-axis deposition system comprising both a print head and a substrate may be oriented with respect to each other in other ways than that shown in FIG. 9. As an example, the a print head may be disposed over the center of the substrate in some embodiments and over the edge of the substrate in other embodiments. As another example, the a print head may be oriented so that it deposits material on the substrate at a 90° angle to the substrate in some embodiments and so that it deposits material on the substrate at another angle to the substrate (e.g., 45°, 30°, or other angles) in other embodiments. As a third example, the substrate may present a bottom surface (e.g., a portion of a last on which a sole would be disposed) to the a print head in some embodiments and may present a side or top surface (e.g., a portion of a last on which an upper would be disposed) in other embodiments. In some cases, the print head(s) and/or the substrate may be configured to be translated and/or rotated around one or more axes, as described further below. In such cases, the absolute positions of the print head(s) and the substrate may be varied during operation of the multi-axis system, and/or the relative position of the print head(s) with respect to the substrate may be varied during operation of the multi-axis system.

As described above, a multi-axis deposition system may comprise a print head that may be configured to be translated along one or more axes. In some embodiments, the print head may be configured to be translated along one axis, along two axes, or along three axes. In certain cases, the axes may be perpendicular to each other. In other cases two or more of the axes are not perpendicular to each other (e.g., they may intersect at an angle between 45° and) 90°. For example, in some embodiments the print head may be configured to be translated vertically, and/or translated in one or more directions perpendicular to the vertical direction. As another example, in some embodiments the print head may be configured to be translated in a direction perpendicular to the substrate, and/or in one or more directions parallel to the substrate. As a third example, in some embodiments the print head may be configured to be translated at a 45° angle with respect to the substrate. In some cases, each axis of translation may independently be controlled by separate motors. In some embodiments, the print head may not be configured to be translated.

In some embodiments, one or more print heads in a multi-axis system may be configured to be rotated around one axis, around two axes, or around three axes. In some embodiments, one or more print heads may be configured to be rotated around more than three axes (e.g., around more than four axes, around more than six axes, around more than eight axes, around more than 10 axes, or around more than 12 axes). In certain cases, the axes may be perpendicular to each other. For example, in some embodiments the print head may be configured to be rotated around a vertical axis, and/or rotated around one or more axes perpendicular to the vertical axis. As another example, in some embodiments one or more print heads may be configured to be rotated around an axis perpendicular to the substrate, and/or around one or more axes parallel to the substrate. In some cases, each axis of rotation may independently be controlled by separate motors. In some embodiments, one or more print heads may not be configured to be rotated. In some embodiments, the print head may be configured to be stationary.

In some embodiments, a substrate in a multi-axis system may be configured to be translated along one axis, along two axes, or along three axes. In certain cases, the axes may be perpendicular to each other. In other cases two or more of the axes are perpendicular to each other (e.g., they may intersect at an angle between 45° and 90°). For example, in some embodiments the substrate may be configured to be translated vertically, and/or translated in one or more directions perpendicular to the vertical direction. As another example, in some embodiments the substrate may be configured to be translated in a direction perpendicular to the print head, and/or in one or more directions parallel to the print head. As a third example, in some embodiments the print head may be configured to be translated at a 45° angle with respect to the substrate. In some cases, each axis of translation may independently be controlled by separate motors. In some embodiments, the substrate may not be configured to be translated.

In some embodiments, a substrate in a multi-axis system may be configured to be rotated around one axis, around two axes, or around three axes. In certain cases, the axes may be perpendicular to each other. In some embodiments, the substrate may be configured to be rotated around more than three axes (e.g., around more than four axes, around more than six axes, around more than eight axes, around more than 10 axes, or around more than 12 axes). For example, in some embodiments the substrate may be configured to be rotated around a vertical axis, and/or rotated around one or more axes perpendicular to the vertical axis. As another example, in some embodiments the substrate may be configured to be rotated around an axis perpendicular to the print head, and/or around one or more axes parallel to the print head. In some cases, each axis of rotation may independently be controlled by separate motors. In some embodiments, the substrate may not be configured to be rotated. In some embodiments, the substrate may be configured to be stationary.

In some embodiments, a multi-axis deposition system may comprise one or more features that aid rotation and/or translation of a print head and/or a substrate. As an example, in some cases the print head may be attached to a print head arm that facilitates motion. When two or more print heads are present, each print head may be positioned separate print head arms or two or more print heads may be positioned on the same print head arm. In some cases, two or more print head arms may be attached to a single gantry. The print head arm(s) may be capable of facilitating translation and/or rotation of the print head(s). In some embodiments, the print head(s) may be attached to single print head arms; in other embodiments, the print head(s) may be attached to multiple print head arms that are attached at joints that allow for rotation and/or translation. In some cases, one or more motors may facilitate motion of one or more components of the print head arm(s). As another example, in some cases the substrate may be attached to a substrate arm that facilitates motion. The substrate arm may be capable of facilitating translation and/or rotation of the substrate. In some embodiments, the support substrate may be attached to a single substrate arm; in other embodiments, the substrate may be attached to multiple substrate arms that are attached at joints that allow for rotation and/or translation. In some cases, the substrate may be attached to a robot arm. In some cases, one or more motors may facilitate motion of one or more components of the substrate arm(s). In certain embodiments, the print head may be attached to a print head arm and the substrate may be attached to a substrate arm.

Figure 10:
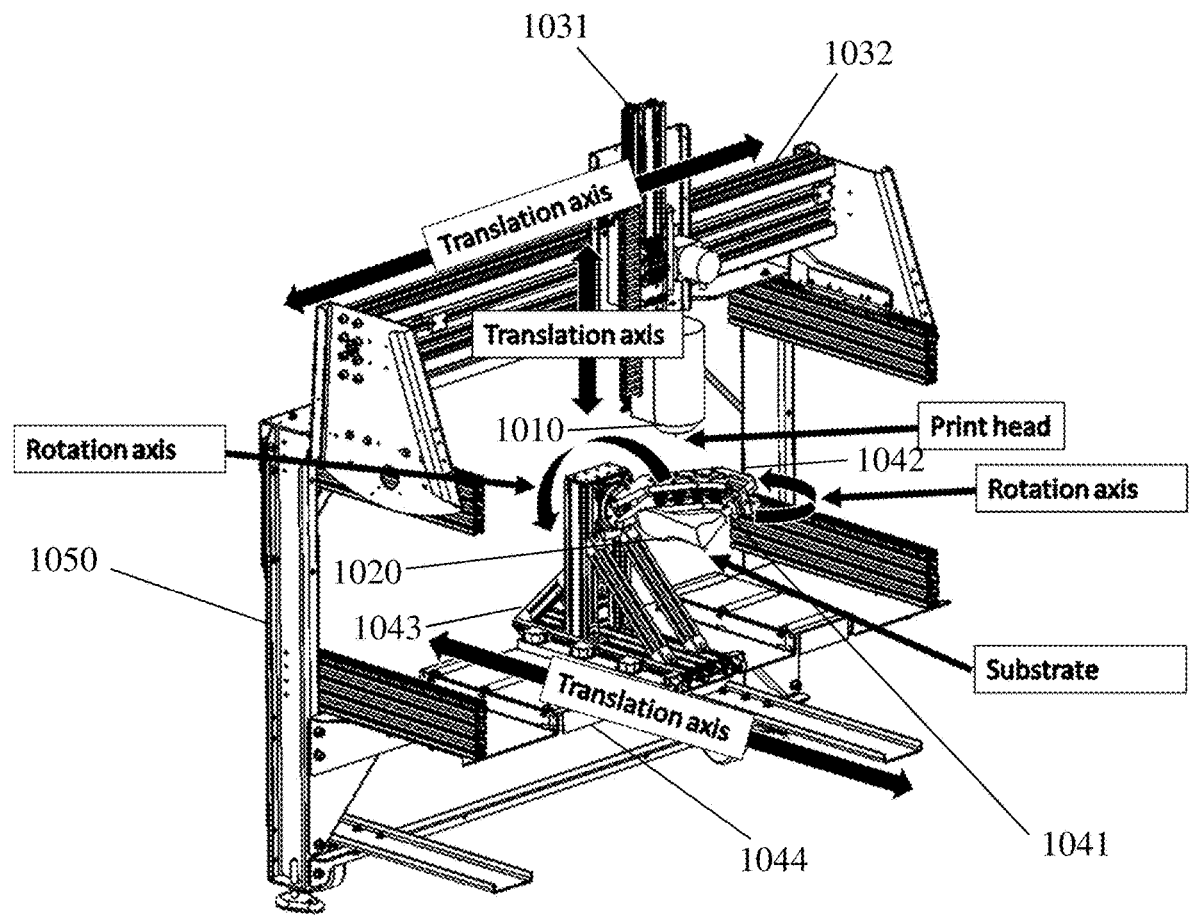
FIGS. 10-12 are schematic depictions of a multi-axis deposition system, according to certain embodiments of the invention.
Figure 11:
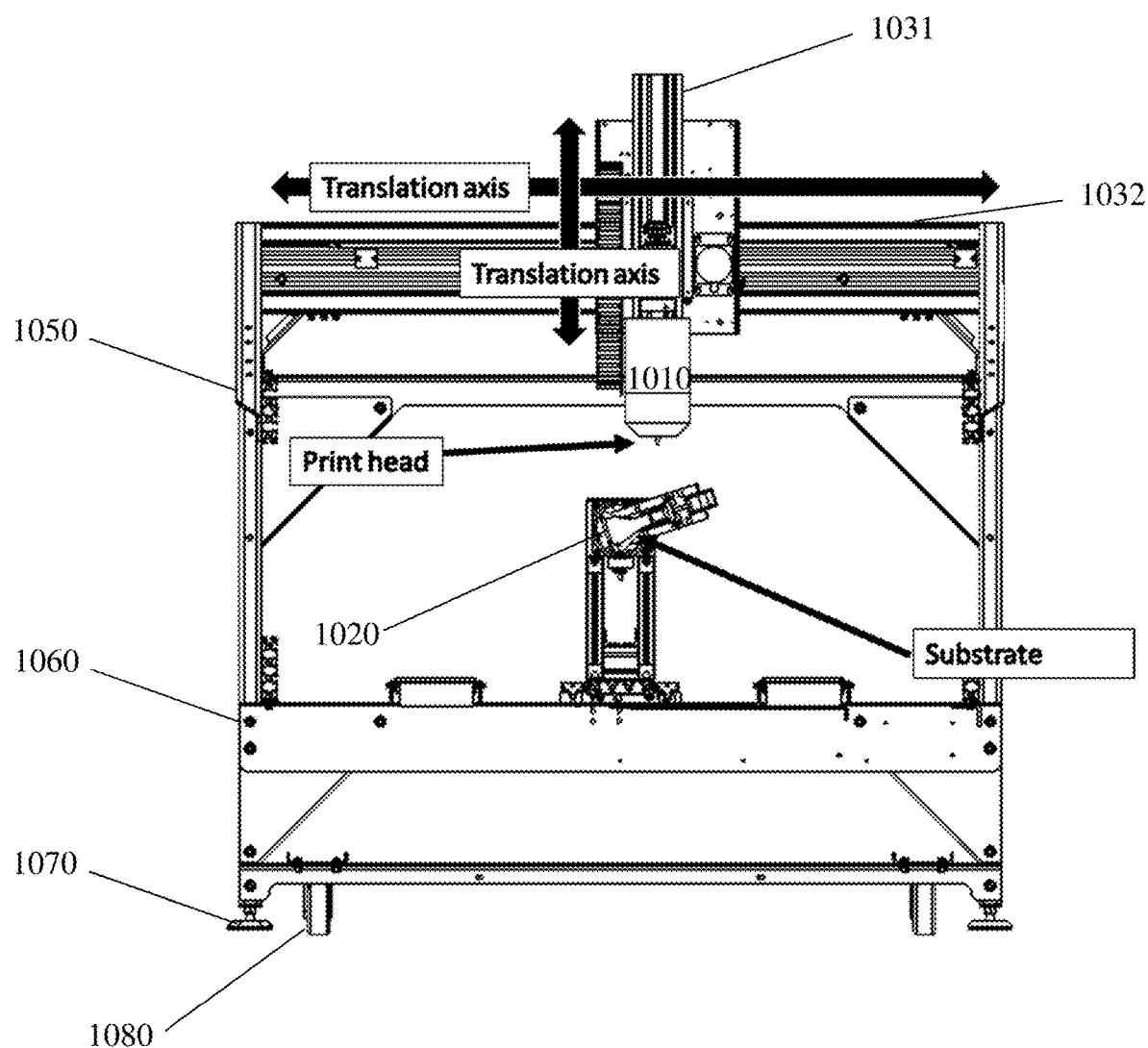
Figure 12:
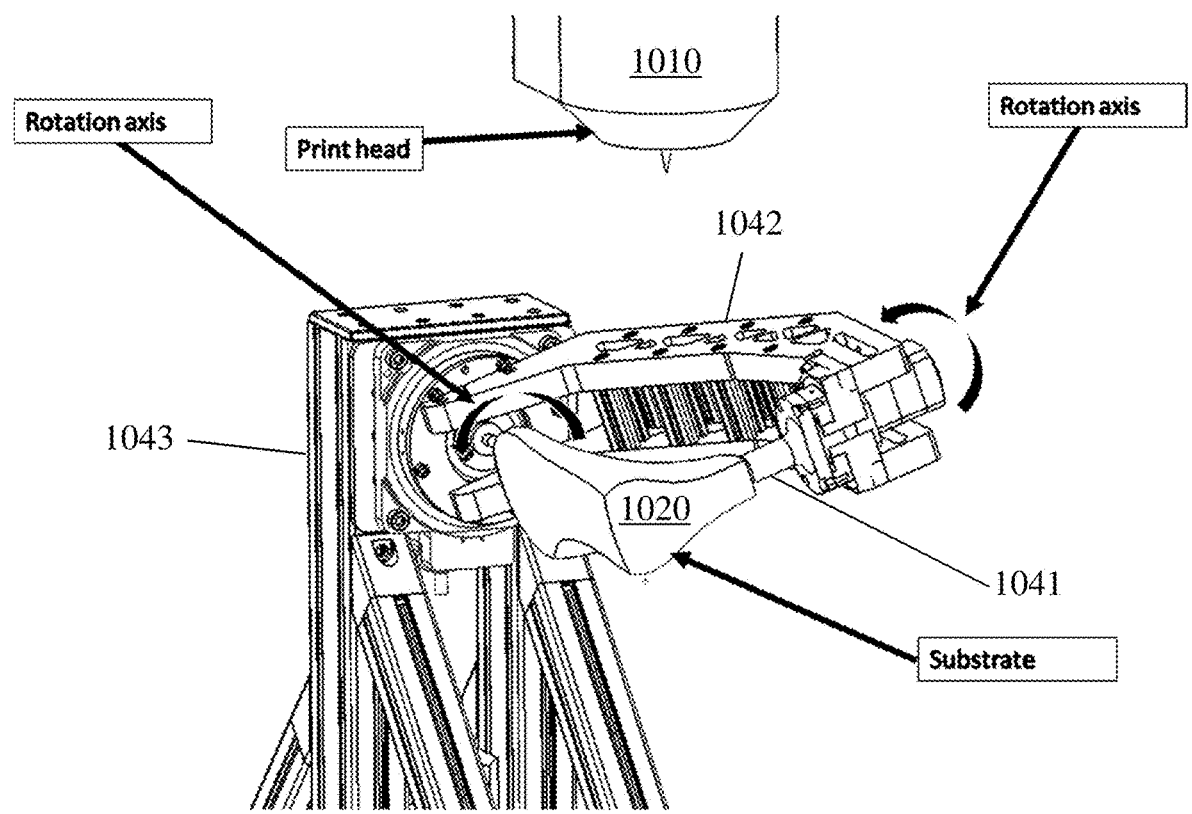

FIGS. 10-12 show various views of a non-limiting embodiment of a multi-axis deposition system showing various combinations of axes around which a print head and substrate therein may be configured to be rotated and/or translated. FIG. 10 shows a perspective view of the system as a whole, FIG. 11 shows a cross-sectional view of the system as a whole, and FIG. 12 shows a close up perspective view of the print head and the substrate. It should be understood that these figures do not show all possible combinations of print head and substrate motion, and that all combinations of print head motion and substrate motion described above are contemplated.

In FIGS. 10-12, the multi-axis deposition system includes print head 1010 and substrate 1020. Print head 1010 in FIGS. 10-12 is attached to first print head arm 1031, which is attached to second print head arm 1032 by a first print head joint configured to allow translation of first print head arm 1031 along a first print head translation axis and along a second print head translation axis. Second print head arm 1032 is also attached to gantry 1050, which supports the second print head arm. In some embodiments, the second print head arm is attached to the gantry by screws and held in a stationary position (as is shown in FIGS. 10-12). In other embodiments, the second print head arm is configured to be translated along one or more axes and/or rotated around one or more axes. The print head may be translated along the first print head translation axis by translating the first print head arm along the first print head translation axis, and the print head may be translated along the second print head translation axis by translating the first print head arm along the second print head translation axis. In certain cases, such as that shown in FIGS. 10-12, the second print head arm may be a track along which the first print head arm may be translated and/or the first print head joint may comprise a track along which the first print head arm may be translated. In other embodiments, other types of joints and print head arms may be employed.

Substrate 1010 in FIGS. 10-12 is attached to first substrate arm 1041, which is attached to second substrate arm 1042 by a first substrate joint configured to allow rotation of first substrate arm 1041 around a first substrate rotation axis. Second substrate arm 1042 is attached to third substrate arm 1043 by a second substrate joint configured to allow rotation of second substrate arm 1042 around a second substrate rotation axis. The substrate may be rotated around the first substrate rotation axis by rotating the first substrate arm around the first substrate rotation axis, and around the second substrate rotation axis by rotating the second substrate arm around the second substrate rotation axis. In some embodiments, one or more of the substrate arms may curved (e.g., second substrate arm as shown in FIGS. 10-12). Third substrate arm 1043 is attached to support 1044 by a third substrate joint configured to allow translation of the third arm along a first substrate translation axis. The substrate may be translated along the first substrate translation axis by translating the third arm along the first substrate translation axis. In certain cases, such as that shown in FIGS. 10-12, the third substrate arm may be a track along which the second substrate arm may be translated. In other embodiments, other types substrate arms may be employed.

In some embodiments, a multi-axis system may comprise further features in addition to some or all of those described above. For example, the multi-axis system may be encased in a frame or enclosure. FIG. 11 includes frame 1060 with feet 1070 and wheels 1080. The feet may aid stable positioning of the frame on a surface (e.g., a floor, a desktop, a lab bench). The wheels may promote facile repositioning of the frame in different locations. In some embodiments, one or more components (e.g., the frame, one or more arms) may be formed from standardized parts, such as T-slotted framing. Other types of standardized parts, and/or non-standard parts, may also be employed.

Certain combinations of print head motion and substrate motion may be especially advantageous. For example, as shown in FIGS. 10-12, the a print head may be configured to be translated vertically and in a first horizontal direction, and the substrate may be configured to be translated along a second horizontal direction perpendicular to the first horizontal direction and rotated around two distinct axes. As another example, the a print head may be configured to be translated in three perpendicular directions and the substrate may be configured to be rotated around two distinct axes. As a third example, the a print head may be configured to be stationary and the substrate may be configured to be translated in three perpendicular directions and rotated around two distinct axes. As a fourth example, the a print head may be configured to be translated around three distinct rotation axes and along three distinct translation axes, and the substrate may be configured to be stationary. Other combinations of print head motion and substrate motion are also possible.

In some embodiments, a multi-axis system may have one or more features that make it suitable for 3D-printing materials of interest. For example, the multi-axis system may be configured to deposit a material onto a substrate as a continuous stream or as a continuous filament. In other words, the substrate may be in fluid communication with the print head via the material during deposition. In certain cases, the multi-axis system may be employed to deposit a continuous stream or filament that extends from a first side of a last or a material disposed on the last (e.g., an upper, a 3D-printed material disposed on an upper) across the bottom of the last or material disposed on the last to the opposing side of the last or material disposed on the last. In some cases, the multi-axis system may be employed to print each portion of an article of footwear except for the upper.

In some embodiments, a multi-axis system may be configured to 3D-print materials with one or more advantageous properties. For example, the multi-axis system may be configured to 3D-print materials with a feature size of greater than or equal to 100 microns, greater than or equal to 200 microns, greater than or equal to 500 microns, greater than or equal to 1 mm, greater than or equal to 2 mm, greater than or equal to 5 mm, greater than or equal to 10 mm, greater than or equal to 20 mm, greater than or equal to 50 mm, greater than or equal to 1 cm, or greater than or equal to 2 cm. In some embodiments, the multi-axis system may be configured to 3D-print materials with a feature size of less than or equal to 5 cm, less than or equal to 2 cm, less than or equal to 1 cm, less than or equal to 5 mm, less than or equal to 2 mm, less than or equal to 1 mm, less than or equal to 500 microns, or less than or equal to 200 microns. Combinations of the above-referenced ranges are also possible (e.g., greater than or equal to 100 microns and less than or equal to 5 cm). Other ranges are also possible.

In some embodiments, a 3D-printed material may be formed on an article disposed on a substrate that is configured to interact with a detection system in a manner that promotes alignment of the 3D-printed article (and/or portions thereof) with respect to the article disposed on the substrate and/or precision in the positioning of the 3D-printed article (and/or portions thereof) onto the article disposed on the substrate. For example, the article may comprise one or more features that may be detected by a detector. The detector may be in electronic communication (e.g., by use of a wired and/or wireless connection) with a print head configured to deposit a material onto the substrate and article disposed thereon, and/or may be configured to transmit information to the print head configured to deposit a material onto the substrate and article disposed thereon. In certain cases, the detector may be configured to detect information about the article disposed on the substrate, such as the location of the article (and/or a portion thereof) in space, with respect to the substrate, and/or with respect to the print head; the orientation of the article (and/or a portion thereof) in space, with respect to the substrate, and/or with respect to the print head; and/or one or more qualities associated with the article (e.g., the scale of the article, the skew of the article, the mirroring of the article, whether or not the article has undergone an affine transformation). The detector may send instructions to the print head and/or the substrate based on some or all of the information it detects. For example, the detector may detect that the article is located in an undesirable position, and may send an instruction to the substrate to translate and/or rotate so that the article is located in a desirable position. As a second example, the detector may detect that the article is located in a desirable position, and may send instructions to the print head to print onto the article and/or to translate and/or rotate to a desired position and then print onto the article. As a third example, the detector may detect that the article has undergone a certain amount of skew, and send instructions to the print head to modify its motion with respect to the article to account for the skew. Other types of instructions may also be sent.

When present, a detector configured to detect one of more features of an article disposed on a substrate may be located in any suitable position. The detector may be configured to be stationary (e.g., it may be mounted above the substrate at a fixed position), or may be configured to be translated and/or rotated (e.g., it may be mounted on a gantry on which one or more other features such as the print head may also be positioned). The detector may be configured to have a known position with respect to one or more other components of a deposition system (e.g., a print head, a substrate), and/or may be configured to detect its location with respect to one or more components of the deposition system (e.g., the print head, the substrate). For example, the detector may detect its position with respect to the print head by depositing a material onto the substrate (or an article disposed thereon) and detecting the location of the deposited material. In some embodiments, a detector configured to detect a feature is an optical detector and an article disposed on a substrate comprises features that may be detected optically. For example, the features may be patterns printed onto an article disposed on the substrate, portions of an article disposed on a substrate that scatter light in a detectable manner, portions of an article disposed on a substrate that absorb light in a detectable manner, and/or portions of an article disposed on a substrate that reflect light in a detectable manner. Other types of features that may be detected optically are also contemplated. One example of a suitable type of optical detector is an optical camera.

In some embodiments, as also described elsewhere herein, an article disposed on a substrate may be a fabric, such as a knitted fabric or a woven fabric. The fabrics may comprise one or more features which include one or more portions that are knitted or woven to form a pattern that may be detectable optically. The feature(s) may either be created inline (e.g., during the knitting or weaving process used to form the fabric), or may be added to the fabric after it has been formed. In some embodiments, the feature(s) may comprise portion(s) of a pattern (e.g., a repeating motif) knitted or woven into the fabric or printed onto the fabric.

As discussed herein, a 3D printer may be provided that is capable of printing 3D articles with non-uniform material compositions, such as a shoe sole and/or a shoe upper. Such 3D articles may comprise a gradient structure with at least one non-uniform property (e.g., color, average stiffness, average Shore A hardness, average pore size, average density, surface roughness, reflectivity, strength, elongation at break, tensile elastic modulus, and 100% modulus). These gradient structures may be formed by varying one or more printer settings (e.g., a ratio of two or more input materials to a mixing chamber, a spin speed of an impeller in the mixing chamber, a sequence of materials into a mixing chamber, and a position of one or more valves to control material inputs into the mixing chamber, total combined volumetric flow rate of one or more input materials to a mixing chamber, nozzle tip height relative to the substrate, target temperature of the mixing chamber and/or the substrate, target catalyst concentration of the resulting mixed material, target line width of the printed material, target fumed silica concentration of the printed composite, target viscosity of the printed composite at the point of exiting the nozzle, and target concentration of an additive) while a 3D printer is printing the part. For example, the gradient structure may be formed by varying the ratio of two material inputs into a mixing nozzle. The inventors have appreciated that existing techniques for generating printer instructions for a 3D printer, such as those implemented in conventional slicer software applications, may be unable to recreate these gradient structures. Accordingly, aspects of the present disclosure relate to a computer program that is configured to generate print instructions that comprise changes to printer settings while the print head is moving along a print path to accurately create these gradient structures.

The computer program may be configured to receive object information, such as a design file for a 3D article comprising a gradient structure (e.g., from a computer-aided design (CAD) program) and/or a print path for printing a 3D article (e.g., from a slicer application) with metadata indicative of material properties at various points along the print path, and output print instructions that may be provided to a 3D printer to accurately create the 3D article. The computer program may generate these print instructions by identifying gradient structures in the 3D article (e.g., a bounded volume in the 3D structure where the material properties are non-uniform) and identifying the appropriate set of printer settings for various points along the print path to create the gradient structure. In some embodiments, identifying the appropriate set of printer settings comprises identifying one or more material inputs to the 3D-printer and/or calculating a set of ratios of two or more material inputs. For example, the computer program may identify a bounded volume in the 3D article where a color transition occurs from a first color formed by a first pigment to a second color formed by a second pigment. In this example, the computer program may identify the printer settings required to reduce (e.g., ramp down) the deposition rate of the first pigment and increase (e.g., ramp up) the deposition rate of the second pigment to achieve the color transition. Once the appropriate set of printer settings have been identified, print instructions may be generated using the identified set of printer settings. For example, print instructions may be generated that comprise a print path for the print head to follow and printer settings information indicative of the appropriate printer settings at a plurality of points along the print path. In certain cases, the print instructions may be in machine readable code.

In some embodiments, a computer program may be configured to receive information related to the status of one or more parts of the 3D-printer. The computer program may be configured to output print instructions based on the status information. For example, the computer program may identify a volume of material occupying a mixing chamber (and/or a volume of material that the mixing chamber contains when full), and output print instructions based, at least in part, upon that volume. The print instructions may be applied at a point in time in advance of the point in time at which the material to which they apply is deposited by a nozzle. Similarly, the print instructions may be applied when a nozzle depositing the material to which they apply is at a position in space different than the position it will occupy when the material to which the print instructions are applied is deposited. In other words, the print instructions may be volume shifted. Because the mixing chamber has a finite volume, material that is input into the mixing chamber will not be printed until the material already in the mixing chamber has been printed. Thus, it may be beneficial to apply print instructions in advance of the point in time at which their effect is desired. Volume shifted print instructions may result in variations in the composition of the material in the mixing chamber as a function of position. In other words, a 3D-printer receiving volume shifted print instructions may include a mixing chamber comprising material with a spatial variation in composition (e.g., from top to bottom).

The computer program may comprise a set of instructions that may be executed by a computer system comprising a processor (e.g., a hardware processor or a virtual processor) and a memory (e.g., a non-transitory computer readable medium). For example, the computer program may comprise a set of instructions stored in a non-transitory computer readable medium that programs at least one processor coupled to the non-transitory computer readable medium. It should be appreciated that the computer system may be communicatively coupled to a 3D printer and/or integrated with the 3D printer.

Figure 13:
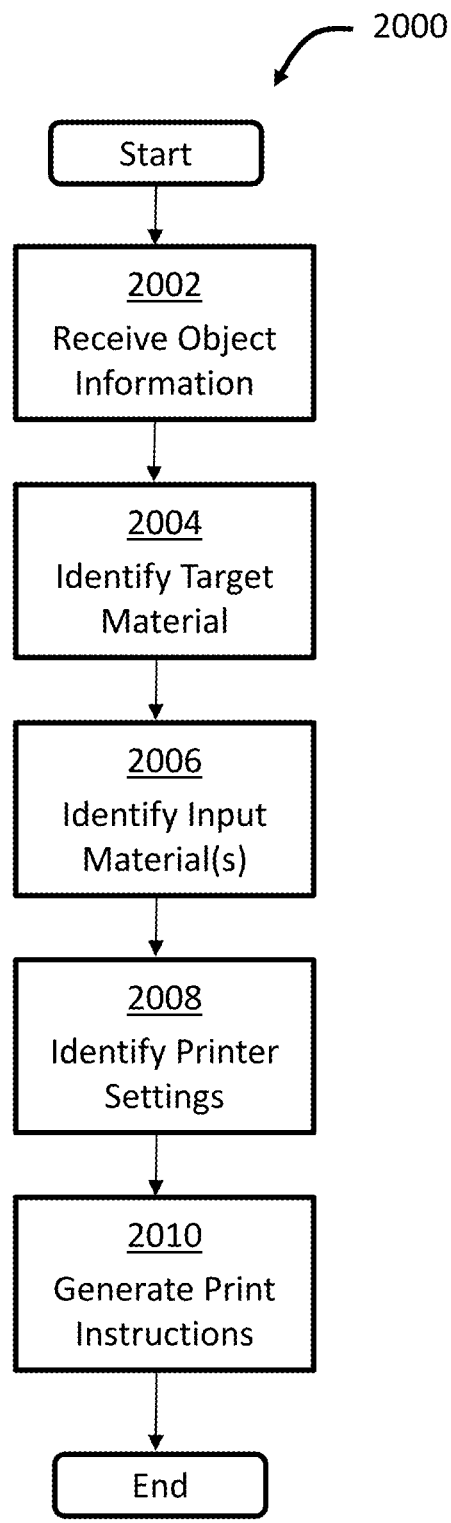
FIG. 13 illustrates an implementation of a computer program according to certain embodiments of the invention.

In some embodiments, the computer program may comprise a plurality of instructions that program at least one processor to perform a method 2000 in FIG. 13. As shown, the method 2000 comprises an act 2002 of receiving object information, an act 2004 of identifying a gradient structure, an act 2006 of identifying input materials to form the gradient structure, an act 2008 of identifying printer settings for the gradient structure, and an act 2010 of generating print instructions.

In act 2002, the system may receive object information associated with a 3D article that comprises a gradient structure. The object information may be, for example, a design file for a 3D article to be printed. The design file may comprise information indicative of one or more properties of the 3D article such as shape, material composition, and/or color. The design file may be in any of a variety of formats. Example formats include: Drawing Interchange Format (DXF), COLLAborative Design Activity (COLLADA), STereoLithography (STL), Initial Graphics Exchange Specification (IGES), Virtual Reality Modeling Language (VRML), PDF, EPS, and AI. Alternatively (or additionally), the object information may comprise a print path for a print head to follow to print the 3D article (e.g., generated by a slicer application) and information indicative of the desired material properties at various points along the print path. For example, the object information may comprise a print path comprising a plurality of points and metadata associated with one or more (or all of) the plurality of points indicative of a desired material property at the point (e.g., color, average stiffness, average Shore A hardness, average pore size, average density, surface roughness, reflectivity, strength, elongation at break, tensile elastic modulus, and 100% modulus, etc.). In some implementations, the metadata may be directly associated with one or more points in the plurality of points. In other implementations, the metadata may be stored in another format and overlaid onto the print path to determine the material properties at a given point. For example, the metadata may be desired color information stored in an image comprising a plurality of pixel values that may be overlaid onto the print path. In this example, the pixel value that aligns with a given point in the print path may be the metadata associated with the respective point.

In act 2004, the system may identify a gradient structure in the object information. A gradient structure may be identified by, for example, identifying a volume (e.g., a bounded volume) in the 3D article that has at least one non-uniform material property. Thereby, portions of the 3D article with uniform material properties may be separated from portions of the 3D article with non-uniform material properties. Once the portions of the 3D article with non-uniform material properties have been identified, the system may identify a constant set of printer settings for printing the remaining portions (e.g., the uniform portions) of the 3D article. In one implementation for illustration, the system may read metadata associated with one or more points in a print path to identify a subset of points (e.g., a continuous and/or contiguous subset of points) along the print path with non-uniform metadata to identify a gradient structure.

In act 2006, the system may identify input material(s) to create the gradient structure. For example, the 3D printer may print the material in the gradient structure by mixing a first material with a second material. In this example, the system may identify the first and second materials. The system may identify this information by, for example, identifying a material in the gradient structure and retrieving information stored in a memory of the computer system regarding the input materials required to create the identified material in the gradient structure.

In act 2008, the system identifies one or more printer settings for the gradient structure using the identified input materials. In some embodiments, the system may identify one or more printer settings required to achieve the desired material properties at a plurality of discrete points in the gradient structure. Once the printer settings for the plurality of discrete points have been identified, the system may employ interpolation techniques (e.g., linear interpolation and cubic interpolation) to smooth shifts in printer settings between the discrete points. Thereby, the system may generate a set of printer settings that may be employed to create the gradient structure. In one example for illustration, the system may identify that the mixing ratio of two materials needs to be 40/60 at a first point in the gradient structure and a 50/50 ratio at a second point in the gradient structure. In this example, the system may fit a linear curve between the first and second points to create a smooth ramp between a 40/60 ratio and a 50/50 ratio. Thereby, the system may create a set of printer settings to employ along the print path as the print head moves from the first point to the second point.

In act 2010, the system may generate the print instructions using the identified printer settings in act 2008. The print instructions may comprise, for example, a print path for a print head to follow to print the 3D article along with printer settings at a plurality of points along the print path (e.g., generated in act 2008). The print instructions may be, for example, G-code instructions. Once the print instructions have been generated, the system may transmit the print instructions to a 3D printer (and/or one or more other components of a 3D printer in embodiments where the computer system is integrated with the 3D printer).

Figure 14:
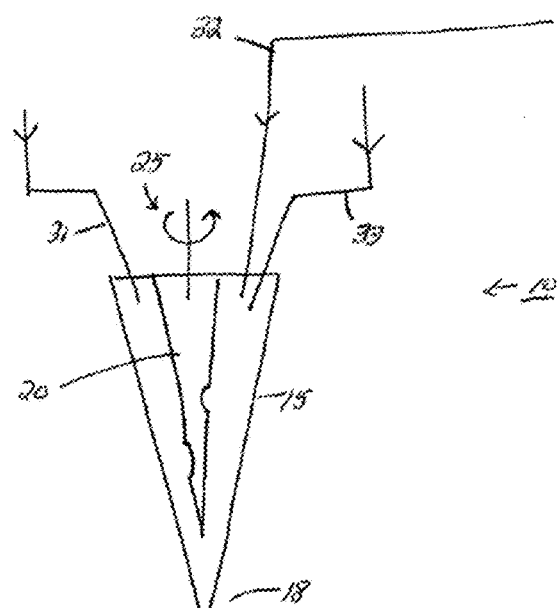
FIG. 14 illustrates a method for 3D printing an article according to certain embodiments of the invention.

FIG. 14 shows an example of a method for 3D-printing an article in accordance with some embodiments (e.g., on a multi-axis system as described above). In this figure, a device 10 for printing an article is shown, using techniques such as 3D printing. The device may include a nozzle 15, through which material is directed at a substrate through outlet 18. In some embodiments, the material may conformally coat the substrate after exiting through the nozzle. As described above, the substrate may be planar, or in some cases, the substrate may have a different shape (e.g., a curved shape). The substrate may thus be any suitable target for a material exiting the nozzle. For instance, the substrate may include a mold to which the material is applied or may be a component of an article of footwear (e.g., an upper). In some embodiments, the substrate itself may be produced by a 3D-printing process prior to 3D-printing the article. Without wishing to be bound by theory, printing onto 3D-printed substrates (e.g., 3D-printed molds) may yield 3D-printed articles that are smooth and/or have curved surfaces. In some embodiments, the substrate may be scanned using one or more sensors prior to printing. In some embodiments, data received during scanning may at least partially determine one or more movements of the nozzle during printing.

Nozzle 15 in FIG. 14 is generally depicted as being conical or funnel-shaped, although it should be understood that this is by way of example only, and the nozzle may have any suitable shape able to direct a material at a substrate. Further non-limiting examples of methods for 3D printing may be seen in a U.S. provisional patent application filed on Feb. 27, 2017, entitled "Techniques and Systems for Three-Dimensional Printing of Foam and other Materials," incorporated herein by reference in its entirety.

In some embodiments, a substrate may be translated and/or rotated with respect to a nozzle as described above during a 3D-printing process (e.g., a multi-axis robot may translate the substrate with respect to the nozzle, which may allow material to be extruded onto various portions of the substrate). In some embodiments, the nozzle may be translated and/or with respect to the substrate as described above.

In addition, in some embodiments, the material within the nozzle may be subjected to heating or cooling. This may, for example, be used to control mixing and/or reaction within the material, to keep the temperature at substantially the temperature of the surrounding environment (e.g., at room temperature), to prevent the surrounding environmental conditions and/or the heat generated by friction of the impeller and exotherm of the material curing from affecting the reaction or the printing parameters, or the like. In some cases, the temperature may be altered by at least 5° C., at least 10° C., or by other ranges such as those discussed herein. Any method may be used to heat or cool the material within the nozzle. For example, heating or cooling may be applied to the nozzle itself, and/or to material within the nozzle. Non-limiting examples include electrical heating, Peltier cooling, application of infrared light, or other techniques such as those discussed herein.

As mentioned, one or more fluids may enter the nozzle to be mixed together. The fluids may enter via a common inlet, and/or via separate inlets, for example, as is illustrated in FIG. 14 with inlets 31, 32, and 33. Although 3 inlets are illustrated in this figure, this is by way of example only, and in other embodiments, more or fewer inlets are also possible. The inlets may independently be at the same or different distances away from an outlet of the nozzle. In some cases, the fluids may react upon contact with each other; thus, the fluids are kept separate prior to entrance into the nozzle, for example, using one or more inputs and/or valves to control contact of the fluids with each other. For example, one or more valves may be present on one or more of the inlets to control the flow of fluid through the inlets, e.g., into the nozzle. Examples of valves that can be used include needle valves, ball valves, gate valves, butterfly valves, or other suitable types of valves. Additionally, other types of apparatuses to control fluid flow may also be used, in addition to and/or instead of valves.

Fluids entering a mixing nozzle may be provided to the mixing nozzle in a variety of suitable manners. In some embodiments, fluids enter a mixing nozzle by flowing therein from a material supply tube. Material supply tubes may be connected to sources of the material, such as material reservoirs. In some embodiments, material supply tubes and/or material reservoirs may be configured to be held at a desired temperature. For instance, fluid may enter a mixing nozzle from a heated material supply tube and/or from a material supply tube fluidically connected to a heated material reservoir. As another example, fluid may enter a mixing nozzle from a cooled material supply tube and/or from a material supply tube fluidically connected to a cooled material reservoir. Without wishing to be bound by any particular theory, it is believed that temperature control may advantageously prevent and/or reduce crystallization of one or more components of one or more of the fluids entering the mixing nozzle and/or prevent and/or reduce phase separation of two or more components of one or more of the fluids entering the mixing nozzle. It may also allow materials that are solid at room temperature to be printed in liquid form.

Some embodiments are directed to methods of printing an article, which may include flowing at least two materials into a mixing chamber. In some embodiments, at least one of the materials is polymeric. The method may involve in some embodiments mixing the at least two materials in the mixing chamber containing an impeller to form a mixture. The method may also include depositing the mixture onto a textile. In some embodiments, the mixed material flows through an orifice and onto the surface of a textile.

In some embodiments, the method may involve flowing the at least two materials into the mixing chamber while rotating the impeller in the mixing chamber. The impeller may cause two or more materials in the mixing chamber to mix. In some embodiments, the mixing chamber contains at least a portion of the impeller. The term "mixing chamber" may refer to the volume in which the at least two materials that are mixed together occupy from when they first touch each other, to when they stop being mechanically influenced by active motion of a mixing part (e.g., impeller). In some embodiments, the mixing chamber and the impeller share at least some volume, e.g. the impeller occupies at least some of the dead volume of the mixing chamber.

In some embodiments, the method may involve flowing the at least two materials into the mixing chamber through at least three discrete material inlets. In such embodiments, there may be at least three materials flowed into the mixing chamber. In some embodiments, the method may involve flowing the at least two materials into the mixing chamber through at least four discrete material inlets. In such embodiments, there may be at least three or four materials flowed into the mixing chamber.

In some embodiments, the mixture is a liquid. In some embodiments the mixture is in direct fluid communication with the mixing chamber during the time of deposition onto the substrate (e.g., textile). As a non-limiting example, the mixture is not jetted into discrete droplets from a standoff distance from the substrate (e.g., textile), but instead contacts simultaneously an outlet from the mixing chamber (e.g., nozzle orifice) and the substrate (e.g., textile) while the mixture is continuous with itself.

In some embodiments, the method may involve controlling the execution of the method using a controller. The method may involve varying the volumetric flow ratios of the at least two materials based on the spatial location of the mixing chamber with respect to the textile. In some embodiments, the change in the volumetric flow ratios between the at least two materials changes at least one property of the deposited mixture. In some embodiments, at least two of the at least two materials undergo a chemical reaction that changes at least one property of the deposited mixture. In some embodiments, the change in the volumetric flow ratios between the at least two materials changes at least one property of the deposited mixture after a chemical reaction has occurred in the deposited mixture. The change in the volumetric flow ratios between the two or more materials may influence the properties of the deposited structure before all chemical reactions have occurred, after all chemical reactions have occurred, or both before and after chemical reactions. In some embodiments, the at least one property that has changed is selected from the group consisting of tensile elastic modulus, tensile strength, tensile 100% modulus, hardness, viscosity, dynamic yield stress, static yield stress, density, particle concentration, color, opacity, and surface roughness, or a combination thereof.

In some embodiments, the textile onto which the mixture is deposited is substantially flat (e.g., it may be a flat plate). In some embodiments, the textile conforms to a substrate that is curved in one or more dimensions (e.g., two or three dimensions). Without wishing to be bound by any particular theory, it is believed that substrates that are curved in one or more dimensions may promote curing of material deposited thereon (e.g., polymeric material deposited thereon) in an advantageous shape (e.g., a shape similar to a final shape desired for an application, a shape more similar to the final shape desired for the application than the shape formed by the material if cured on a flat substrate). The textile may be disposed on a fixture, such as a fixture configured to interact with a 3D-printer. In some embodiments, the textile is supported by a belt that can translate the textile in one or more dimensions (e.g., two or three dimensions) and/or through a sequence of one or more processes. In some embodiments, the textile is handled in a roll to roll process. In some embodiments, the textile itself acts as a belt that can move the textile surface with respect to the mixing chamber. In some embodiments, the textile is a component of a footwear upper (e.g., a shoe upper). In some embodiments, the textile is a component of apparel, a component of an article of sportswear, a component of an article of sporting goods (e.g., a glove, a grip, a tent), a component of an article of clothing (e.g., a shirt), and/or a component of a bag. In some embodiments, the textile is a component of a knit shoe upper. In some embodiments, the textile is an article of apparel, an article of sportswear, an article of sporting goods, an article of clothing (e.g., a shirt), and/or a bag.

In certain cases, a mixture may be deposited onto an article disposed on a substrate. The article may be a component of an article of footwear (e.g., an upper), or may be an article of footwear (e.g., a shoe). The substrate may be configured to hold the article in an advantageous shape, such as an advantageous shape for footwear applications. In some embodiments, the substrate may be a shoe last. Non-limiting examples of suitable combinations of substrates and articles include lasted three dimensional shoe uppers on shoe lasts, lasted full shoes on shoe lasts, textiles cut into the shape of upper flat patterns in a flat form factor, and textiles cut into the shape of upper flat patterns disposed on a substrate that is curved in at least one dimension. Other types of articles and substrates are also possible.

In some embodiments, at least one of the at least two materials comprises a filler and the article is a polymeric composite. In some embodiments, at least one of the at least two materials comprises isocyanate groups. In some embodiments, at least one of the at least two materials have functional groups (e.g., chemical functional groups) selected from the group consisting of alcohol groups, amine groups, or combinations thereof. In some cases, more than two materials may be flowed into a mixing chamber (e.g., three materials, four materials, or more materials). When two or more materials are flowed into the mixing chamber, each material may comprise different functional groups from each other material, or two or more materials may comprise the same functional group. For example, a first material may have an isocyanate functional group and a second material may have an alcohol functional group. As another example, three materials comprising an alcohol functional group (e.g., polyols) and one material comprising an isocyanate functional group may be flowed into a mixing chamber. As a third example, two materials comprising a first functional group (e.g., an alcohol functional group) and two materials comprising a second functional group (e.g., an isocyanate functional group) may be flowed into the mixing chamber.

In some embodiments, the method may involve flowing a material comprising an isocyanate group through an inlet into the mixing chamber. In some embodiments, the material comprising an isocyanate group is selected from the group consisting of an isocyanate, an isocyanate prepolymer, and a quasi-isocyanate prepolymer, or a combination thereof. In some embodiments, the method may involve flowing a short chain extender through an inlet into the mixing chamber. In some embodiments, the short chain extender has a number average molecular weight of e.g. less than 5000 Dalton, less than 4000 Dalton, less than 3000 Dalton, less than 2000 Dalton, less than 1000 Dalton, less than 500 Dalton, less than 100 Dalton, or less than 90 Dalton. In some embodiments, the short chain extender has a number average molecular weight of less than 1000 Dalton. In some embodiments the chain extender is butanediol with a molecular weight of 90.12 g/mol. In some embodiments, e.g. at least 20%, at least 30%, at least 40%, at least 50%, at least 60%, at least 70%, at least 80%, or at least 90%, or at least 99% of the molecules of the short chain extender have at least two functional groups per molecule. In some embodiments, at least 70%, of the molecules of the short chain extender have at least two functional groups per molecule. In some embodiments, the at least two functional groups per molecule comprise at least two alcohol groups. In some embodiments, the at least two functional groups per molecule comprise at least two amine groups. In some embodiments, the at least two functional groups per molecule comprise at least one alcohol group and one amine group. In some embodiments the short chain extender may comprise a blend comprising molecules with two alcohol groups and comprising molecules with two amine groups. In some embodiments, the method may involve flowing a higher molecular weight (e.g., number average molecular weight) polyol and/or polyamine through an inlet into the mixing chamber (e.g., molecular weight e.g. greater than 100 Daltons, greater than 200 Daltons, greater than 300 Daltons, greater than 400 Daltons, or greater than 500 Daltons). In some embodiments, e.g. at least 20%, at least 30%, at least 40%, at least 50%, at least 60%, at least 70%, at least 80%, or at least 90%, or at least 99% of the molecules have a molecular weight greater than 90 Daltons. In some embodiments, at least 70% of the molecules have a molecular weight greater than 90 Daltons. In some embodiments, e.g. at least 20%, at least 30%, at least 40%, at least 50%, at least 60%, at least 70%, at least 80%, or at least 90%, or at least 99% of the molecules have a molecular weight greater than 200 Daltons. In some embodiments, at least 70% of the molecules have a molecular weight greater than 200 Daltons. In some embodiments, the method may involve flowing polyols with a concentration of added fumed silica e.g. greater than 0.1 percent by weight, greater than 0.2 percent by weight, greater than 0.5 percent by weight, greater than 1 percent by weight, greater than 2 percent by weight, greater than 3 percent by weight, greater than 4 percent by weight, greater than 5 percent by weight, greater than 10 percent by weight, greater than 20 percent by weight, greater than 30 percent by weight, greater than 40 percent by weight, greater than 50 percent by weight, greater than 60 percent by weight, greater than 70 percent by weight through an inlet into the mixing chamber. In some embodiments, the method may involve flowing polyols with a concentration of added fumed silica greater than 3 percent by weight through an inlet into the mixing chamber.

In some embodiments, additional material inlets may be utilized to control the insertion of pigments of dyes to control the RGB color of the deposited material. In some embodiments, the method may involve flowing a pigment and/or a particle through an inlet into the mixing chamber. Any of the materials flowed into the mixing chamber may also contain pigments and/or particles. In some embodiments, the pigments and/or particles may be flowed into the mixing chamber while contained in a fluid in a pigment and/or particle concentration of e.g. greater than 1 percent by weight, greater than 2 percent by weight, greater than 3 percent by weight, greater than 4 percent by weight, greater than 5 percent by weight, greater than 10 percent by weight, greater than 20 percent by weight, greater than 30 percent by weight, greater than 40 percent by weight, greater than 50 percent by weight, greater than 60 percent by weight, greater than 70 percent by weight.

In one non-limiting set of embodiments, one material that is flowed into the mixing chamber, Part A, is the curing agent that binds another three materials together. One or more of the materials bound together by Part A may affect the properties of the mixture of the four materials (i.e., the uncured material) and/or the properties of the deposited material after curing has completed (i.e., the cured material). In one non-limiting set of embodiments, there are three different Part B's flowed into the mixing chamber along with Part A: Part B1, which makes the cured material stiff; Part B2, which reduces the viscosity of the uncured material and makes the cured material soft; and Part B3, which increases the viscosity of the uncured material and makes the cured material soft. The volumetric flow rate ratios for B1 to B2 to B3 into the mixing chamber can be controlled to control properties (e.g., stiffness and viscosity) of the mixture. The volumetric flow rate of A into the mixing chamber can be determined, e.g. based on what is necessary to complete all chemical reactions for the ratio of Part B's, and controlled by a controller.

As a non-limiting example, in one set of embodiments, two or more fluids may be mixed together to form product on a substrate, for example, a foam. In some cases, a material (e.g., a precursor to the foam) may be deposited on a substrate in a partially fluid state, where the material is able to harden to form the product on the substrate. For instance, the material may have a viscosity of less than 1,000,000 cP, less than 500,000 cP, less than 300,000 cP, less than 100,000 cP, less than 50,000 cP, less than 30,000 cP, less than 10,000 cP, less than 5,000 cP, less than 3,000 cP, less than 1,000 cP, less than 500 cP, less than 300 cP, less than 100 cP, less than 50 cP, less than 30 cP, or less than 10 cP. In some cases, the material may have a viscosity of at least 10 cP, at least 30 cP, at least 50 cP, at least 100 cP, at least 300 cP, at least 500 cP, at least 1,000 cP, at least 3,000 cP, at least 5,000 cP, at least 10,000 cP, at least 30,000 cP, at least 50,000 cP, at least 100,000 cP, at least 300,000 cP, at least 500,000 cP, or at least 1,000,000 cP. Combinations of any of these viscosities are also possible; for example, the viscosity of a material may be between 100 cP and 500 cP. The material may form a product passively (e.g., upon drying of the material, completion of a reaction forming the product, etc.), and/or additional steps may be taken to encourage formation of the product. As various non-limiting examples, heat may be applied to the material and/or to the substrate, light (e.g., ultraviolet light) may be applied to the material to cause a chemical reaction, etc.

For instance, in some embodiments, a foam may be prepared by mixing a polymer, a cross-linking reagent, and a cell-forming agent, e.g., within a printing nozzle such as is shown in FIG. 14. These may be added sequentially or simultaneously in various embodiments, e.g., as discussed herein. For instance, in FIG. 14, a cross-linking agent may be added to the nozzle via inlet 31, a cell-forming agent may be added via inlet 32, and a polymer may be added via inlet 33. In some cases, these may be flowable at the temperatures in which they enter the nozzle. In some cases, control of these may be controlled using one or more valves or other apparatuses on any of these inlets, optionally controlled by a computer or other controller.

One example of a suitable polymer is polyurethane; one example of a cross-linking reagent is isocyanate; and one example of a cell-forming agent is water (which can react with the isocyanate to produce carbon dioxide as the foam forms). Other examples of each of these are discussed in more detail below. In addition, it should be understood that other fluids or reactants may be combined to form a foam, and the invention is not limited to only embodiments that include a polymer, a cross-linking reagent, and a cell-forming agent; see below for additional non-limiting examples. For example, as discussed below, a foam may be prepared using a polymer and a cell-forming agent, but not necessarily a cross-linking agent. In some embodiments, other additives may also be introduced, for example, surfactant, silicone surfactant, UV stabilizer, catalyst, pigment, nucleation promotors, fillers for better abrasion resistance, chemical foaming agents, etc. In addition, other products besides foam may be formed in other embodiments.

As mentioned, if more than two fluids or reactants are used, they may, in some embodiments, be introduced into the same nozzle, as is shown in FIG. 14. However, in other embodiments, one or more of the fluids or reactants may be mixed to form a mixture (for example, in a first mixing chamber), which can then be mixed with another fluid or reactant (e.g., in a nozzle such as discussed herein).

In some cases, 3D-printed foams (e.g., closed-cell foams, open-cell foams, etc.) may be prepared as discussed herein using various inputs, as described herein. For instance, the foam density may be varied by varying the amount of added gas, the amount of added water (e.g., in water-blown foam applications), the amount of added chemical blowing agent, etc. As another example, the foam density constant may be held constant, but the cross-link density or isocyanate content may be varied to change properties such as the elasticity, elongation, or stiffness of the foam.

In some embodiments, one or more materials that are flowed into a mixing chamber may comprise a latent curing agent, or a curing agent that is activated by exposure to a stimulus (e.g., light and/or heat). In certain cases, two or more materials are flowed into a mixing chamber, and at least one of the two or more materials comprises a latent curing agent. For instance, at least one material comprising a latent curing agent may be flowed into the mixing chamber and at least one additional material (e.g., another material comprising a latent curing agent, a material lacking a latent curing agent) may also be flowed into the mixing chamber. The mixing chamber may blend together the materials flowing therein (e.g., a material comprising a latent curing agent and one or more further materials also flowing into the mixing chamber). For example, both a photocureable resin and a 1K polyurethane system may be flowed into a mixing chamber and mixed therein.

When present, the latent curing agent may be activated at any suitable time to cure the material(s). In some embodiments, a latent curing agent may initially be present in a first fluid input or second fluid input and may be incorporated into a mixture, deposited material, and/or 3D-printed article in an uncured form. The mixture, deposited material, and/or 3D-printed article may be removed from a vessel (e.g., extruded from a mixing chamber and/or mixing nozzle) and then exposed to a stimulus, such as light and/or heat, that results in the curing of the latent curing agent. Curing the latent curing agent may e.g. increase the strength of a 3D-printed article, increase the density of the 3D-printed article, and/or may improve the surface finish of the 3D-printed article. The latent curing agent may be a blocked isocyanate such as blocked toluene diisocyanate. The latent curing agent may make up to 70% by weight of a fluid input.

In some embodiments, an active mixing system may be applied to one part latent curing polymer systems. In these one part latent curing polymer systems, polymers may have little to no reactivity in the storage state or in the cartridge. In some embodiments, it is not until the one part latent curing polymer system is deposited and experiences a stimulus that it will begin to polymerize into a solid thermoset or elastomer. In such embodiments, multiple one part systems that have compatibility with one another can be used as inputs into the microfluidic active mixing nozzle system. In some embodiments, each one part system may have a different material property or properties, e.g. stiffness, density, filler content, and/or blowing agent content. In some embodiments, the ratios between two or more inputs can be varied to modulate these properties. It should be understood that any of the embodiments relating to multi-part reactive systems may also be applied to the active mixing of one part systems to vary material properties.

In some embodiments, one or more inputs (e.g., materials, fluids; e.g., to a microfluidic printing nozzle) comprises a one part resin that is configured to polymerize in response to a stimulus. In some embodiments, the resin comprises, e.g., polyols with blocked isocyanates, and/or a polyurethane with silane terminal groups. In some embodiments, the stimulus is e.g., heat, moisture, and/or light.

There are several types of systems (e.g., 1K systems) that could be blended using a one part latent curing polymer system. As a non-limiting example of a system (e.g., 1K systems) that could be blended using a one part latent curing polymer system, a polyol or polyamine system with blocked isocyanate could be used. In some embodiments, a polyol or polyamine system with blocked isocyanate functions similarly to e.g. a standard polyurethane system, a polyuria system, or a polyurethane/polyuria hybrid system. In the case of a polyol or polyamine system with blocked isocyanate, the curing agent is blocked with another functional group, so the curing agent can be integrated directly into the polyol or polyamine in the cartridge without curing. Heat can then be used to deblock the isocyanate and drive rapid curing after all of the materials have been deposited.

As another non-limiting example of a system (e.g., 1K systems) that could be blended using a one part latent curing polymer system, silane hybrid chemistry could be used. In the case of silane hybrid chemistry, the polyols and/or isocyanates are functionalized with a terminal silane group. The silane group may be e.g. alpha-Dimethoxysilane, gamma-trimethoxy silane, gamma-triethoxy silane, gamma-dimethoxy silane, or gamma diethoxy silane. In these cases, the silanes polymerize with each other on exposure to moisture, and the reaction is accelerated by heat. After a part is printed, it may be exposed to high humidity and high heat to accelerate the reaction. Another example of a material that may be cured by exposure to moisture is an isocyanate prepolymer.

As still another non-limiting example of a system (e.g., 1K systems) that could be blended using a one part latent curing polymer system, radiation curable formulations could be used. In some embodiments, these radiation curable formulations may comprise acrylates, and/or methacrylate functional polymers with free radical photoinitiators. In some cases, the free radical photo initiators can be activated by exposure to UV after the formulations are deposited.

Carbodiimides could be used, as still another non-limiting example of a system (e.g., 1K systems) that could be blended using a one part latent curing polymer system. In some embodiments, carbodiimides can act as a latent curing agent that forms chemical bonds with carboxylic acid groups or amine groups on exposure to heat. In some cases, carbodiimides could be used as a cross-linker for polyamine systems.

In another non-limiting example of a system (e.g., 1K systems) that could be blended using a one part latent curing polymer system, moisture cure polyurethane (PU) could be used. In some cases isocyanate prepolymers, or polyols that have been capped with free isocyanate groups, may be used as the one part system. In some embodiments, the one part system will then be stable until it is exposed to moisture in the air that will drive the reaction between free isocyanate groups.

In some embodiments, one or more properties of a mixture that is 3D-printed from a nozzle may change as a function of time and/or nozzle position with respect to the substrate. For instance, the composition of one or more components and/or the wt % of one or more components within the mixture may change as a function of time. In some embodiments, one or more physical parameters of the nozzle and/or the substrate may change as a function of time. As an example, the temperature of the nozzle and/or the substrate may change as a function of time. Without wishing to be bound by theory, the temperature of the nozzle and the temperature of the substrate may affect the types of reactions that occur between various components (e.g., cross-linking reactions, foaming reactions, reactions within the nozzle, reactions on the substrate) and/or the rates at which these reactions occur. This may in turn affect the chemical structure of the mixture (e.g., the composition of the mixture, the degree of cross-linking of the resultant foam) during and/or after printing, and/or affect one or more physical properties of the mixture (e.g., the viscosity of the mixture, the average pore size of the resultant foam, the density of the resultant foam, the stiffness of the resultant foam, the Shore A hardness of the resultant foam) during and/or after printing. In some embodiments, changes in substrate or nozzle temperature during printing may allow for different portions of the 3D-printed article (e.g., those printed at different times and/or in different positions on the substrate) to have different chemical or physical properties. In some embodiments, the portions with different chemical and/or physical properties may be printed in a single continuous process, and/or may together form a single integrated material.

The Inventors recognized the problem that some particles (e.g., fumed silica), which can be used to change the rheology and/or mechanical properties of a material (e.g., a polymeric material), are difficult to use in spraying methods for deposition of material. The degree of particle incorporation may be useful, for example, in controlling whether a material deposited onto a fabric sits on top of the fabric (e.g., material with a sufficient volume percent of the particles) or seeps into the fabric. As an alternative to incorporating particles into a material, the Inventors have determined that exposing a light-curable material to light (e.g., UV light) of an appropriate curing wavelength upon the material exiting a printing nozzle, or after a predetermined delay between exiting the printing nozzle and light exposure, results in a similar rigidifying effect on the material to that resulting from particle incorporation. The Inventors have further determined that light curing can be used to control the mechanical properties of materials that can be deposited by spraying (e.g., using compressed gas to aerosolize the material), which may result in both better mechanical properties control and higher throughput relative to other printing methods. In addition, the Inventors have determined that combining a printing nozzle (e.g., having a mixing chamber and an impeller disposed in the mixing chamber) configured to actively mix small volumes of material with a compressed gas source, an outlet of which printing nozzle intersects with an outlet in fluid communication with the compressed gas source, a print head with spraying capabilities results in which input ratios (e.g., volume ratios) into the printing nozzle, and therefore material composition of the sprayed material, can be changed on the fly.

In some embodiments, it can be useful deposit material onto surfaces by spraying rather than by extrusion alone through a nozzle. Advantages of spraying relative to extrusion alone may include but are not limited to deposition of thinner films with no extrusion lines; reduced sensitivity to nozzle standoff distance from the substrate; and/or a capacity to create wider strips of material in one pass to reduce cycle time. Other advantages of spraying relative to extrusion alone may include limited accumulation or no accumulation of cured material on the nozzle, which may be because spraying may not require the spray nozzle to come into direct fluid communication with material that has already been deposited. In addition, coatings made by spraying can be applied conformally to three-dimensional (3D) surfaces without precise alignment or 3D tool-pathing.

In some embodiments, it is possible to make slight modifications to a mixing nozzle (e.g., a 4-input dynamic mixing nozzle) to convert it into a spray nozzle. In order to do this, a compressed gas guiding sheath fluidly connected with a compressed gas source may be attached around the outside of the nozzle. In some embodiments, a configuration of an impeller disposed in the mixing chamber of the mixing nozzle ensures that a small mixing volume is retained such that rapid changes in the sprayed material composition can be executed. In some embodiments, the compressed gas guiding sheath (e.g., air guiding sheath) is configured to guide the flow of compressed gas from a compressed gas source to atomize the output of the nozzle into small droplets immediately upon exiting the nozzle. In some embodiments, the small droplets are then propelled through the air to land on a target substrate. In some embodiments, ratio(s) (e.g., volume ratios) of the inputs (e.g., 4 inputs) into the mixing chamber can be changed in space and time to vary the composition of the material that is sprayed. In some embodiments, the geometry of the compressed gas guiding sheath and/or the applied pressure from the compressed gas can be used to change the shape and velocity of the cone of atomized material that is deposited. In some embodiments, the standoff distance from the substrate can be used to control the width of the sprayed strips.

A potential limitation of spraying (e.g., spraying a mixture of chemically reactive materials) may be that depending on the applied pressure from the compressed gas through the compressed gas guiding sheath, the sprayed films that are deposited onto the substrate can be deformed after deposition by the force of the compressed gas blowing against them. In embodiments where spraying a mixture of chemically reactive materials occurs, one solution to this problem may be to induce the mixture of materials to react more quickly and become solid very quickly so that the mixture can withstand the forces of the compressed gas without permanent deformation. However, this solution may create risks of accumulating cured material inside of a mixing nozzle (e.g., inside of a mixing chamber) during deposition. Another solution may be to add a UV-curable component to one or more inputs that are mixed together in the mixing chamber. As a non-limiting example, free radical polymerization between materials with alkene functional groups (e.g., acrylates, methacrylates, vinyls) may proceed very rapidly (e.g., in fractions of a second) when exposed to high power UV irradiation, but may also remain stable for months when not exposed to UV irradiation. After adding a UV-curable component to the mixture, the mixture can be exposed to UV irradiation directly as it exits the mixing chamber. The exposure to UV irradiation may increase the viscosity of the resulting material very rapidly to the consistency of a non-flowing paste or gel that can withstand forces from the compressed gas without deformation. This rapid increase in viscosity may also prevent the deposited material from soaking into porous fabrics, and may enable structures of substantial thickness to be built up. Since the UV-curable components of the system may represent only a fraction of the total functional groups that have the capability of reacting to form a solid polymer, the deposited material may continue to increase in viscosity, and also may form chemical bonds with previously deposited material as functional groups in the mixed material (e.g., isocyanates and one or more of alcohol groups or amine groups) curable by means other than UV exposure continue to react with one another after the UV irradiation (e.g., high power UV irradiation) is removed. In some cases, a UV-curable component of the mixture may be a urethane acrylate that does not have any alcohol or isocyanate groups present on it. In some cases, UV-curable component(s) of the mixture may be present within the same molecule that also has one or more functional groups curable by means other than UV exposure (e.g., alcohol, amine, or isocyanate groups). The mass percentage of molecules that contain UV-curable functionality may be as high as 100% for any individual input. The mass percentage of molecules that contain UV-curable functionality may be as high as 60% for the final mixture in the case that molecules containing UV-curable functional groups are present on different molecules from the molecules containing one or more functional groups curable by means other than UV exposure (e.g., isocyanates, alcohols, or amines). In the case where UV-curable functional groups are present on the same molecules that also contain one or more functional groups curable by means other than UV exposure (e.g., isocyanates, alcohols, or amines), as much as 100% of the molecules may contain at least one UV-curable functional group. In the case that a hybrid UV-curable mixture is used, wherein UV-curable functional groups are present as well as one or more functional groups curable by means other than UV exposure, an irradiation source (e.g., a UV irradiation source, a light source, a UV light source) may be integrated into (or adjacent to) the print head, such that the hybrid UV-curable mixture may be UV cured immediately upon exiting the nozzle. The irradiation source (e.g., UV irradiation source) may comprise one or more UV LEDs, each with a peak wavelength between or equal to 200 nm and 405 nm. The irradiation source (e.g., UV irradiation source) may also comprise mercury lamps or bulbs. The irradiation source may also comprise a light source with a peak wavelength outside of the UV spectrum, provided that the intensity of irradiation in the UV spectrum is sufficiently high to activate a photoinitiator in the system. Additionally, the irradiation source may be one or more DLP (Digital Light Projection) projectors. The projectors may have lenses that direct the light (e.g., focus the light) onto a small region, but enable the light in that region to be patterned. The projectors can be used to change the shape of an image that is projected so that the light is directed only onto regions that require exposure.

In some cases, it may be advantageous for the hybrid UV-curable mixture to experience a delay between exiting the nozzle and initial exposure to the irradiation source (e.g., UV irradiation source). This delay may allow the deposited material to level and spread, and/or to soak into the surface of the substrate (e.g., the fabric surface) to some degree before the viscosity of the extruded material increases substantially. This leveling, spreading, and/or soaking in can produce more uniform and flat films deposited with this method, relative to immediate exposure of the mixture to the irradiation source as it leaves the nozzle. In other cases, it may be advantageous to have no delay in exposure of the mixture to the irradiation source as it leaves the nozzle, such that the material that is deposited holds its shape without spreading or leveling. In some cases, a region surrounding the nozzle tip may be exposed to irradiation (e.g., UV irradiation) continuously, and the rate of increase of viscosity of the mixture may be controlled by the mass fraction or volume fraction of UV-curable material present in the mixture, which can be controlled zonally by varying the ratios of two or more inputs into the mixing chamber.

It should also be understood that while the scope of this disclosure has focused on examples of functional groups curable by means other than UV exposure directed to polyurethane formulations, for spraying and/or extrusion of a hybrid UV-curable mixture, other material chemistries may be used to replace the polyurethane formulations. For example, a mixture for spraying and/or extrusion may be made with epoxies where one component contains epoxide functional groups, and another component contains amine functional groups. In another example of a mixture, one component may include siloxane functional silicone resins and a platinum catalyst, and another component may include vinyl functional silicone resins, which would react after mixing to form polydimethylsiloxane (PDMS) elastomers. Polydimethylsiloxane resins that cross-link through multiple chemistries may also be used (e.g., tin-cured, or acetoxy-based systems). Polydimethylsiloxane resins may also be partially or fully UV-curable, e.g., by adding acrylate functional groups to the silicone resins, or by employing a catalyst that is de-blocked by exposure to UV light.

Other variations of a nozzle include but are not limited to: a spray nozzle with a compressed gas source and/or a compressed gas guiding sheath without an irradiation source (e.g., without a UV light source) with at least two inlets to the nozzle, for depositing a reactive system having two or more parts without any UV-curable components; or a nozzle with two inlets and (in some cases without a compressed gas source or guiding sheath but) including an irradiation source (e.g., a UV irradiation source), for depositing by extrusion (in some cases without spray functionality) a reactive system having two or more parts with some irradiation-curable (e.g., UV-curable) components.

In any variation of the nozzle (e.g., mixing nozzle), the nozzle may have one input or two inputs or more than two inputs (e.g., 3, 4, 5, 6, 7, 8, 9, 10, or more inputs).

In some embodiments, a print head is provided.

Figure 15:
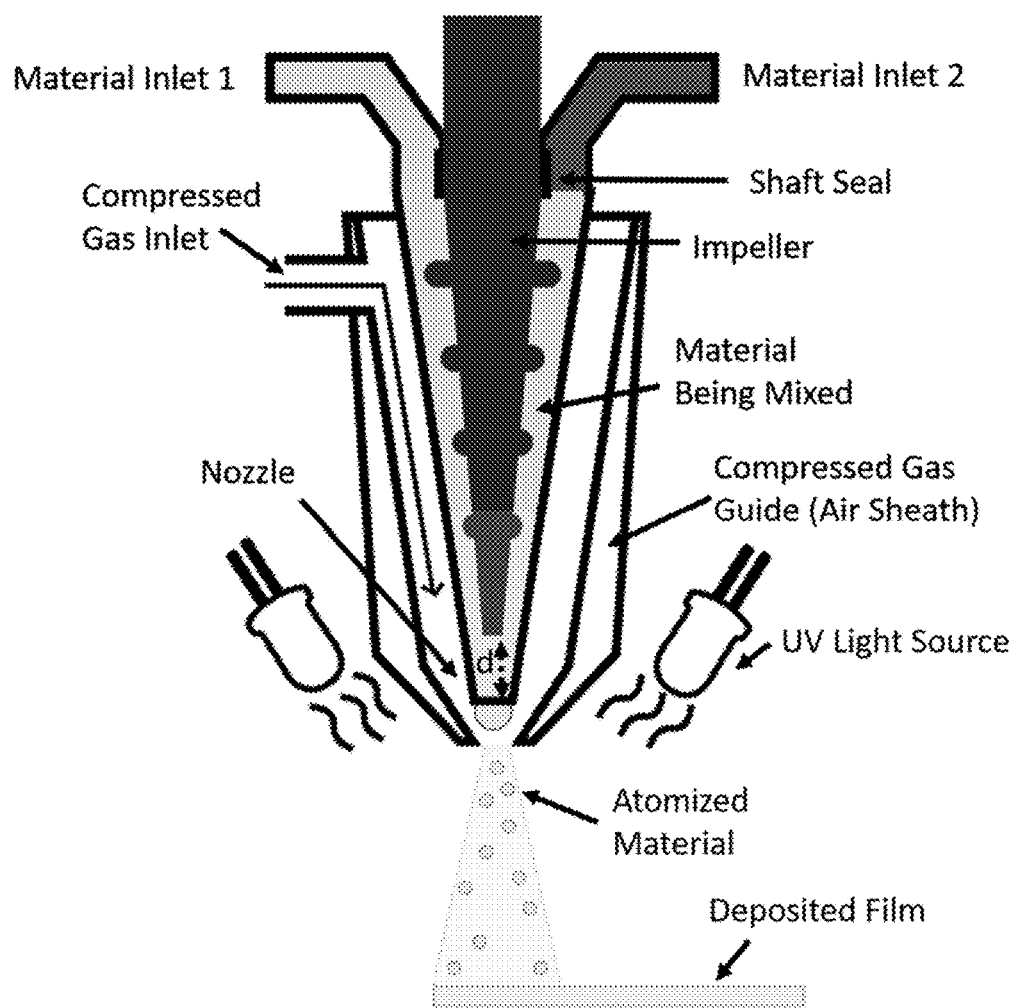
FIG. 15 is a schematic of an illustrative reactive spray print head with an integrated UV curing mechanism, in accordance with some embodiments.

The print head can have a printing nozzle, which can have a mixing chamber, an impeller disposed in the mixing chamber, and two or more material inlets in fluid communication with the mixing chamber (see, e.g., FIG. 15). In some embodiments, a tip of the impeller is less than 5 mm from an outlet of the printing nozzle. In some embodiments, an outlet of the printing nozzle (e.g., of the mixing chamber) is configured to intersect with an outlet fluidly connected to the compressed gas source (see, e.g., FIG. 15, FIG. 16). In some embodiments, a volume of the mixing chamber is less than 1 mL. In some embodiments, the volume of the mixing chamber is less than 250 microliters. In some embodiments, the mixing chamber is in fluid communication with three or more material inlets. In some embodiments, the mixing chamber is in fluid communication with four or more material inlets. In some embodiments, one or more of the material inlets is in fluid communication with a respective in-line rotary pump.

Figure 16:
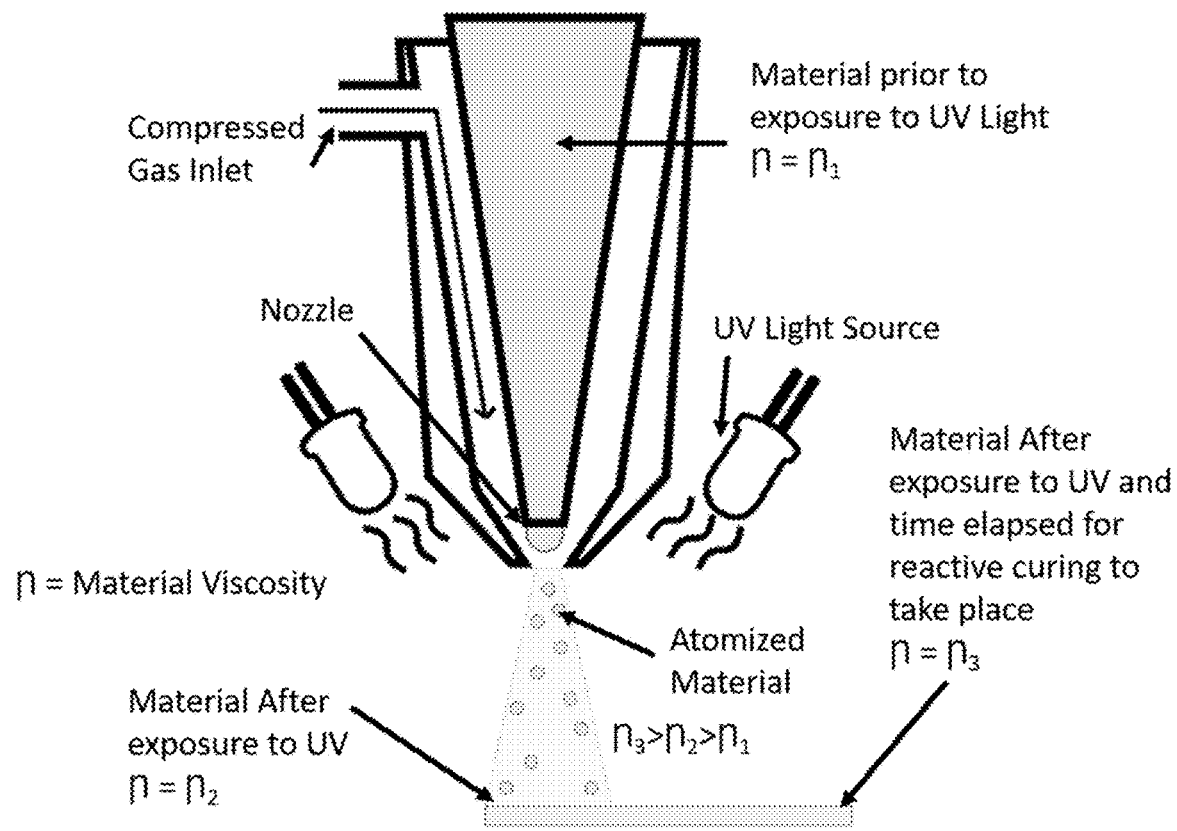
FIG. 16 is a schematic of an illustrative spray print head with an integrated UV curing mechanism, in accordance with some embodiments.
Figure 17:
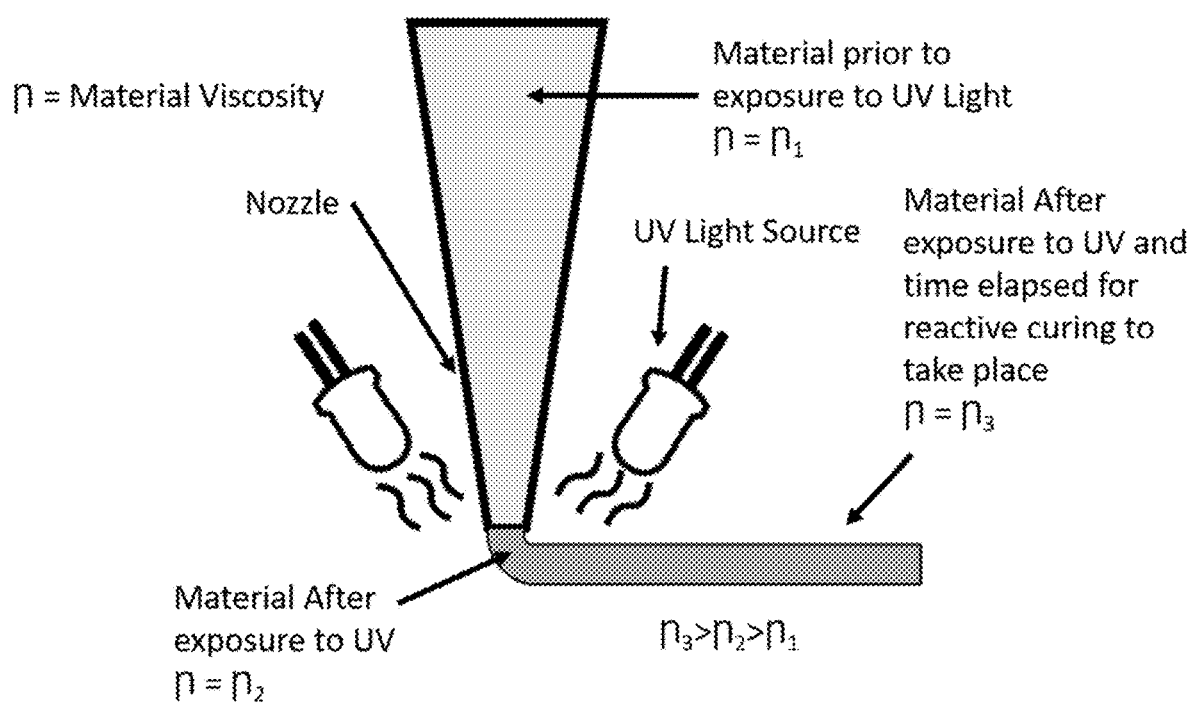
FIG. 17 is a schematic of an illustrative print head with an integrated UV curing mechanism, in accordance with some embodiments.

The print head can have a light source (e.g., an ultraviolet (UV) light source) adjacent to the printing nozzle (see, e.g., FIG. 15, FIG. 16, FIG. 17). In some embodiments, the light source (e.g., UV light source) comprises an emission wavelength between or equal to 200 nm and 405 nm. In some embodiments, the light source (e.g., UV light source) is configured to irradiate a material directly as the material exits the printing nozzle (e.g., exits the mixing chamber). In some embodiments, the light source (e.g., UV light source) is configured to irradiate a material after the material exits the mixing chamber with a predetermined delay. In some embodiments, the light source (e.g., UV light source) comprises an emission wavelength between or equal to 200 nm and 405 nm. In some embodiments, the light source (e.g., UV light source) comprises one or more light emitting diodes (LEDs) (e.g., UV LEDs). In some embodiments, the light source (e.g., UV light source) is one or more Digital Light Projectors (DLP).

The print head can have a compressed gas source (see, e.g., FIG. 15, FIG. 16). In some embodiments, the compressed gas source is configured to atomize a material extruded from the printing nozzle (e.g., from the mixing chamber). In some embodiments, the compressed gas source is in fluid communication with an electropneumatic regulator.

In some embodiments, the print head has a compressed gas guiding sheath fluidly connected to the compressed gas source (see, e.g., FIG. 15, FIG. 16). In some embodiments, an outlet of the mixing chamber is configured to intersect with an outlet of the compressed gas guiding sheath. In some embodiments, the compressed gas guiding sheath is a microfluidic gas guiding sheath. In some embodiments, the compressed gas guiding sheath (e.g., microfluidic gas guiding sheath) is actuatable such the sheath can be moved with respect to an outlet of the printing nozzle or vice versa. In some embodiments, the compressed gas guiding sheath (e.g., microfluidic gas guiding sheath) is coupled to the print head through magnetic attachment such that it can be easily removed. In some embodiments, the compressed gas guiding sheath (e.g., microfluidic gas guiding sheath) has multiple gas channels coupled to valves that can be addressed individually. In some embodiments, moving the sheath with respect to the outlet of the printing nozzle changes channels through which compressed gas is configured to flow, which changes the shape of an atomized material cone that is deposited onto the surface from the outlet of the printing nozzle.

In some embodiments, a method of printing a material is provided.

The method may comprise passing a formulation through a print head. In some embodiments, the method comprises mixing two or more parts of the formulation in a printing nozzle of the print head to form a mixture. In some embodiments, the method comprises exposing the formulation to light (e.g., UV light) for e.g., between or equal to 0.01 seconds and 10 seconds, or between or equal to 1 seconds and 3 seconds. In some embodiments, the method comprises exposing the formulation (e.g., mixture) to light at a wavelength within the absorption spectrum of the photoinitiator for e.g., between or equal to 0.01 seconds and 10 seconds, or between or equal to 1 seconds and 3 seconds. In some embodiments, the method comprises flowing compressed gas from the compressed gas source to atomize the formulation as it exits the nozzle. In some embodiments, the method comprises flowing compressed gas from the compressed gas source to atomize the formulation after it exits the nozzle with a predetermined delay.

In some embodiments, the formulation comprises two or more parts, and passing a formulation through the print head involves flowing at least two of the two or more parts of the formulation through a respective material inlet of the two or more material inlets into the printing nozzle. In some embodiments, the formulation comprises three or more parts, and passing a formulation through the print head involves flowing at least three of the three or more parts of the formulation through a respective material inlet of three or more material inlets into the printing nozzle. In some embodiments, the formulation comprises four or more parts, and passing a formulation through the print head involves flowing at least four of the four or more parts of the formulation through a respective material inlet of four or more material inlets into the printing nozzle.

In some embodiments, the formulation comprises molecules that have a UV-curable functional group. In some embodiments, the formulation comprises molecules that have a functional group curable by means other than UV exposure. In some embodiments, the formulation comprises molecules that have a UV-curable functional group, and molecules that have a functional group curable by means other than UV exposure. In some embodiments, some of the molecules that have the UV-curable functional group also have a functional group curable by means other than UV exposure. In some embodiments, the formulation comprises molecules that have an isocyanate functional group. In some embodiments, the formulation comprises molecules that have one or more of an alcohol functional group or an amine functional group. In some embodiments, the formulation comprises molecules that have an alkene functional group and molecules that have one or more of an alcohol functional group, an amine functional group, or an isocyanate functional group. In some embodiments, the formulation (e.g., mixture) comprises alkene groups, isocyanate groups, a photoinitiator, and at least one of alcohol groups or amine groups.

In some embodiments, the method comprises mixing two or more parts of the formulation together to form a mixture that comprises alkene groups (e.g., acrylates, methacrylates, vinyls, etc.), isocyanate groups, a photoinitiator, and at least one of alcohol groups or amine groups. In some embodiments, the method comprises exposing the mixture to light (e.g., UV light) at a wavelength within the absorption spectrum of the photoinitiator (e.g., between or equal to 365 nm and 405 nm). In some such embodiments, the alkene groups in the mixture react with one another to increase the viscosity of the mixture.

The print head may comprise a compressed gas source, a printing nozzle, and/or two or more material inlets in fluid communication with the printing nozzle. In some embodiments, an outlet of the printing nozzle is configured to intersect with an outlet fluidly connected to the compressed gas source. In some embodiments, the print head comprises an ultraviolet (UV) light source adjacent to the printing nozzle. In some embodiments, the printing nozzle comprises a mixing chamber and an impeller disposed in the mixing chamber. In some embodiments, the two or more material inlets are in fluid communication with the mixing chamber.

In some embodiments, the mixture continues to increase in one or more of viscosity, strength, yield stress, or stiffness after UV exposure is finished as a result of reaction between molecules in the mixture that have a functional group curable by means other than UV exposure (e.g., between molecules in the mixture that have isocyanate groups and one or more of alcohol groups and amine groups). In some embodiments, the mixture does not have a yield stress when it reaches an outlet of the printing nozzle (e.g., outlet of the mixing chamber), prior to exposure to UV light. In some embodiments, the mixture develops a yield stress within 2 seconds after exposure to UV light. In some embodiments, the formulation (e.g., the mixture) also includes a photo-latent base, which may act as a catalyst that becomes more active upon exposure to UV irradiation to induce faster reaction of any functional groups in the formulation curable by means other than UV irradiation. The term photo-latent base as used herein refers to a molecule that changes structure in response to UV light to become a new molecule with a larger pKa (logarithmic acid dissociation constant).

In some cases, as discussed herein, a foam precursor, prior to curing, may have different rheological properties than the starting raw materials without gas content. For example, a mixture of low viscosity fluids, gases, and/or surfactants, etc. having Newtonian flow behavior before foaming can be used to produce a precursor having non-Newtonian flow characteristics, e.g., with a yield stress, or shear-thickening or shear-thinning behavior. This may be used herein to produce a precursor having a rheological profile suitable for printing, e.g., on a substrate. Fluids such as incompressible Newtonian fluids or gases can be controlled introduced into a nozzle (e.g., prior to mixing) and precisely metered onto a substrate during deposition. In some cases, the foaming process may start within the nozzle, and controlled to control deposition of the precursor and/or the final mechanical properties of the foam.

In some embodiments, one or more materials deposited onto a substrate (e.g., a material deposited by a print head such as a nozzle, a material printed by a 3D-printing process, a component of a 3D-printed article, a portion of a 3D-printed article) may comprise reactive functional groups for a period of time after deposition. The reactive functional groups may be configured to react with other articles to which the deposited material is adjacent (e.g., articles of footwear, components of articles of footwear, materials deposited by a print head such as a nozzle, materials printed by a 3D-printing process, components of 3D-printed articles, portions of 3D-printed articles), such as an article onto which the material was deposited, an article added to the deposited material, an article positioned beside the deposited material, an article disposed on the same article onto which the material was deposited, and/or an article that is positioned partially above or below the deposited material and partially beside the deposited material. Although many of the articles referred to herein are articles of footwear or components thereof, it should be understood that articles of apparel such as sports bras and components of articles of apparel such as sports bras are also contemplated herein. Reaction between the reactive functional groups in the deposited material and one or more articles to which it is adjacent may result in bond formation between the deposited material and the articles(s), and/or may increase the adhesive strength between the deposited material and the article(s). Examples of such articles include textiles, molded parts, layers, portions, further deposited materials with the same or different chemistry, and the like. In some embodiments, the deposited material may bond with two or more articles to which it is adjacent, and may adhere these articles together through bonds formed by reaction of the reactive functional groups in the deposited material with the articles. Each article adhered together may comprise a deposited material (e.g., a 3D-printed article may be built up by successively depositing layers of materials comprising reactive functional groups on top of each other), some of the articles adhered together may comprise a deposited material (e.g., a deposited material may adhere another deposited material to which it is adjacent to a textile on which they are both disposed), or none of the articles adhered together may comprise a deposited material. In some cases, the articles adhered together may have different physical or chemical properties (e.g., different values of toughness, different values of Young's modulus, different values of other properties described below).

In some embodiments, reactive functional groups that are configured to react with an article to which a deposited material (e.g., a material deposited by a print head such as a nozzle, a material printed by a 3D-printing process, a component of a 3D-printed article, a portion of a 3D-printed article) is adjacent (e.g., an article of footwear, a component of an article of footwear, a material deposited by a print head such as a nozzle, a material printed by a 3D-printing process, a component of a 3D-printed article, a portion of a 3D-printed article) may also be configured to react with other reactive functional groups in the deposited material. Reaction between two complementary sets of functional groups within the deposited material may comprise curing of the material. As the deposited material cures, the number of reactive functional groups within the deposited material may be reduced and the deposited material may become less reactive with any articles to which it is adjacent. In certain cases, tuning the curing time of the deposited material by varying one or more parameters (e.g., temperature at which the deposited material is held after deposition, composition of the deposited material) may be advantageous because it may allow for tuning of the reactivity of the deposited material as a function of time. For example, the curing time may be tuned so that the deposited material is adhesive upon deposition and upon further addition of a second article to the deposited material, but is no longer adhesive during further manufacturing steps and/or when an article of which the deposited material is a part of is in use.

A variety of suitable reactive functional groups and molecules comprising reactive functional groups may be included in a deposited material (e.g., a material deposited by a print head such as a nozzle, a material printed by a 3D-printing process, a component of a 3D-printed article, a portion of a 3D-printed article). In some embodiments, a deposited material may comprise reactive functional groups that are alcohol groups and reactive functional groups that are isocyanate groups, and the alcohol groups and isocyanate groups may react to form a polyurethane. In some embodiments, a deposited material may comprise reactive functional groups that are amine groups and reactive functional groups that are isocyanate groups, and the alcohol groups and isocyanate groups may react to form polyureas. In some embodiments, a deposited material may comprise reactive functional groups that are amine groups, reactive functional groups that are alcohol groups, and reactive functional groups that are isocyanate groups; in this case, the isocyanate groups may react with the amine groups and the alcohol groups to form a polyurethane/polyurea hybrid formulation). Further non-limiting examples of suitable reactive functional groups include hydroxyl groups, isocyanate groups, amine groups, glycidyl groups, epoxide groups such as cycloaliphatic epoxy groups, vinyl groups, methyl groups, siloxane groups, catalysts such as platinum catalysts and tin catalysts, acrylate groups, methacrylate groups, and photoinitiators.

The deposited material may have a composition as described elsewhere herein (e.g., compositions for polyurethanes described elsewhere herein). In some embodiments, the deposited material may comprise one or more of a polyurethane, a polyurea, a polyurethane/polyurea hybrid formulation, a silicone, and an epoxy. Further non-limiting examples of molecules comprising reactive functional groups are also listed below. Non-limiting examples of suitable comprising molecules comprising alcohol groups include difunctional hydroxyl compounds such as 1,4-butanediol, hydroquinone bis(2-hydroxylethyl) ether, neopentyl glycol, diethanolamine, and methyldiethanolamine; trifunctional hydroxyl compounds such as trimethylolpropane, 1,2,6-hexanetriol, and triethanolamine; tetrafunctional hydroxyl compounds such as pentaerythritol; and polyols such as polyether polyols, polyester polyols, polytetrahydrofuran, polycaprolactone polyols, polycarbonate polyols, and polytetramethylene ether glycol-based polyols. Non-limiting examples of suitable molecules comprising amine groups include difunctional amine compounds such as diethyltoluenediamine and dimethylthiotoluenediamine. Non-limiting examples of suitable molecules comprising isocyanate groups include methylenebis(phenyl isocyanate), toluene diisocyanate, hexamethylene diisocyanate, naphthalene diisocyanate, methylene bis-cyclohexylisocyanate, and isophorone diisocyanate. Other types of reactive functional groups, and other types of molecules comprising reactive functional groups are also possible.

In some embodiments, a deposited material (e.g., a material deposited by a print head such as a nozzle, a material printed by a 3D-printing process, a component of a 3D-printed article, a portion of a 3D-printed article) may be cured (and/or configured to be cured) at room temperature. In some embodiments, the deposited material may be cured (and/or configured to be cured) at a temperature above room temperature. The deposited material may be configured (and/or configured to be) to be cured at a temperature of greater than or equal to 70° C., greater than or equal to 80° C., greater than or equal to 90° C., or greater than or equal to 100° C. The deposited material may be cured (and/or configured to be cured) at a temperature of less than or equal to 110° C., less than or equal to 100° C., less than or equal to 90° C., or less than or equal to 80° C. Combinations of the above-referenced ranges are also possible (e.g., greater than or equal to 70° C. and less than or equal to 110° C.). Other ranges are also possible.

A deposited material (e.g., a material deposited by a print head such as a nozzle, a material printed by a 3D-printing process, a component of a 3D-printed article, a portion of a 3D-printed article) may be cured (and/or configured to be fully cured) over any suitable period of time. In some embodiments, the deposited material is fully cured (and/or configured to be cured) over a period of time of greater than or equal to 15 minutes, greater than or equal to 30 minutes, greater than or equal to one hour, greater than or equal to two hours, greater than or equal to four hours, greater than or equal to eight hours, greater than or equal to 12 hours, greater than or equal to 20 hours, greater than or equal to 24 hours, greater than or equal to 36 hours, greater than or equal to 48 hours, greater than or equal to three days, greater than or equal to four days, greater than or equal to five days, or greater than or equal to six days. In some embodiments, the deposited material is fully cured (and/or configured to be fully cured) over a period of time of less than or equal to one week, less than or equal to six days, less than or equal to five days, less than or equal to four days, less than or equal to three days, less than or equal to 48 hours, less than or equal to 36 hours, less than or equal to 24 hours, less than or equal to 20 hours, less than or equal to 12 hours, less than or equal to eight hours, less than or equal to four hours, less than or equal to two hours, less than or equal to one hour, less than or equal to 30 minutes, or less than or equal to 15 minutes. Combinations of the above-referenced ranges are also possible (e.g., greater than or equal to 15 minutes and less than or equal to one week, greater than or equal to two hours and less than or equal to 20 hours, or greater than or equal to 24 hours and less than or equal to one week). Other ranges are also possible. In general, higher curing temperatures result in faster reactions between reactive functional groups. This may cause the time over which the deposited material is fully cured (and/or configured to be fully cured) to decrease. For example, a material may be fully cured over a period of time of greater than or equal to a few days and less than or equal to one week when cured at room temperature but may be fully cured over a period of time of greater than or equal to two hours and less than or equal to 20 hours at a temperature of greater than or equal to 70° C. and less than or equal to 110° C.

A deposited material (e.g., a material deposited by a print head such as a nozzle, a material printed by a 3D-printing process, a component of a 3D-printed article, a portion of a 3D-printed article) may be deposited at any degree of curing. In some embodiments, the deposited material is at least 25% uncured upon deposition, at least 30% uncured upon deposition, at least 40% uncured upon deposition, at least 50% uncured upon deposition, at least 60% uncured upon deposition, at least 70% uncured upon deposition, at least 80% uncured upon deposition, or at least 90% uncured upon deposition. In some embodiments, the deposited material is at most 95% uncured upon deposition, at most 90% uncured upon deposition, at most 80% uncured upon deposition, at most 70% uncured upon deposition, at most 60% uncured upon deposition, at most 50% uncured upon deposition, or at most 40% uncured upon deposition. Combinations of the above-referenced ranges are also possible (e.g., at least 30% uncured upon deposition and at most 95% uncured upon deposition). Other ranges are also possible.

In some embodiments, an article (e.g., an article of footwear, a component of an article of footwear) is positioned adjacent to a deposited material (e.g., deposited on the deposited material, deposited adjacent the deposited material, laminated to the deposited material, etc.) before it has fully cured. The article may be positioned adjacent to the deposited material (e.g., a material deposited by a print head such as a nozzle, a material printed by a 3D-printing process, a component of a 3D-printed article, a portion of a 3D-printed article) before at least 25% of the deposited material has cured, before at least 30% of the deposited material has cured, before at least 40% of the deposited material has cured, before at least 50% of the deposited material has cured, or before at least 60% of the deposited material has cured. The article may be positioned adjacent to the deposited material before at most 70% of the deposited material has cured, before at most 60% of the deposited material has cured, before at most 50% of the deposited material has cured, before at most 40% of the deposited material has cured, or before at most 30% of the deposited material has cured. Combinations of the above-referenced ranges are also possible (e.g., before at least 25% of the deposited material has cured and before at most 70% of the deposited material has cured). Other ranges are also possible.

As described above, certain embodiments may relate to 3D-printed articles that are foams (e.g., 3D-printed articles that are closed-cell foams). In some embodiments, the 3D-printed article may be a foam with an average pore size of greater than or equal to 1 micron, greater than or equal to 2 microns, greater than or equal to 5 microns, greater than or equal to 10 microns, greater than or equal to 20 microns, greater than or equal to 50 microns, greater than or equal to 100 microns, greater than or equal to 200 microns, greater than or equal to 500 microns, greater than or equal to 1 mm, greater than or equal to 2 mm, or greater than or equal to 5 mm. In some embodiments, the 3D-printed article may be a foam with an average pore size of less than or equal to 10 mm, less than or equal to 5 mm, less than or equal to 2 mm, less than or equal to 1 mm, less than or equal to 500 microns, less than or equal to 200 microns, less than or equal to 100 microns, less than or equal to 50 microns, less than or equal to 20 microns, less than or equal to 10 microns, less than or equal to 5 microns, or less than or equal to 2 microns. Combinations of the above-referenced ranges are also possible (e.g., greater than or equal to 1 micron and less than or equal to 10 mm). The average pore size of the foam may be measured by microscopy or other suitable techniques.

In certain embodiments, a 3D-printed article that is a foam comprises at least one portion (e.g., a 3D-printed article that is a closed-cell foams which comprises at least a first portion). In some embodiments, the first portion of the 3D-printed article may have an average pore size of greater than or equal to 1 micron, greater than or equal to 2 microns, greater than or equal to 5 microns, greater than or equal to 10 microns, greater than or equal to 20 microns, greater than or equal to 50 microns, greater than or equal to 100 microns, greater than or equal to 200 microns, greater than or equal to 500 microns, greater than or equal to 1 mm, greater than or equal to 2 mm, or greater than or equal to 5 mm. In some embodiments, the first portion of the 3D-printed article may have an average pore size of less than or equal to 10 mm, less than or equal to 5 mm, less than or equal to 2 mm, less than or equal to 1 mm, less than or equal to 500 microns, less than or equal to 200 microns, less than or equal to 100 microns, less than or equal to 50 microns, less than or equal to 20 microns, less than or equal to 10 microns, less than or equal to 5 microns, or less than or equal to 2 microns. Combinations of the above-referenced ranges are also possible (e.g., greater than or equal to 1 micron and less than or equal to 10 mm).

In certain embodiments, a 3D-printed article that is a foam comprises at least two portions (e.g., a 3D-printed article that is a closed-cell foams which comprises at least a first portion and a second portion). In some embodiments, the second portion of the 3D-printed article may have an average pore size of greater than or equal to 1 micron, greater than or equal to 2 microns, greater than or equal to 5 microns, greater than or equal to 10 microns, greater than or equal to 20 microns, greater than or equal to 50 microns, greater than or equal to 100 microns, greater than or equal to 200 microns, greater than or equal to 500 microns, greater than or equal to 1 mm, greater than or equal to 2 mm, or greater than or equal to 5 mm. In some embodiments, the second portion of the 3D-printed article may have an average pore size of less than or equal to 10 mm, less than or equal to 5 mm, less than or equal to 2 mm, less than or equal to 1 mm, less than or equal to 500 microns, less than or equal to 200 microns, less than or equal to 100 microns, less than or equal to 50 microns, less than or equal to 20 microns, less than or equal to 10 microns, less than or equal to 5 microns, or less than or equal to 2 microns. Combinations of the above-referenced ranges are also possible (e.g., greater than or equal to 1 micron and less than or equal to 10 mm).

In certain embodiments, a 3D-printed article that is a foam comprises at least two portions (e.g., a 3D-printed article that is a closed-cell foams which comprises at least a first portion and a second portion). In some embodiments, a ratio of the average pore size of the second portion of the 3D-printed article to the first portion of the 3D-printed article may be greater than or equal to 1.05, greater than or equal to 1.1, greater than or equal to 1.2, greater than or equal to 1.3, greater than or equal to 1.5, greater than or equal to 2, or greater than or equal to 5. In some embodiments, a ratio of the average pore size of the second portion of the 3D-printed article to the first portion of the 3D-printed article may be less than or equal to 10, less than or equal to 5, less than or equal to 2, less than or equal to 1.5, less than or equal to 1.3, less than or equal to 1.2, or less than or equal to 1.1. Combinations of the above-referenced ranges are also possible (e.g., greater than or equal to 1.05 and less than or equal to 10). Other ranges are also possible. In some embodiments, the average pore size may vary smoothly from the average pore size of the first portion to the average pore size of the second portion.

In some embodiments, a 3D-printed article may not be a foam (i.e., it may lack pores) or it may comprise at least one portion that lacks pores.

In some embodiments, a 3D-printed article (e.g., a 3D-printed articles that is a foam such as a closed-cell foam, a 3D-printed article that is not a foam, a 3D-printed article that comprises an elastomer) may have an average density of greater than or equal to 0.1 pounds per cubic foot, greater than or equal to 0.2 pounds per cubic foot, greater than or equal to 0.5 pounds per cubic foot, greater than or equal to 1 pound per cubic foot, greater than or equal to 2 pounds per cubic foot, greater than or equal to 5 pounds per cubic foot, greater than or equal to 10 pounds per cubic foot, or greater than or equal to 20 pounds per cubic foot. In some embodiments, a 3D-printed article may have an average density of less than or equal to 30 pounds per cubic foot, less than or equal to 20 pounds per cubic foot, less than or equal to 10 pounds per cubic foot, less than or equal to 5 pounds per cubic foot, less than or equal to 2 pounds per cubic foot, less than or equal to 1 pound per cubic foot, less than or equal to 0.5 pounds per cubic foot, or less than or equal to 0.2 pounds per cubic foot. Combinations of the above-referenced ranges are also possible (e.g., greater than or equal to 0.2 pounds per cubic foot and less than or equal to 30 pounds per cubic foot). Other densities and other ranges are also possible.

In certain embodiments, a 3D-printed article that comprises at least one portion (e.g., a 3D-printed article that is a closed-cell foam which comprises at least a first portion, a 3D-printed article that is not a foam which comprises at least a first portion, a 3D-printed article that comprises an elastomer and which comprises at least a first portion) may have an average density of the first portion of greater than or equal to 0.1 pounds per cubic foot, greater than or equal to 0.2 pounds per cubic foot, greater than or equal to 0.5 pounds per cubic foot, greater than or equal to 1 pound per cubic foot, greater than or equal to 2 pounds per cubic foot, greater than or equal to 5 pounds per cubic foot, greater than or equal to 10 pounds per cubic foot, or greater than or equal to 20 pounds per cubic foot. In some embodiments, a 3D-printed article may have an average density in the first portion of less than or equal to 30 pounds per cubic foot, less than or equal to 20 pounds per cubic foot, less than or equal to 10 pounds per cubic foot, less than or equal to 5 pounds per cubic foot, less than or equal to 2 pounds per cubic foot, less than or equal to 1 pound per cubic foot, less than or equal to 0.5 pounds per cubic foot, or less than or equal to 0.2 pounds per cubic foot. Combinations of the above-referenced ranges are also possible (e.g., greater than or equal to 0.2 pounds per cubic foot and less than or equal to 30 pounds per cubic foot). Other densities and other ranges are also possible.

In certain embodiments, a 3D-printed article that comprises at least two portions (e.g., a 3D-printed article that is a closed-cell foams which comprises at least a first portion and a second portion, a 3D-printed article that is not a foam which comprises at least a first portion and a second portion, a 3D-printed article that comprises an elastomer and comprises at least a first portion and a second portion) may have an average density of the second portion of greater than or equal to 0.1 pounds per cubic foot, greater than or equal to 0.2 pounds per cubic foot, greater than or equal to 0.5 pounds per cubic foot, greater than or equal to 1 pound per cubic foot, greater than or equal to 2 pounds per cubic foot, greater than or equal to 5 pounds per cubic foot, greater than or equal to 10 pounds per cubic foot, or greater than or equal to 20 pounds per cubic foot. In some embodiments, a 3D-printed article may have an average density in the second portion of less than or equal to 30 pounds per cubic foot, less than or equal to 20 pounds per cubic foot, less than or equal to 10 pounds per cubic foot, less than or equal to 5 pounds per cubic foot, less than or equal to 2 pounds per cubic foot, less than or equal to 1 pound per cubic foot, less than or equal to 0.5 pounds per cubic foot, or less than or equal to 0.2 pounds per cubic foot. Combinations of the above-referenced ranges are also possible (e.g., greater than or equal to 0.2 pounds per cubic foot and less than or equal to 30 pounds per cubic foot). Other densities and other ranges are also possible.

In certain embodiments, a 3D-printed article that comprises at least two portions (e.g., a 3D-printed article that is a closed-cell foams which comprises at least a first portion and a second portion, a 3D-printed article that is not a foam and comprises at least a first portion and a second portion, a 3D-printed article that comprises an elastomer and comprises at least a first portion and a second portion) may have a ratio of the average density of the second portion of the to the first portion of greater than or equal to 1.05, greater than or equal to 1.1, greater than or equal to 1.2, greater than or equal to 1.3, greater than or equal to 1.5, greater than or equal to 2, or greater than or equal to 5. In some embodiments, a ratio of the average density of the second portion of the 3D-printed article to the first portion of the 3D-printed article may be less than or equal to 10, less than or equal to 5, less than or equal to 2, less than or equal to 1.5, less than or equal to 1.3, less than or equal to 1.2, or less than or equal to 1.1. Combinations of the above-referenced ranges are also possible (e.g., greater than or equal to 1.05 and less than or equal to 10). Other densities and other ranges are also possible.

In some embodiments, the first portion may be positioned above the second portion, and the first portion may have a lower density than the second portion. For example, the first portion may comprise an upper surface of the 3D-printed article (or may be adjacent or directly adjacent to the upper surface of the 3D-printed article) and the second portion may be positioned in approximately the center of the 3D-printed article and the density at, adjacent to, or directly adjacent to the upper surface of the 3D-printed article may be lower than the density in the center of the 3D-printed article. In certain cases, the 3D-printed article may be a foam with a lower density at an upper surface than in the center. 3D-printed articles with this structure may be formed, in some cases, by exposing a 3D-printed article comprising a blowing agent to heat at its upper surface. If the heat exposure is sufficiently rapid, the surface and, possibly, portions of the 3D-printed article adjacent to the surface may foam to a greater extent than portions of the 3D-printed article further from the surface (e.g., portions in the center of the 3D-printed article). These portions may have a larger pore volume, and so may be less dense.

In some embodiments, the average density may vary smoothly from the average density of the first portion to the average density of the second portion. In some embodiments, the average density may vary in a way that would be challenging to obtain by other fabrication techniques. As a non-limiting example, the average density of a foam heel cup may vary from a minimum at the center of the heel cup to maxima at the external surfaces of the heel cup. This may be achieved by forming a higher density of pores in the center of the heel cup and decreasing densities of pores as distance from the center of the heel cup increases. In some embodiments, a heel cup with this design may be softest and lightest in the center and harder and heavier around the edges.

In certain embodiments, a 3D-printed article that comprises at least two portions (e.g., a 3D-printed article that is a closed-cell foam which comprises at least a first portion and a second portion, a 3D-printed article that is not a foam which comprises at least a first portion and a second portion, a 3D-printed article that comprises an elastomer and comprises at least a first portion and a second portion) may have a ratio of the average stiffness of the second portion of the to the first portion of greater than or equal to 1.05, greater than or equal to 1.1, greater than or equal to 1.2, greater than or equal to 1.3, greater than or equal to 1.5, greater than or equal to 2, or greater than or equal to 5. In some embodiments, a ratio of the average stiffness of the second portion of the 3D-printed article to the first portion of the 3D-printed article may be less than or equal to 10, less than or equal to 5, less than or equal to 2, less than or equal to 1.5, less than or equal to 1.3, less than or equal to 1.2, or less than or equal to 1.1. Combinations of the above-referenced ranges are also possible (e.g., greater than or equal to 1.05 and less than or equal to 10). Other ranges are also possible. In some embodiments, the average stiffness may vary smoothly from the average stiffness of the first portion to the average stiffness of the second portion. References to stiffness herein should be understood to refer to any, some, or all of the following types of stiffnesses, unless otherwise specified: compressive stiffness (i.e., compressive elastic modulus), tensile elastic modulus (i.e., Young's modulus), modulus at 100% strain, modulus at 300% strain, and flexural modulus.

In some embodiments, the first portion may comprise a region of the 3D-printed article of footwear that would be positioned adjacent to a toe, the second portion of the 3D-printed article of footwear may be a heel, and the ratio of the average stiffness of the first portion to the second portion may be greater than or equal to 5 and less than or equal to 10.

In certain embodiments, a 3D-printed article that comprises at least two portions (e.g., a 3D-printed article that is a closed-cell foam which comprises at least a first portion and a second portion, a 3D-printed article that is not a foam which comprises at least a first portion and a second portion, a 3D-printed article that comprises an elastomer and comprises at least a first portion and a second portion) may have a ratio of the average stiffness of the solid components of the second portion to the average stiffness of the solid components of first portion of greater than or equal to 1.05, greater than or equal to 1.1, greater than or equal to 1.2, greater than or equal to 1.3, greater than or equal to 1.5, greater than or equal to 2, greater than or equal to 5, greater than or equal to 10, greater than or equal to 20, greater than or equal to 50, greater than or equal to 100, greater than or equal to 200, greater than or equal to 500, greater than or equal to 1,000, greater than or equal to 2,000, greater than or equal to 5,000, or greater than or equal to 10,000. In some embodiments, a ratio of the average stiffness of the solid components of the second portion of the 3D-printed article to the first portion of the 3D-printed article may be less than or equal to 20,000, less than or equal to 10,000, less than or equal to 5,000, less than or equal to 2,000, less than or equal to 1,000, less than or equal to 500, less than or equal to 200, less than or equal to 100, less than or equal to 50, less than or equal to 20, or less than or equal to 10, less than or equal to 5, less than or equal to 2, less than or equal to 1.5, less than or equal to 1.3, less than or equal to 1.2, or less than or equal to 1.1. Combinations of the above-referenced ranges are also possible (e.g., greater than or equal to 1.05 and less than or equal to 20,000, or greater than or equal to 1.05 and less than or equal to 10). Other ranges are also possible. In some embodiments, the average stiffness of the solid components of may vary smoothly from the average stiffness of the solid components of first portion to the average stiffness of the solid components of second portion.

In certain embodiments, a 3D-printed article that comprises at least two portions (e.g., a 3D-printed article that is a closed-cell foam which comprises at least a first portion and a second portion, a 3D-printed article that is not a foam which comprises at least a first portion and a second portion, a 3D-printed article that comprises an elastomer and comprises at least a first portion and a second portion) may have a ratio of the average stiffness anisotropy of the second portion to the stiffness anisotropy of first portion of greater than or equal to 1.05, greater than or equal to 1.1, greater than or equal to 1.2, greater than or equal to 1.3, greater than or equal to 1.5, greater than or equal to 2, greater than or equal to 5, greater than or equal to 10, greater than or equal to 20, greater than or equal to 50, greater than or equal to 100, greater than or equal to 200, greater than or equal to 500, greater than or equal to 1,000, greater than or equal to 2,000, greater than or equal to 5,000, or greater than or equal to 10,000. In some embodiments, a ratio of the average stiffness anisotropy of the second portion of the 3D-printed article to the first portion of the 3D-printed article may be less than or equal to 20,000, less than or equal to 10,000, less than or equal to 5,000, less than or equal to 2,000, less than or equal to 1,000, less than or equal to 500, less than or equal to 200, less than or equal to 100, less than or equal to 50, less than or equal to 20, or less than or equal to 10, less than or equal to 5, less than or equal to 2, less than or equal to 1.5, less than or equal to 1.3, less than or equal to 1.2, or less than or equal to 1.1. Combinations of the above-referenced ranges are also possible (e.g., greater than or equal to 1.05 and less than or equal to 20,000, or greater than or equal to 1.05 and less than or equal to 10). Other ranges are also possible. In some embodiments, the average stiffness of the solid components of may vary smoothly from the average stiffness of the solid components of first portion to the average stiffness of the solid components of second portion.

In some embodiments, a 3D-printed article (e.g., a 3D-printed articles that is a foam such as a closed-cell foam, a 3D-printed article that is not a foam, a 3D-printed article that comprises an elastomer) may have an average hardness (e.g., an average Shore A hardness, an average Shore D hardness, an average Asker C hardness, an average microindentation hardness) of greater than or equal to 1, greater than or equal to 2, greater than or equal to 5, greater than or equal to 10, greater than or equal to 15, greater than or equal to 20, greater than or equal to 25, greater than or equal to 30, greater than or equal to 35, greater than or equal to 40, greater than or equal to 45, greater than or equal to 50, greater than or equal to 55, greater than or equal to 60, greater than or equal to 65, greater than or equal to 70, greater than or equal to 75, greater than or equal to 80, greater than or equal to 90, or greater than or equal to 100. In some embodiments, a 3D-printed article may have an average hardness (e.g., an average Shore A hardness, an average Shore D hardness, an average Asker C hardness, an average microindentation hardness) of less than or equal to 125, less than or equal to 100, less than or equal to 90, less than or equal to 80, less than or equal to 75, less than or equal to 70, less than or equal to 65, less than or equal to 60, less than or equal to 55, less than or equal to 50, less than or equal to 45, less than or equal to 40, less than or equal to 35, less than or equal to 30, less than or equal to 25, less than or equal to 20, less than or equal to 15, less than or equal to 10, less than or equal to 5, or less than or equal to 2. Combinations of the above-referenced ranges are also possible (e.g., greater than or equal to 1 and less than or equal to 125). The average hardness may be measured by the procedure described in ASTM E384. The Shore A hardness of the 3D-printed article may instead be measured, for example, by using a Shore A durometer.

In certain embodiments, a 3D-printed article that comprises at least one portion (e.g., a 3D-printed article that is a closed-cell foam which comprises at least a first portion, a 3D-printed article that is not a foam and comprises at least a first portion, a 3D-printed article that comprises an elastomer and at least a first portion) may have an average hardness (e.g., an average Shore A hardness, an average Shore D hardness, an average Asker C hardness, an average microindentation hardness) of the first portion of greater than or equal to 5, greater than or equal to 10, greater than or equal to 15, greater than or equal to 20, greater than or equal to 25, greater than or equal to 30, greater than or equal to 35, greater than or equal to 40, greater than or equal to 45, greater than or equal to 50, greater than or equal to 55, greater than or equal to 60, greater than or equal to 65, or greater than or equal to 70. In some embodiments, a 3D-printed article may have an average hardness (e.g., an average Shore A hardness, an average Shore D hardness, an average Asker C hardness, an average microindentation hardness) of the first portion of less than or equal to 75, less than or equal to 70, less than or equal to 65, less than or equal to 60, less than or equal to 55, less than or equal to 50, less than or equal to 45, less than or equal to 40, less than or equal to 35, less than or equal to 30, less than or equal to 25, less than or equal to 20, less than or equal to 15, or less than or equal to 10. Combinations of the above-referenced ranges are also possible.

In certain embodiments, a 3D-printed article that comprises at least two portions (e.g., a 3D-printed article that is a closed-cell foam which comprises at least a first portion and a second portion, a 3D-printed article that is not a foam which comprises at least a first portion and a second portion, a 3D-printed article that comprises an elastomer and comprises at least a first portion and a second portion) may have an average hardness (e.g., an average Shore A hardness, an average Shore D hardness, an average Asker C hardness, an average microindentation hardness) of the second portion of greater than or equal to 1, greater than or equal to 2, greater than or equal to 5, greater than or equal to 10, greater than or equal to 15, greater than or equal to 20, greater than or equal to 25, greater than or equal to 30, greater than or equal to 35, greater than or equal to 40, greater than or equal to 45, greater than or equal to 50, greater than or equal to 55, greater than or equal to 60, greater than or equal to 65, or greater than or equal to 70. In some embodiments, a 3D-printed article may have an average hardness (e.g., an average Shore A hardness, an average Shore D hardness, an average Asker C hardness, an average microindentation hardness) of the second portion of less than or equal to 75, less than or equal to 70, less than or equal to 65, less than or equal to 60, less than or equal to 55, less than or equal to 50, less than or equal to 45, less than or equal to 40, less than or equal to 35, less than or equal to 30, less than or equal to 25, less than or equal to 20, less than or equal to 15, less than or equal to 10, less than or equal to 5, or less than or equal to 2. Combinations of the above-referenced ranges are also possible (e.g., greater than or equal to 1 and less than or equal to 75). Other ranges are also possible.

In certain embodiments, a 3D-printed article that comprises at least two portions (e.g., a 3D-printed article that is a closed-cell foam which comprises at least a first portion and a second portion, a 3D-printed article that is not a foam which comprises at least a first portion and a second portion, a 3D-printed article that comprises an elastomer and comprises at least a first portion and a second portion) may have a ratio of the average hardness (e.g., average Shore A hardness, average Shore D hardness, average Asker C hardness, average microindentation hardness) of the second portion of the to the first portion of greater than or equal to 1.05, greater than or equal to 1.1, greater than or equal to 1.2, greater than or equal to 1.3, greater than or equal to 1.5, greater than or equal to 2, or greater than or equal to 5. In some embodiments, a ratio of the average hardness (e.g., average Shore A hardness, average Shore D hardness, average Asker C hardness, average microindentation hardness) of the second portion of the 3D-printed article to the first portion of the 3D-printed article may be less than or equal to 10, less than or equal to 5, less than or equal to 2, less than or equal to 1.5, less than or equal to 1.3, less than or equal to 1.2, or less than or equal to 1.1. Combinations of the above-referenced ranges are also possible (e.g., greater than or equal to 1.05 and less than or equal to 10). Other ranges are also possible. In some embodiments, the average hardness (e.g., average Shore A hardness, average Shore D hardness, average Asker C hardness, average microindentation hardness) may vary smoothly from the average hardness (e.g., average Shore A hardness, average Shore D hardness, average Asker C hardness, average microindentation hardness) of the first portion to the average hardness (e.g., average Shore A hardness, average Shore D hardness, average Asker C hardness, average microindentation hardness) of the second portion.

In certain embodiments, a 3D-printed article that comprises at least two portions (e.g., a 3D-printed article that is a closed-cell foam which comprises at least a first portion and a second portion, a 3D-printed article that is not a foam and comprises at least a first portion and a second portion, a 3D-printed article that comprises an elastomer and comprises at least a first portion and a second portion) may have a ratio of the average cross-link density of the second portion of the to the first portion of greater than or equal to 1.05, greater than or equal to 1.1, greater than or equal to 1.2, greater than or equal to 1.3, greater than or equal to 1.5, greater than or equal to 2, or greater than or equal to 5. In some embodiments, a ratio of the average cross-link density of the second portion of the 3D-printed article to the first portion of the 3D-printed article may be less than or equal to 10, less than or equal to 5, less than or equal to 2, less than or equal to 1.5, less than or equal to 1.3, less than or equal to 1.2, or less than or equal to 1.1. Combinations of the above-referenced ranges are also possible (e.g., greater than or equal to 1.05 and less than or equal to 10). Other ranges are also possible. In some embodiments, the average cross-link density may vary smoothly from the average cross-link density of the first portion to the average density of the second portion.

In certain embodiments in which a 3D-printed article that comprises at least one portion (e.g., a 3D-printed article that is a closed-cell foam which comprises at least a first portion, a 3D-printed article that is not a foam and comprises at least one portion, a 3D-printed article that comprises an elastomer and comprises at least one portion), the color in the first portion may be one or more of red, orange, yellow, green, blue, indigo violet, pink, purple, white, black, gray, etc. The color may be a pastel color, a royal color, a light color, a dark color, or any other color. The color may have any suitable saturation.

In certain embodiments in which a 3D-printed article that comprises at least one portion (e.g., a 3D-printed article that is a closed-cell foam which comprises at least a first portion and a second portion, a 3D-printed article that is not a foam and comprises at least a first portion and a second portion, a 3D-printed article that comprises an elastomer and comprises at least a first portion and a second portion), the color in the second portion may be one or more of red, orange, yellow, green, blue, indigo violet, pink, purple, white, black, gray, etc. The color may be a pastel color, a royal color, a light color, a dark color, or any other color. The color may have any suitable saturation.

In some embodiments, a 3D-printed article (e.g., a 3D-printed articles that is a foam such as a closed-cell foam, a 3D-printed article that is not a foam, a 3D-printed article that comprises an elastomer) may have an average filler content of greater than or equal to 0.1 wt %, greater than or equal to 0.2 wt %, greater than or equal to 0.5 wt %, greater than or equal to 1 wt %, greater than or equal to 2 wt %, greater than or equal to 5 wt %, or greater than or equal to 10 wt %. In some embodiments, a 3D-printed article may have an average filler content of less than or equal to 20 wt %, less than or equal to 10 wt %, less than or equal to 5 wt %, less than or equal to 2 wt %, less than or equal to 1 wt %, less than or equal to 0.5 wt %, or less than or equal to 0.2 wt %. Combinations of the above-referenced ranges are also possible (e.g., greater than or equal to 0.1 wt % and less than or equal to 20 wt %). Other ranges are also possible.

In certain embodiments, a 3D-printed article that comprises at least one portion (e.g., a 3D-printed article that is a closed-cell foam which comprises at least a first portion, a 3D-printed article that is not a foam and comprises at least a first portion, a 3D-printed article that comprises an elastomer and at least a first portion) may have an average filler content of the first portion of greater than or equal to 0.1 wt %, greater than or equal to 0.2 wt %, greater than or equal to 0.5 wt %, greater than or equal to 1 wt %, greater than or equal to 2 wt %, greater than or equal to 5 wt %, greater than or equal to 10 wt %, greater than or equal to 20 wt %, greater than or equal to 50 wt %, or greater than or equal to 80 wt %. In some embodiments, the first portion may have an average filler content of less than or equal to 90 wt %, less than or equal to 80 wt %, less than or equal to 50 wt %, less than or equal to 20 wt %, less than or equal to 10 wt %, less than or equal to 5 wt %, less than or equal to 2 wt %, less than or equal to 1 wt %, less than or equal to 0.5 wt %, or less than or equal to 0.2 wt %. Combinations of the above-referenced ranges are also possible (e.g., greater than or equal to 0.1 wt % and less than or equal to 90 wt %, or greater than or equal to 0.1 wt % and less than or equal to 20 wt %). Other ranges are also possible.

In certain embodiments, a 3D-printed article that comprises at least two portions (e.g., a 3D-printed article that is a closed-cell foam which comprises at least a first portion and a second portion, a 3D-printed article that is not a foam and comprises at least a first portion and a second portion, a 3D-printed article that comprises an elastomer and at least a first portion and a second portion) may have an average filler content of the second portion of greater than or equal to 0.1 wt %, greater than or equal to 0.2 wt %, greater than or equal to 0.5 wt %, greater than or equal to 1 wt %, greater than or equal to 2 wt %, greater than or equal to 5 wt %, greater than or equal to 10 wt %, greater than or equal to 20 wt %, greater than or equal to 50 wt %, or greater than or equal to 80 wt %. In some embodiments, the second portion may have an average filler content of less than or equal to 90 wt %, less than or equal to 80 wt %, less than or equal to 50 wt %, less than or equal to 20 wt %, less than or equal to 10 wt %, less than or equal to 5 wt %, less than or equal to 2 wt %, less than or equal to 1 wt %, less than or equal to 0.5 wt %, or less than or equal to 0.2 wt %. Combinations of the above-referenced ranges are also possible (e.g., greater than or equal to 0.1 wt % and less than or equal to 90 wt %, or greater than or equal to 0.1 wt % and less than or equal to 20 wt %). Other ranges are also possible.

In certain embodiments, a 3D-printed article that comprises at least two portions (e.g., a 3D-printed article that is a closed-cell foams which comprises at least a first portion and a second portion, a 3D-printed article that is not a foam and comprises at least a first portion and a second portion, a 3D-printed article that comprises an elastomer and at least a first portion and a second portion) may have a ratio of the average filler content of the second portion to the first portion of greater than or equal to 1.05, greater than or equal to 1.1, greater than or equal to 1.2, greater than or equal to 1.3, greater than or equal to 1.5, greater than or equal to 2, greater than or equal to 5, greater than or equal to 10, greater than or equal to 20, greater than or equal to 50, greater than or equal to 100, greater than or equal to 200, greater than or equal to 500, greater than or equal to 1,000, greater than or equal to 2,000, greater than or equal to 5,000, greater than or equal to 10,000, greater than or equal to 20,000, greater than or equal to 50,000, or greater than or equal to 100,000. In some embodiments, a ratio of the average filler content of the second portion of the 3D-printed article to the first portion of the 3D-printed article may be less than or equal to 200,000, less than or equal to 100,000, less than or equal to 50,000, less than or equal to 20,000, less than or equal to 10,000, less than or equal to 5,000, less than or equal to 2,000, less than or equal to 1,000, less than or equal to 500, less than or equal to 200, less than or equal to 100, less than or equal to 50, less than or equal to 20, less than or equal to 10, less than or equal to 5, less than or equal to 2, less than or equal to 1.5, less than or equal to 1.3, less than or equal to 1.2, or less than or equal to 1.1. Combinations of the above-referenced ranges are also possible (e.g., greater than or equal to 1.05 and less than or equal to 200,000, or greater than or equal to 1.05 and less than or equal to 10). Other ranges are also possible. In some embodiments, the average filler content may vary smoothly from the average filler content of the first portion to the average filler content of the second portion. In some embodiments, a 3D-printed article may comprise one portion including filler and one portion lacking filler or containing minimal filler. The portion(s) including filler may include up to 95 wt % filler.

In some embodiments, a 3D-printed article (e.g., a 3D-printed articles that is a foam such as a closed-cell foam, a 3D-printed article that is not a foam, a 3D-printed article that comprises an elastomer) may have an average opacity of greater than or equal to 0, greater than or equal to 0.1, greater than or equal to 0.2, greater than or equal to 0.5, greater than or equal to 1, greater than or equal to 2, or greater than or equal to 5. In some embodiments, the 3D-printed article may have an average opacity of less than or equal to 10, less than or equal to 5, less than or equal to 2, less than or equal to 1, less than or equal to 0.5 less than or equal to 0.2, or less than or equal to 0.1. Combinations of the above-referenced ranges are also possible (e.g., greater than or equal to 0 and less than or equal to 10). Other ranges are also possible. The average opacity of the 3D-printed article may be measured by UV-vis spectroscopy.

In certain embodiments, a 3D-printed article that comprises at least one portion (e.g., a 3D-printed article that is a closed-cell foam which comprises at least a first portion, a 3D-printed article that is not a foam and comprises at least a first portion, a 3D-printed article that comprises an elastomer and at least a first portion) may have an average opacity of the first portion of greater than or equal to 0, greater than or equal to 0.1, greater than or equal to 0.2, greater than or equal to 0.5, greater than or equal to 1, greater than or equal to 2, greater than or equal to 5, greater than or equal to 10, greater than or equal to 20, greater than or equal to 50, greater than or equal to 100, greater than or equal to 200, greater than or equal to 500, or greater than or equal to 1,000. In some embodiments, the first portion of the 3D-printed article may have an average opacity of less than or equal to 2,000, less than or equal to 1,000, less than or equal to 500, less than or equal to 200, less than or equal to 100, less than or equal to 50, less than or equal to 20, less than or equal to 10, less than or equal to 5, less than or equal to 2, less than or equal to 1, less than or equal to 0.5 less than or equal to 0.2, or less than or equal to 0.1. Combinations of the above-referenced ranges are also possible (e.g., greater than or equal to 0 and less than or equal to 2,000, or greater than or equal to 0 and less than or equal to 10). Other ranges are also possible.

In certain embodiments, a 3D-printed article that comprises at least two portions (e.g., a 3D-printed article that is a closed-cell foams which comprises at least a first portion and a second portion, a 3D-printed article that is not a foam and comprises at least a first portion and a second portion, a 3D-printed article that comprises an elastomer and comprises at least a first portion and a second portion) may have an average opacity of the second portion of greater than or equal to 0, greater than or equal to 0.1, greater than or equal to 0.2, greater than or equal to 0.5, greater than or equal to 1, greater than or equal to 2, or greater than or equal to 5. In some embodiments, the second portion of the 3D-printed article may have an average opacity of less than or equal to 10, less than or equal to 5, less than or equal to 2, less than or equal to 1, less than or equal to 0.5 less than or equal to 0.2, or less than or equal to 0.1. Combinations of the above-referenced ranges are also possible (e.g., greater than or equal to 0 and less than or equal to 10). Other ranges are also possible.

In certain embodiments, a 3D-printed article that comprises at least two portions (e.g., a 3D-printed article that is a closed-cell foams which comprises at least a first portion and a second portion, a 3D-printed article that is not a foam and comprises at least a first portion and a second portion, a 3D-printed article that comprises an elastomer and comprises at least a first portion and a second portion) may have a ratio of the average opacity of the second portion to the first portion of greater than or equal to 1.05, greater than or equal to 1.1, greater than or equal to 1.2, greater than or equal to 1.3, greater than or equal to 1.5, greater than or equal to 2, greater than or equal to 5, greater than or equal to 10, greater than or equal to 20, greater than or equal to 50, greater than or equal to 100, greater than or equal to 200, greater than or equal to 1,000, greater than or equal to 2,000, greater than or equal to 5,000, greater than or equal to 10,000, greater than or equal to 20,000, greater than or equal to 50,000, or greater than or equal to 100,000. In some embodiments, a ratio of the average opacity of the second portion of the 3D-printed article to the first portion of the 3D-printed article may be less than or equal to 200,000, less than or equal to 100,000, less than or equal to 50,000, less than or equal to 20,000, less than or equal to 10,000, less than or equal to 5,000, less than or equal to 2,000, less than or equal to 1,000, less than or equal to 500, less than or equal to 200, less than or equal to 100, less than or equal to 50, less than or equal to 20, less than or equal to 10, less than or equal to 5, less than or equal to 2, less than or equal to 1.5, less than or equal to 1.3, less than or equal to 1.2, or less than or equal to 1.1. Combinations of the above-referenced ranges are also possible (e.g., greater than or equal to 1.05 and less than or equal to 200,000, or greater than or equal to 1.05 and less than or equal to 10). Other ranges are also possible. In some embodiments, the average opacity may vary smoothly from the average opacity of the first portion to the average opacity of the second portion.

In certain embodiments, a 3D-printed article that comprises at least two portions (e.g., a 3D-printed article that is a closed-cell foams which comprises at least a first portion and a second portion, a 3D-printed article that is not a foam and comprises at least a first portion and a second portion, a 3D-printed article that comprises an elastomer and comprises at least a first portion and a second portion) may have a ratio of the average electrical conductivity of the second portion to the first portion of greater than or equal to 1.05, greater than or equal to 1.1, greater than or equal to 1.2, greater than or equal to 1.3, greater than or equal to 1.5, greater than or equal to 2, greater than or equal to 5, greater than or equal to 10, greater than or equal to 20, greater than or equal to 50, greater than or equal to 100, greater than or equal to $10^3$, greater than or equal to $10^4$, greater than or equal to $10^5$, greater than or equal to $10^6$, or greater than or equal to $10^7$. In some embodiments, a ratio of the average electrical conductivity of the second portion of the 3D-printed article to the first portion of the 3D-printed article may be less than or equal to $10^8$, less than or equal to $10^7$, less than or equal to $10^6$, less than or equal to $10^5$, less than or equal to $10^4$, less than or equal to $10^3$, less than or equal to 100, less than or equal to 50, less than or equal to 20, less than or equal to 10, less than or equal to 5, less than or equal to 2, less than or equal to 1.5, less than or equal to 1.3, less than or equal to 1.2, or less than or equal to 1.1. Combinations of the above-referenced ranges are also possible (e.g., greater than or equal to 1.05 and less than or equal to $10^8$, or greater than or equal to 1.05 and less than or equal to 10). Other ranges are also possible. In some embodiments, the average electrical conductivity may vary smoothly from the average electrical conductivity of the first portion to the average electrical conductivity of the second portion.

In certain embodiments, a 3D-printed article that comprises at least two portions (e.g., a 3D-printed article that is a closed-cell foams which comprises at least a first portion and a second portion, a 3D-printed article that is not a foam and comprises at least a first portion and a second portion, a 3D-printed article that comprises an elastomer and comprises at least a first portion and a second portion) may have a ratio of the average thermal conductivity of the second portion to the first portion of greater than or equal to 1.05, greater than or equal to 1.1, greater than or equal to 1.2, greater than or equal to 1.3, greater than or equal to 1.5, greater than or equal to 2, greater than or equal to 5, greater than or equal to 10, greater than or equal to 20, greater than or equal to 50, greater than or equal to 100, greater than or equal to $10^3$, greater than or equal to $10^4$, greater than or equal to $10^5$, greater than or equal to $10^6$, or greater than or equal to $10^7$. In some embodiments, a ratio of the average thermal conductivity of the second portion of the 3D-printed article to the first portion of the 3D-printed article may be less than or equal to $10^8$, less than or equal to $10^7$, less than or equal to $10^6$, less than or equal to $10^5$, less than or equal to $10^4$, less than or equal to $10^3$, less than or equal to 100, less than or equal to 50, less than or equal to 20, less than or equal to 10, less than or equal to 5, less than or equal to 2, less than or equal to 1.5, less than or equal to 1.3, less than or equal to 1.2, or less than or equal to 1.1. Combinations of the above-referenced ranges are also possible (e.g., greater than or equal to 1.05 and less than or equal to $10^8$, or greater than or equal to 1.05 and less than or equal to 10). Other ranges are also possible. In some embodiments, the average thermal conductivity may vary smoothly from the average thermal conductivity of the first portion to the average thermal conductivity of the second portion.

In certain embodiments, a 3D-printed article that comprises at least two portions (e.g., a 3D-printed article that is a closed-cell foams which comprises at least a first portion and a second portion, a 3D-printed article that is not a foam and comprises at least a first portion and a second portion, a 3D-printed article that comprises an elastomer and at least a first portion and a second portion) may have a ratio of the average breathability of the second portion to the first portion of greater than or equal to 1.05, greater than or equal to 1.1, greater than or equal to 1.2, greater than or equal to 1.3, greater than or equal to 1.5, greater than or equal to 2, or greater than or equal to 5. In some embodiments, a ratio of the average breathability of the second portion of the 3D-printed article to the first portion of the 3D-printed article may be less than or equal to 10, less than or equal to 5, less than or equal to 2, less than or equal to 1.5, less than or equal to 1.3, less than or equal to 1.2, or less than or equal to 1.1. Combinations of the above-referenced ranges are also possible (e.g., greater than or equal to 1.05 and less than or equal to 10). Other ranges are also possible. In some embodiments, the average breathability may vary smoothly from the average breathability of the first portion to the average breathability of the second portion.

In certain embodiments, a 3D-printed article that comprises at least two portions (e.g., a 3D-printed article that is a closed-cell foams which comprises at least a first portion and a second portion, a 3D-printed article that is not a foam and comprises at least a first portion and a second portion, a 3D-printed article that comprises an elastomer and at least a first portion and a second portion) may have a ratio of the average abrasion resistance of the second portion to the first portion of greater than or equal to 1.05, greater than or equal to 1.1, greater than or equal to 1.2, greater than or equal to 1.3, greater than or equal to 1.5, greater than or equal to 2, or greater than or equal to 5. In some embodiments, a ratio of the average abrasion resistance of the second portion of the 3D-printed article to the first portion of the 3D-printed article may be less than or equal to 10, less than or equal to 5, less than or equal to 2, less than or equal to 1.5, less than or equal to 1.3, less than or equal to 1.2, or less than or equal to 1.1. Combinations of the above-referenced ranges are also possible (e.g., greater than or equal to 1.05 and less than or equal to 10). Other ranges are also possible. In some embodiments, the average abrasion resistance may vary smoothly from the average abrasion resistance of the first portion to the average abrasion resistance of the second portion. The average abrasion resistance of a 3D-printed article or a portion thereof may be determined, for example, in accordance with ASTM standard D1630.

In certain embodiments, a 3D-printed article that comprises at least two portions (e.g., a 3D-printed article that is a closed-cell foams which comprises at least a first portion and a second portion, a 3D-printed article that is not a foam and comprises at least a first portion and a second portion, a 3D-printed article that comprises an elastomer and at least a first portion and a second portion) may have a ratio of the average flexural modulus of the second portion to the first portion of greater than or equal to 1.05, greater than or equal to 1.1, greater than or equal to 1.2, greater than or equal to 1.3, greater than or equal to 1.5, greater than or equal to 2, greater than or equal to 5, greater than or equal to 10, greater than or equal to 20, greater than or equal to 50, greater than or equal to 100, greater than or equal to 200, greater than or equal to 500, greater than or equal to 1,000, greater than or equal to 2,000, greater than or equal to 5,000, or greater than or equal to 10,000. In some embodiments, a ratio of the average flexural modulus of the second portion of the 3D-printed article to the first portion of the 3D-printed article may be less than or equal to 20,000, less than or equal to 10,000, less than or equal to 5,000, less than or equal to 2,000, less than or equal to 1,000, less than or equal to 500, less than or equal to 200, less than or equal to 100, less than or equal to 50, less than or equal to 20, less than or equal to 10, less than or equal to 5, less than or equal to 2, less than or equal to 1.5, less than or equal to 1.3, less than or equal to 1.2, or less than or equal to 1.1. Combinations of the above-referenced ranges are also possible (e.g., greater than or equal to 1.05 and less than or equal to 20,000, or greater than or equal to 1.05 and less than or equal to 10). Other ranges are also possible. In some embodiments, the average flexural modulus may vary smoothly from the average flexural modulus of the first portion to the average flexural modulus of the second portion.

In some embodiments, a 3D-printed article (e.g., a 3D-printed articles that is a foam such as a closed-cell foam, a 3D-printed article that is not a foam, a 3D-printed article that comprises an elastomer) may have an average elastic modulus (i.e., Young's modulus) of greater than or equal to 1 kPa, greater than or equal to 10 kPa, greater than or equal to 100 kPa, greater than or equal to 1 MPa, greater than or equal to 10 MPa, greater than or equal to 0.1 GPa, greater than or equal to 0.2 GPa, greater than or equal to 0.5 GPa, greater than or equal to 1 GPa, greater than or equal to 2 GPa, greater than or equal to 5 GPa. In some embodiments, the 3D-printed article may have an average elastic modulus of less than or equal to 10 GPa, less than or equal to 5 GPa, less than or equal to 2 GPa, less than or equal to 1 GPa, less than or equal to 0.5 GPa, less than or equal to 0.2 GPa, less than or equal to 0.1 GPa, less than or equal to 10 MPa, less than or equal to 1 MPa, less than or equal to 100 kPa, or less than or equal to 10 kPa. Combinations of the above-referenced ranges are also possible (e.g., greater than or equal to 1 kPa and less than or equal to 10 GPa, or greater than or equal to 0.1 GPa and less than or equal to 10 GPa). Other ranges are also possible. Other ranges are also possible. The average elastic modulus of the 3D-printed article may be measured by tensile testing or other suitable techniques known to those of ordinary skill in the art.

In certain embodiments, a 3D-printed article that comprises at least one portion (e.g., a 3D-printed article that is a closed-cell foam which comprises at least a first portion, a 3D-printed article that is not a foam and comprises at least a first portion, a 3D-printed article that comprises an elastomer and at least a first portion) may have an average elastic modulus (i.e., Young's modulus) of the first portion of greater than or equal to 1 kPa, greater than or equal to 10 kPa, greater than or equal to 100 kPa, greater than or equal to 1 MPa, greater than or equal to 10 MPa, greater than or equal to 0.1 GPa, greater than or equal to 0.2 GPa, greater than or equal to 0.5 GPa, greater than or equal to 1 GPa, greater than or equal to 2 GPa, greater than or equal to 5 GPa. In some embodiments, the first portion of the 3D-printed article may have an average elastic modulus of less than or equal to 10 GPa, less than or equal to 5 GPa, less than or equal to 2 GPa, less than or equal to 1 GPa, less than or equal to 0.5 GPa, less than or equal to 0.2 GPa, less than or equal to 0.1 GPa, less than or equal to 10 MPa, less than or equal to 1 MPa, less than or equal to 100 kPa, or less than or equal to 10 kPa. Combinations of the above-referenced ranges are also possible (e.g., greater than or equal to 1 kPa and less than or equal to 10 GPa, or greater than or equal to 0.1 GPa and less than or equal to 10 GPa). Other ranges are also possible.

In certain embodiments, a 3D-printed article that comprises at least two portions (e.g., a 3D-printed article that is a closed-cell foams which comprises at least a first portion and a second portion, a 3D-printed article that is not a foam and comprises at least a first portion and a second portion, a 3D-printed article that comprises an elastomer and comprises at least a first portion and a second portion) may have an average elastic modulus (i.e., Young's modulus) of the second portion of greater than or equal to 1 kPa, greater than or equal to 10 kPa, greater than or equal to 100 kPa, greater than or equal to 1 MPa, greater than or equal to 10 MPa, greater than or equal to 0.1 GPa, greater than or equal to 0.2 GPa, greater than or equal to 0.5 GPa, greater than or equal to 1 GPa, greater than or equal to 2 GPa, greater than or equal to 5 GPa. In some embodiments, the second portion of the 3D-printed article may have an average elastic modulus of less than or equal to 10 GPa, less than or equal to 5 GPa, less than or equal to 2 GPa, less than or equal to 1 GPa, less than or equal to 0.5 GPa, less than or equal to 0.2 GPa, less than or equal to 0.1 GPa, less than or equal to 10 MPa, less than or equal to 1 MPa, less than or equal to 100 kPa, or less than or equal to 10 kPa. Combinations of the above-referenced ranges are also possible (e.g., greater than or equal to 1 kPa and less than or equal to 10 GPa, or greater than or equal to 0.1 GPa and less than or equal to 10 GPa). Other ranges are also possible.

In certain embodiments, a 3D-printed article that comprises at least two portions (e.g., a 3D-printed article that is a closed-cell foams which comprises at least a first portion and a second portion, a 3D-printed article that is not a foam and comprises at least a first portion and a second portion, a 3D-printed article that comprises an elastomer and comprises at least a first portion and a second portion) may have a ratio of the average elastic modulus (i.e., Young's modulus) of the second portion to the first portion of greater than or equal to 1.05, greater than or equal to 1.1, greater than or equal to 1.2, greater than or equal to 1.3, greater than or equal to 1.5, greater than or equal to 2, or greater than or equal to 5. In some embodiments, a ratio of the average elastic modulus of the second portion of the 3D-printed article to the first portion of the 3D-printed article may be less than or equal to 10, less than or equal to 5, less than or equal to 2, less than or equal to 1.5, less than or equal to 1.3, less than or equal to 1.2, or less than or equal to 1.1. Combinations of the above-referenced ranges are also possible (e.g., greater than or equal to 1.05 and less than or equal to 10). Other ranges are also possible. In some embodiments, the average elastic modulus may vary smoothly from the average elastic modulus of the first portion to the average elastic modulus of the second portion.

In certain embodiments, a 3D-printed article that comprises at least two portions (e.g., a 3D-printed article that is a closed-cell foams which comprises at least a first portion and a second portion, a 3D-printed article that is not a foam and comprises at least a first portion and a second portion, a 3D-printed article that comprises an elastomer and at least a first portion and a second portion) may have a ratio of the average surface roughness of the second portion to the first portion of greater than or equal to 1.05, greater than or equal to 1.1, greater than or equal to 1.2, greater than or equal to 1.3, greater than or equal to 1.5, greater than or equal to 2, greater than or equal to 5, greater than or equal to 10, greater than or equal to 20, greater than or equal to 50, greater than or equal to 100, greater than or equal to 200, greater than or equal to 500, or greater than or equal to 1,000. In some embodiments, a ratio of the average surface roughness of the second portion of the 3D-printed article to the first portion of the 3D-printed article may be less than or equal to 2,000, less than or equal to 1,000, less than or equal to 500, less than or equal to 200, less than or equal to 100, less than or equal to 50, less than or equal to 20, less than or equal to 10, less than or equal to 5, less than or equal to 2, less than or equal to 1.5, less than or equal to 1.3, less than or equal to 1.2, or less than or equal to 1.1. Combinations of the above-referenced ranges are also possible (e.g., greater than or equal to 1.05 and less than or equal to 2,000, or greater than or equal to 1.05 and less than or equal to 10). Other ranges are also possible. In some embodiments, the average surface roughness may vary smoothly from the average surface roughness of the first portion to the average surface roughness of the second portion.

In certain embodiments, a 3D-printed article that comprises at least two portions (e.g., a 3D-printed article that is a closed-cell foams which comprises at least a first portion and a second portion, a 3D-printed article that is not a foam and comprises at least a first portion and a second portion, a 3D-printed article that comprises an elastomer and at least a first portion and a second portion) may have a ratio of the average reflectivity of the second portion to the first portion of greater than or equal to 1.05, greater than or equal to 1.1, greater than or equal to 1.2, greater than or equal to 1.3, greater than or equal to 1.5, greater than or equal to 2, greater than or equal to 5, greater than or equal to 10, greater than or equal to 20, greater than or equal to 50, or greater than or equal to 100. In some embodiments, a ratio of the average reflectivity of the second portion of the 3D-printed article to the first portion of the 3D-printed article may be less than or equal to 200, less than or equal to 100, less than or equal to 50, less than or equal to 20, less than or equal to 10, less than or equal to 5, less than or equal to 2, less than or equal to 1.5, less than or equal to 1.3, less than or equal to 1.2, or less than or equal to 1.1. Combinations of the above-referenced ranges are also possible (e.g., greater than or equal to 1.05 and less than or equal to 200, or greater than or equal to 1.05 and less than or equal to 10). Other ranges are also possible. In some embodiments, the average reflectivity may vary smoothly from the average reflectivity of the first portion to the average reflectivity of the second portion.

In certain embodiments, a 3D-printed article that comprises at least two portions (e.g., a 3D-printed article that is a closed-cell foams which comprises at least a first portion and a second portion, a 3D-printed article that is not a foam and comprises at least a first portion and a second portion, a 3D-printed article that comprises an elastomer and at least a first portion and a second portion) may have a ratio of the average strength of the second portion to the first portion of greater than or equal to 1.05, greater than or equal to 1.1, greater than or equal to 1.2, greater than or equal to 1.3, greater than or equal to 1.5, greater than or equal to 2, greater than or equal to 5, greater than or equal to 10, greater than or equal to 20, greater than or equal to 50, or greater than or equal to 100. In some embodiments, a ratio of the average strength of the second portion of the 3D-printed article to the first portion of the 3D-printed article may be less than or equal to 200, less than or equal to 100, less than or equal to 50, less than or equal to 20, less than or equal to 10, less than or equal to 5, less than or equal to 2, less than or equal to 1.5, less than or equal to 1.3, less than or equal to 1.2, or less than or equal to 1.1. Combinations of the above-referenced ranges are also possible (e.g., greater than or equal to 1.05 and less than or equal to 200, or greater than or equal to 1.05 and less than or equal to 10). Other ranges are also possible. In some embodiments, the average strength may vary smoothly from the average strength of the first portion to the average strength of the second portion.

In certain embodiments, a 3D-printed article that comprises at least two portions (e.g., a 3D-printed article that is a closed-cell foams which comprises at least a first portion and a second portion, a 3D-printed article that is not a foam and comprises at least a first portion and a second portion, a 3D-printed article that comprises an elastomer and at least a first portion and a second portion) may have a ratio of the average dimensional change upon heat activation of the second portion to the first portion of greater than or equal to 1.05, greater than or equal to 1.1, greater than or equal to 1.2, greater than or equal to 1.3, greater than or equal to 1.5, greater than or equal to 2, greater than or equal to 5, greater than or equal to 10, greater than or equal to 20, greater than or equal to 50, greater than or equal to 100, greater than or equal to 200, greater than or equal to 500, or greater than or equal to 1,000. In some embodiments, a ratio of the average dimensional change upon heat activation of the second portion of the 3D-printed article to the first portion of the 3D-printed article may be less than or equal to 2,000, less than or equal to 1,000, less than or equal to 500, less than or equal to 200, less than or equal to 100, less than or equal to 50, less than or equal to 20, less than or equal to 10, less than or equal to 5, less than or equal to 2, less than or equal to 1.5, less than or equal to 1.3, less than or equal to 1.2, or less than or equal to 1.1. Combinations of the above-referenced ranges are also possible (e.g., greater than or equal to 1.05 and less than or equal to 2,000, or greater than or equal to 1.05 and less than or equal to 10). Other ranges are also possible. In some embodiments, the average dimensional change upon heat activation may vary smoothly from the average dimensional change upon heat activation of the first portion to the average dimensional change upon heat activation of the second portion.

In some embodiments, a 3D-printed article (e.g., a 3D-printed articles that is a foam such as a closed-cell foam, a 3D-printed article that is not a foam, a 3D-printed article that comprises an elastomer) may comprise one or more macrovoids with an average cross-sectional diameter of greater than or equal to 0.5 mm, greater than or equal to 1 mm, greater than or equal to 2 mm, greater than or equal to 5 mm, greater than or equal to 1 cm, greater than or equal to 2 cm, greater than or equal to 5 cm, or greater than or equal to 10 cm. In some embodiments, the 3D-printed article may comprise one or more macrovoids with an average cross-sectional diameter of less than or equal to 20 cm, less than or equal to 10 cm, less than or equal to 5 cm, less than or equal to 2 cm, less than or equal to 1 cm, less than or equal to 5 mm, less than or equal to 2 mm, or less than or equal to 1 mm. Combinations of the above-referenced ranges are also possible (e.g., greater than or equal to 0.5 mm and less than or equal to 5 cm). Other ranges are also possible. In some embodiments, one or more macrovoids may span the entire length of the shoe. The average cross-sectional diameter of the macrovoids may be measured by microscopy or other suitable techniques. In some embodiments, one or more of the macrovoids may not have an intersecting interface. As would be known to one of ordinary skill in the art, an intersecting interface is a junction between a first material formed by a first molding process and a second material formed by a second molding process onto the first material. Intersecting interfaces typically comprise at least one of the following features: a lack of chemical bonds across the interface (e.g., a lack of covalent bonds across the interface), one or more defects, one or more characteristic markings indicating lamination (e.g., one or more hemispherical indentations), non-uniform density across the interface, and/or conformations of the polymer chains at the interface which are different than the polymer chain conformations in the bulk material on either side of the interface. In some cases, intersecting interfaces show a step change in one or more of the following properties across the interface: average pore size, density, stiffness, Shore A hardness, degree of cross-linking, chemical composition, color, abrasion resistance, thermal conductivity, electrical conductivity, stiffness anisotropy, elastic modulus, flexural modulus, filler content, opacity, conductivity, and breathability.

In some embodiments, a 3D-printed article may comprise one or more portions that are open cell foams and of which air makes up a significant wt %. For instance, a 3D-printed article may comprise one or more portions that are open-cell foams and for which air makes up greater than 5 wt % of the open-cell foam, greater than or equal to 10 wt % of the open-cell foam, greater than or equal to 15 wt % of the open-cell foam, greater than or equal to 20 wt % of the open-cell foam, greater than or equal to 25 wt % of the open-cell foam, greater than or equal to 30 wt % of the open-cell foam, greater than or equal to 35 wt % of the open-cell foam, greater than or equal to 40 wt % of the open-cell foam, or greater than or equal to 45 wt % of the open-cell foam. In some embodiments, a 3D-printed article may comprise one or more portions that are open-cell foams and for which air makes up less than or equal to 50 wt % of the open-cell foam, less than or equal to 45 wt % of the open-cell foam, less than or equal to 40 wt % of the open-cell foam, less than or equal to 35 wt % of the open-cell foam, less than or equal to 30 wt % of the open-cell foam, less than or equal to 25 wt % of the open-cell foam, less than or equal to 20 wt % of the open-cell foam, less than or equal to 15 wt % of the open-cell foam, or less than or equal to 10 wt % of the open-cell foam. Combinations of the above-referenced ranges are also possible (e.g., greater than or equal to 30 wt % and less than or equal to 50 wt %). Other ranges are also possible. The wt % of air within an open-cell foam may be determined by optical microscopy of sections of the open cell foam followed by image analysis of the sections to determine the volume fraction of the open-cell foam that is air. Then, knowledge of the density of air and the density of the non-air components of the foam may be used to determine the wt % of the open-cell foam that is air.

In some embodiments, a 3D-printed article may comprise one or more portions that are open-cell foams and for which air makes up greater than 5 vol % of the open-cell foam, greater than or equal to 10 vol % of the open-cell foam, greater than or equal to 15 vol % of the open-cell foam, greater than or equal to 20 vol % of the open-cell foam, greater than or equal to 25 vol % of the open-cell foam, greater than or equal to 30 vol % of the open-cell foam, greater than or equal to 35 vol % of the open-cell foam, greater than or equal to 40 vol % of the open-cell foam, or greater than or equal to 45 vol % of the open-cell foam. In some embodiments, a 3D-printed article may comprise one or more portions that are open-cell foams and for which air makes up less than or equal to 50 vol % of the open-cell foam, less than or equal to 45 vol % of the open-cell foam, less than or equal to 40 vol % of the open-cell foam, less than or equal to 35 vol % of the open-cell foam, less than or equal to 30 vol % of the open-cell foam, less than or equal to 25 vol % of the open-cell foam, less than or equal to 20 vol % of the open-cell foam, less than or equal to 15 vol % of the open-cell foam, or less than or equal to 10 vol % of the open-cell foam. Combinations of the above-referenced ranges are also possible (e.g., greater than or equal to 30 vol % and less than or equal to 50 vol %). Other ranges are also possible. The vol % of air within an open-cell foam may be determined by optical microscopy of sections of the open cell foam followed by image analysis of the sections to determine the volume fraction of the open-cell foam that is air.

In various aspects, a variety of 3D-printed articles such as foams and/or elastomers as well as other products may be produced. For example, in some embodiments, a foam may be created from a foam precursor comprising a polymer and a cross-linking agent. The polymer can comprise polyol with a low or high average molecular weight such as a low number average molecular weight diol, high number-average molecular weight diol, a low number-average molecular weight triol, a high number-average molecular weight triol, or a high number-average molecular weight monol. For instance, a high molecular weight monol, diol, or triol may have a number-average molecular weight of greater than 300, 400, or 500, while a low molecular weight monol, diol, or triol may have a number-average molecular weight less than 300, 400, or 500. For instance, the monol, diol, or triol may have a number-average molecular weight less than 500 or greater than 6000. In some embodiments, a polyol may comprise more than three alcohol groups. For instance, it may comprise four, five, six, seven, or more alcohol groups. Other examples of polymers include, but are not limited to, polyureas, polyurethane/polyurea hybrid formulations, epoxies, acrylates, cyanate esters, silicones, polyesters, phenolics, hydrogels, or the like.

In one set of embodiments, the polymer includes a polyurethane, e.g., formed by reacting the polyol with an isocyanate. The polyol may be any suitable polyhydroxy compound. For example, the polyol may be a hydroxy-terminated ester, ether or carbonate diol. Non-limiting examples of polyalkylene ether glycols include polyethylene ether glycols, poly-1,2-propylene ether glycols, polytetramethylene ether glycols, poly-1,2-dimethylethylene ether glycols, poly-1,2-butylene ether glycol, and polydecamethylene ether glycols. Examples of polyester polyols include polybutylene adipate and polyethylene terephthalate. Examples of polycarbonate diols include polytetramethylene carbonate diol, polypentamethylene carbonate diol, polyhexamethylene carbonate diol, polyhexane-1,6-carbonate diol and poly (1,6-hexyl-1,2-ethyl carbonate)diol. However, many other suitable polyhydroxy compounds can also be used depending upon the desired application. Any suitable polyol, polythiol or polyamine or mixture thereof that is suitable for this purpose may be used, such as, for example, mixed diols comprising a 2,4-dialkyl-1,5-pentanediol and a 2,2-dialkyl-1,3-propanediol. Specific examples of 2,4-dialkyl-1,5-pentanediols include 2,4-dimethyl-1,5-pentanediol, 2-ethyl-4-methyl-1,5-pentanediol, 2-methyl-4-propyl-1,5-pentanediol, 2,4-diethyl-1,5-pentanediol, 2-ethyl-4-propyl-1,5-pentanediol, 2,4-dipropyl-1,5-pentanediol, 2-isoptopyl-4-methyl-1,5-pentanediol, 2-ethyl-4-isoptopyl-1,5-pentanediol, 2,4-diisopropyl-1,5-pentanediol, 2-isopropyl-4-propyl-1,5-pentanediol, 2,4-dibutyl-1,5-pentanediol, 2,4-dipentyl-1,5-pentanediol, 2,4-dihexyl-1,5-pentanediol, and the like. Specific examples of 2,2-dialkyl-1,3-propanediols include 2,2-dipentyl-1,3-propanediol, 2,2-dihexyl-1,3-propanediol and the like.

In some cases, longer-chain or higher molecular weight polyols may be used to produce relatively softer materials because they have more polyol relative to isocyanate. In some cases, the isocyanate can also be underindexed compared to the number of reactive sites on the polyol to make a softer foam that behaves less elastically.

The cross-linking agent, if present, can comprise an isocyanate in some cases, and/or an isocyanate prepolymer. An isocyanate may have more than one functional isocyanate group per molecule and may be any suitable aromatic, aliphatic or cycloaliphatic polyisocyanate. In some cases, the isocyanate is a diisocyanate. One non-limiting example is an organic diisocyanate. Additional examples of organic diisocyanates include 4,4'-diisocyanatodiphenylmethane, 2,4'-diisocyanatodiphenylmethane, isophorone diisocyanate, p-phenylene diisocyanate, 2,6-toluene diisocyanate, polyphenyl polymethylene polyisocyanate, 1,3-bis(isocyanatomethyl)cyclohexane, 1,4-diisocyanatocyclohexane, 1,6-hexamethylene diisocyanate, 1,5-naphthalene diisocyanate, 3,3'-dimethyl-4,4'-biphenyl diisocyanate, 4,4'-diisocyanatodicyclohexylmethane, 2,4'-diisocyanatodicyclohexylmethane, and 2,4-toluene diisocyanate, or combinations thereof.

In some embodiments, the foam precursor comprises a polyurethane, a polyurea, a polyurethane/polyurea hybrid formulation, an epoxy, a silicone, a cyanoacrylate, an adhesive, a cyanate ester, a polyester, a polyimide, a phenolic, or another suitable material.

In some cases, an isocyanate prepolymer may be used, e.g., in addition to and/or instead of an isocyanate. For instance, where two isocyanates are added to the ends of a polyol, so it still has functionality of two, but with a higher molecular weight.

In addition, it should be understood that a cross-linking agent is not required. For example, in some embodiments a polymer (such as a thermoplastic polyurethane) can be mixed with fillers and frothed in a nozzle or a mixing chamber, then cooled upon exiting to form a foam.

In some embodiments, no foam is produced and a cross-linked product results. As a non-limiting example, a high number-average molecular weight diol may be mixed with an isocyanate (e.g., a diisocyanate, or other isocyanates described herein) and deposited onto a substrate, e.g., to produce a thermoplastic elastomer. In another embodiment, a low number-average molecular weight diol can be mixed with an isocyanate and deposited onto a substrate, e.g., to produce a rigid thermoplastic. In yet another embodiment, a high number-average molecular weight diol and a high number-average molecular weight triol can be mixed, and then the polyol mixture mixed with an isocyanate and deposited onto a substrate, e.g., to produce a flexible thermosetting elastomer with high resiliency.

In some embodiments, the foam precursor comprises a polyurethane, a polyurea, a polyurethane/polyurea hybrid formulation, an epoxy, a silicone, a cyanoacrylate, an adhesive, a cyanate ester, a polyester, a polyimide, a phenolic, or another suitable material. In another embodiment, the foam precursor could comprise a decomposeable binder and particles which stabilize the bubble interface. In some cases, the particles may be sintered at the bubble interface to form a non-polymeric foam, e.g., a metal foam or a ceramic foam.

As a non-limiting example of a foam, in one embodiment, a high number-average molecular weight diol and a high number-average molecular weight triol are mixed with a surfactant, and then the polyol-surfactant mixture is mixed with an isocyanate. The foam precursor that results may be mixed with nitrogen, or another gas, and deposited onto a substrate. Mixing techniques such as those discussed herein, e.g., involving more than one stage of mixing or combining fluids, may be used.

As yet another non-limiting example, a high number-average molecular weight diol and a high number-average molecular weight monol are mixed with a surfactant, and then the polyol-surfactant mixture is mixed with an isocyanate. Mixing techniques such as those discussed herein, e.g., involving more than one stage of mixing or combining fluids, may be used. The foam precursor that results is then mixed with nitrogen, or another gas, and deposited onto a substrate. This may be used to produce memory foam, or other types of foam.

As still additional non-limiting examples of foams, a high number-average molecular weight diol may be mixed with an isocyanate and deposited onto a substrate, e.g., to produce a thermoplastic elastomer. In another embodiment, a low number-average molecular weight diol can be mixed with an isocyanate and deposited onto a substrate, e.g., to produce a rigid thermoplastic. In yet another embodiment, a high number-average molecular weight diol and a high number-average molecular weight triol can be mixed, and then the polyol mixture mixed with an isocyanate and deposited onto a substrate, e.g., to produce a flexible thermosetting elastomer with high resiliency.

As mentioned, in some embodiments, a surfactant may be used to produce a foam or 3D-printed article as discussed herein. For example, a surfactant may be used to facilitate the introduction of gas into a fluid, the subsequent stability of the bubbles that are formed, and/or the rheology of the foam can be altered or tuned using various surfactants, or altering their concentration, etc. For instance, in one embodiment, a surfactant may be used that comprises a first moiety with affinity for an air-liquid interface, e.g., to facilitate the introduction of gas into a fluid. Non-limiting examples of such surfactants include sodium stearate, sodium dodecyl sulfate, or silicone-based surfactants such as silicone polyethers. Many such surfactants are widely available commercially.

In some cases, a surfactant molecule may be used that allows production of a high yield stress foam, e.g., a foam able to maintain its shape after deposition on a substrate. For example, in some embodiments, a high-yield stress inducing surfactant is one where the end of the surfactant is more soluble in the continuous phase of the foam precursor. The surfactant may have a relatively high molecular weight, and may be non-ionic. Non-limiting examples of such surfactants include surfactants with a molecular weight of greater than or equal to 1500 Daltons. In addition, in some cases, a surfactant molecule may be used that allows production of a low yield stress foam, e.g., a foam unable to maintain its shape after deposition on a substrate, and the foam may conform to the material around it after deposition. In some embodiments, a low-yield stress inducing surfactant is one where the soluble end may be either charged or have a relatively low molecular weight, e.g., such that no entanglement between the surfactants is able to occur. Non-limiting examples of such surfactants include surfactants with a low molecular weight (e.g., silicone surfactants with a low molecular weight). In addition, in some embodiments, different types of surfactants may be used, e.g., a high yield and a low yield surfactant. By varying the relative concentration of the first surfactant and the second surfactant in the mixture, the resultant foam may vary from high yield stress to low or no yield stress, depending upon the application.

In certain embodiments, the first surfactant molecule may comprise a first moiety having an affinity for an air-liquid interface, and a second moiety that comprises a long chain that is soluble in the foam precursor and prone to entanglement. The second surfactant molecule may, in some instances, comprise the same first moiety with affinity for the air-liquid interface, and a second moiety that comprises a short chain with an electrostatic charge. The electrostatic charge may in some cases be such that the cells of the closed-cell foam repel one another and can move freely past one another.

The cell-forming agent, in some embodiments, forms cells within a material such as a foam or froth, as discussed herein. For instance, the cell-forming agent may comprise water, and/or a gaseous material such as air, carbon dioxide, nitrogen, butane, or the like. In some embodiments, the cell-forming agent comprises a blowing agent that is added that can generate a gas, e.g., chemically. The microfluidic printing nozzle may disperse the blowing agent in a material, for example a polymer, to form a two-phase mixture of blowing agent cells within the polymer. Thus, the blowing agent can comprise a material that decomposes into a gas, e.g., at an elevated temperature. In some cases, the blowing agent can comprise a gaseous material that maintains its liquid state by cooling or pressurization, and reverts to its native gas state when the pressure is released or the blowing agent is heated, which may cause the blowing agent to form a gas, e.g., to cause cells in the polymer to grow. The resultant gas may become trapped in cells within the material, e.g., forming a foam.

As an example of use of a blowing agent, the microfluidic printing nozzle may mix a blowing agent with a material, for example a polymer, which may undergo a chemical reaction to cause the formation of a gas. Chemical blowing agents may include generally low molecular weight organic compounds that decompose to release a gas such as nitrogen, carbon dioxide, or carbon monoxide. Non-limiting examples of chemical blowing agents include azo compounds such as azodicarbonamide. In some cases the blowing agent may be activated on the surface (e.g., selectively on the surface) to produce a rough surface finish, to impart a matte finish, and/or to provide a soft feel to the exterior of a print.

Thus, in some cases, the blowing agent can be used to create foams that form cells by induction by heat, removal of pressure, or the like. For instance, a foam precursor can be mixed with the blowing agent and deposited onto a substrate or part without forming cells until after deposition, or with only partially formed cells. Thus, in some cases, material may be deposited onto a substrate, then induced to form cells by heating the material. After deposition, cells may form within the product, e.g., by induction by heat, removal of pressure, or the like.

As a non-limiting example, a foam may comprise an ethylene-vinyl acetate foam, which may be utilized in footwear or other applications. A blowing agent may be selected such that the agent phase-transitions or decomposes into a gas at a temperature at which the polymer containing it is soft and malleable. In some cases, the polymer can expand (e.g., expand up to 200%) as the cells form without rupturing, and the resultant material can be cooled to form a solid foam.

As another example, water may be used in another embodiment as a cell-forming agent. For example, a water-blown foam may be produced where water and a surfactant are mixed into a polymer component, which is then mixed with isocyanate or another substance able to react with water, e.g., to produce a gas. For instance, as a non-limiting example, isocyanate chemically reacts with both water and polyol; the reaction of polyols with isocyanate may be used to increase the molecular weight of the polymer, e.g., to form a polyurethane, while the reaction of water with the isocyanate forms carbon dioxide gas. The carbon dioxide gas becomes trapped in the polymer as it solidifies, and a foam is thus created. In some cases, the amount of water may be controlled to control the properties of the resulting foam, such as density or cell size, e.g., during the reaction process.

In addition, in some embodiments, a material may be deposited onto a substrate, e.g., to fill a mold, then the mold may be sealed and the blowing agent induced to form a foam, which may then start to fill in the mold as the foam expands.

In some embodiments, a 3D-printed article described herein comprises one or more additives. These additives can comprise particles, hollow glass spheres, polymer spheres, a pigment, a metal, a filler such as a thermally conductive filler, a filler having a relative dielectric constant of at least 5, an ultraviolet stabilizer, a filler concentrate, or another suitable additive. Additional examples of additives include surfactants (e.g., silicone surfactants), catalysts, nucleation promotors, fillers for better abrasion resistance, chemical foaming agents, etc. Combinations of these and/or other additives are also possible. As a non-limiting example, a 3D printed closed-cell foam may be produced that incorporates particulate additives comprising a cellular network of cell walls separating empty cells, where the cell walls comprise a polymer composite including filler particles dispersed in a polymer matrix.

As a non-limiting example, hollow glass spheres and/or polymer spheres may be incorporated into polyurethanes or other polymers as discussed herein to reduce density, increase stiffness, reduce dielectric constant, provide more nucleation sites for bubble formation, or the like. For instance, hollow spheres may be used to decrease weight. Hollow glass spheres can be varied, e.g., spatially, in order to change the properties of the product.

As described above, in certain embodiments a 3D-printed article (e.g., a 3D-printed articles that is a foam such as a closed-cell foam, a 3D-printed article that is not a foam, a 3D-printed article that comprises an elastomer) may comprise at least a first portion and a second portion that interpenetrate. In some embodiments, the first portion may form a skeleton-like structure that spans the second portion. For example, a 3D-printed article may comprise a first portion with a skeleton-like structure that is stiffer than a second portion in which it is embedded. This may be achieved in some cases by varying the stiffness of the material being extruded from a nozzle during a 3D-printing process.

In one aspect, a foam may be printed (e.g., via 3D-printing) into a structure defining a plurality of cells, i.e., into a foam-like structure. Thus, a foam may be printed as part of a larger foam-like structure, e.g., where the walls of the foam-like structure (e.g., defining cells of the foam-like structure themselves are foams having cells. The foam-like structure may have open cells, closed cells, or any combination of open and closed cells, independently of the structure of the foam itself forming the foam-like structure.

In some embodiments, one or more portions of a 3D-printed article as described herein (e.g., a 3D-printed articles that is a foam such as a closed-cell foam, a 3D-printed article that is not a foam, a 3D-printed article that comprises an elastomer) may be responsive to one or more stimuli. For example, the 3D-printed article may comprise a portion that changes shape after printing, such as a portion that is flat directly after printing but curves upwards upon removal from the substrate (e.g., a mold). As another example, the 3D-printed article may comprise a portion that can respond to temperature, such as a portion that can decrease ventilation of the article upon exposure to cold temperatures.

In some embodiments, one or more portions of a 3D-printed article as described herein (e.g., a 3D-printed articles that is a foam such as a closed-cell foam, a 3D-printed article that is not a foam, a 3D-printed article that comprises an elastomer) may comprise one or more cooling channels and/or may comprise one or more ventilation channels.

As described above, certain embodiments relate to methods for 3D printing a mixture onto a substrate. The substrate may be any suitable target for a material exiting a nozzle. In some cases, the substrate is planar, although in other cases, the substrate is non-planar (e.g., curved). For instance, the substrate may be a mold (e.g., the mold of a shoe), to which a material may be introduced. In some cases, the material may be relatively fluid and able to conform to contours within the substrate (e.g., if the substrate is a mold). In some such embodiments, the substrate may have one or more morphological features that are desirable for an external surface of the 3D-printed article (e.g., a desirable surface texture, a desirable curvature). However, in other cases, the material may be relatively solid, e.g., having a defined shape, upon deposition onto the substrate, such as is discussed herein.

In some cases, the substrate may also be heated or cooled, e.g., to promote or inhibit a reaction, to cause solidification to occur, or the like. In some cases, the temperature may be altered by at least 5° C., at least 10° C., or by other ranges such as those discussed herein. Any method may be used to heat or cool the substrate. For example, heat or cooling sources may be used to apply heat or cooling to the substrate, the substrate may be contained within a heated or cooled environment, or a source of a heated or cooled fluid may be used to heat or cool the substrate, e.g., via a heat exchanger). In one embodiment, radiant light or infrared radiation may be applied to the substrate for heating.

In some embodiments, heat may be applied to a substrate (e.g., a mold) after printing in order to cause expansion of the printed material. Expansion may include either or both of thermal expansion and expansion due to foam formation. In some embodiments, heating the substrate may cause expansion of printed material into previously unfilled portions of the substrate.

In one set of embodiments, the nozzle and/or the mixing chamber may be heated or cooled. In some cases, the temperature of mixing may be controlled, for instance, to allow for uniform mixing, to facilitate reaction of fluids therein (e.g., to an optimum or desired temperature), to remove excess heat (e.g., contributed by a chemical reaction, the spinning of an impeller, etc.), or the like. Various methods can be used to add heat or remove heat from the nozzle or the mixing chamber. For example, a heat source may be positioned to deliver heat to the nozzle or mixing chamber, or to one or more fluids entering therein. Examples of heat sources include electrically resistive heaters, infrared light sources, or heating fluids (e.g., which can transmit heat using a heat exchanger or the like). In some cases, more than one heat source may be used. Similarly, a variety of cooling sources can be used in some embodiments to remove heat from the nozzle or mixing chamber. Non-limiting examples include Peltier coolers or cooling fluids (e.g., which can remove heat using a heat exchanger or the like).

Heating and/or cooling may, for example, be used to control mixing and/or reaction within the material, to keep the temperature at substantially the temperature of the surrounding environment (e.g., at room temperature), to prevent the surrounding environmental conditions and/or the heat generated by friction of the impeller and exotherm of the material curing from affecting the reaction or the printing parameters, or the like. In some cases, the temperature may be altered by at least 5° C., at least 10° C., at least 15° C., at least 20° C., at least 30° C., at least 40° C., at least 50° C., at least 60° C., or by other ranges such as those discussed herein. In other embodiments, however, the temperature may be controlled or altered by no more than 20° C., no more than 15° C., no more than 10° C., no more than 5° C., etc. relative to the incoming fluids or the surrounding environmental conditions.

In addition, in some embodiments, one or more sensors may be present, e.g., within the nozzle or mixing chamber, within an outlet, within the substrate, or within sensing communication of the nozzle, mixing chamber, outlet, and/or substrate. Such sensors may be used to determine a property of the incoming fluids, the mixing process, and/or the exiting material, e.g., qualitatively and/or quantitatively. In some cases, such information may be used to control the process, e.g., by controlling the flow of fluid into the nozzle or mixing chamber, the mixing speed (e.g., of an impeller), the flow exiting an outlet, the opening and closing of a valve at the outlet, or the like. Non-limiting examples include temperature sensors (e.g., thermocouples, infrared cameras, or the like), pressure transducers, photodiodes, colorimetric sensors, flow meters, etc. In addition, more than one sensor can be used in some cases.

3D-printed articles for use in footwear may be suitable for use in any type of footwear. Non-limiting examples of footwear include athletic footwear, shoes, sneakers, tennis shoes, basketball shoes, sandals, shoes appropriate for work, boots, booties, footwear comprising a heel of at least one inch, footwear lacking a heel or comprising a heel of less than one inch, boots, booties, basketball shoes, hiking boots, dress shoes, orthotics, bunion orthotics, ski boots and ski boots. Footwear comprising a 3D-printed article as described herein may be appropriate for men, women, and/or children.

The following examples are intended to illustrate certain embodiments of the present invention, but do not exemplify the full scope of the invention.

EXAMPLE 1

Figure 18:
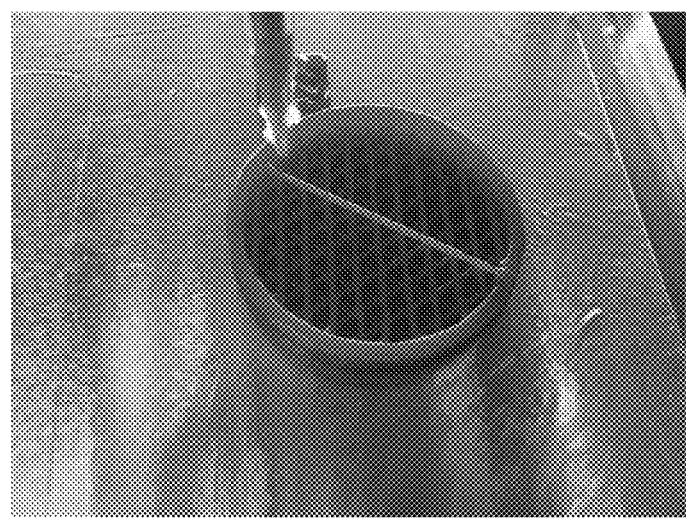
FIGS. 18-21 show several 3D-printed articles according to certain embodiments of the invention.
Figure 19:
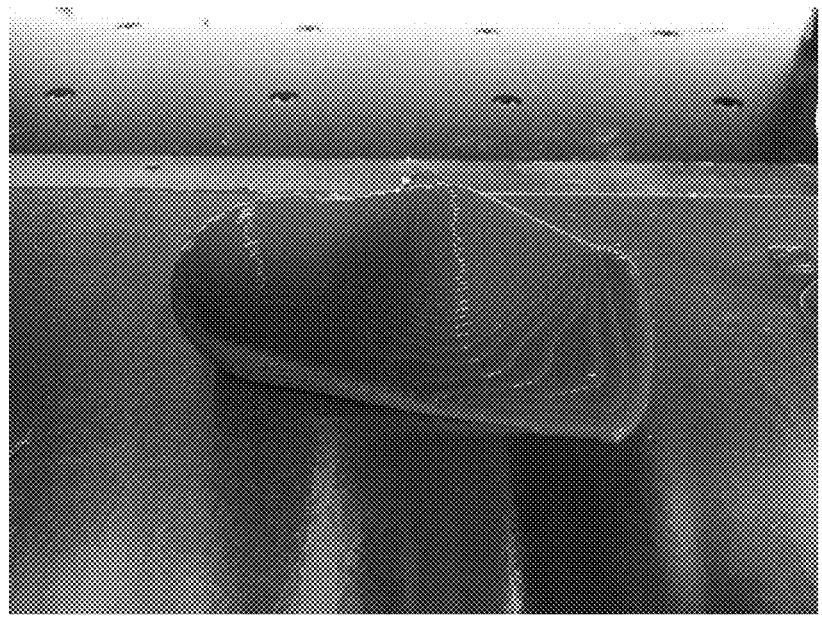
Figure 20:
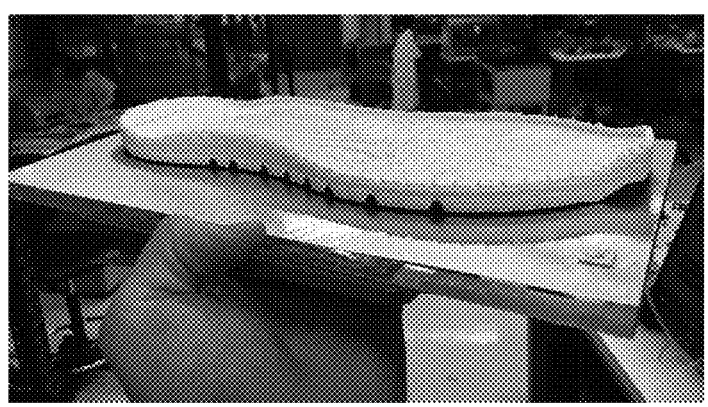
Figure 21:

Various 3D-printed articles were fabricated, and are shown in FIGS. 18-21. FIG. 18 shows a partially enclosed open cell foam, which is surrounded by a layer of continuous material on each of its sides except for its top. FIG. 19 shows a shoe insole printed with 50% infill density on the inside. The articles shown in FIGS. 18-19 were formed from two part polyurethane elastomers. FIGS. 20 and 21 show a 3D-printed article comprising a midsole and an outsole printed in one continuous process from the same mixing nozzle. The outsole comprises a rigid two part polyurethane, and the midsole comprises a two part waterblown polyurethane foam.

EXAMPLE 2

A prophetic non-limiting example for printing a shoe into a mold is described below. It should be understood that certain steps listed below may be optional even if not listed as such, and that certain inventive methods may further comprise additional steps that are not listed. The following steps may be followed to print a shoe into a mold:
1. Choose an external shoe sole shape based on shoe size and style
2. Select a mold (e.g., a premade mold) made of, e.g., metal or plastic. The mold may have shape and/or alignment features that to aid positioning of a gantry system relative to it.
3. Place the mold on a printer attached to a kinematic coupling or fixture.
4. Prepare machine commands to make the shoe (e.g., machine commands in Gcode)
5. Upload the machine commands to a machine. The code may cause translation of a nozzle in the x-, y-, and/or z-direction. In some cases, the code may cause the nozzle to conformally trace the shape of the mold.
6. Optionally print a color image onto the inside of the mould using an inkjet process, a transfer film process, or a different process. This image may then be picked up by and cured into the materials printed into the mold above the color image. The ink may be pigment coupled to a polyurethane and/or a latent curing agent such as a blocked isocyanate.
7. Conformally print an outsole material into the bottom and sides of the mold. This will be the most exterior portion of the shoe, and will be in direct contact with the ground. The material set used for this may be a polyester polyurethane elastomer with no porosity, a high density polyester polyurethane foam. Non-limiting examples of other options include thermoplastic polyurethanes, or vulcanized natural rubbers.
8. Print a material with high resilience that is stiff yet flexible conformally onto the mold to create one or more features that will be externally visible to the shoe sole. These features may be printed into an arch area of the mold.
9. Print a polyurethane foam into the mold in one or more locations. The foam density, foam rheology, foam expansion after deposition, and foam mechanical properties can be tuned spatially by varying the inputs and impeller parameters of the mixing nozzle as the foam is deposited. The printed structure could be a solid foam, or could have a lattice like architecture where the foam filaments have a macroscopic porous structure, but each filament also has a microscopic porous structure.
10. Print additional rigid and/or flexible materials onto the foam structure to give advanced customized structure and bending properties to the shoe.
11. Optionally, print more foam.
12. After all of the foam has been deposited, cap the mold, raise the temperature of the mold, and drive the foam to expand more. This process may push material firmly against the sides of the mold, may enhance the surface quality of the article, and/or may enhance the resolution of mold features.
13. Remove the top from mold and allow the mold to cool.
14. Print additional materials on top of the piece of the shoe sole that has conformed to the shape of the top of the mold. This process may enable customization of the contour of the sole that comes into direct contact with the foot. Printing the additional materials may comprise printing through a mixing nozzle. In some embodiments, the additional materials may rapidly solidify after extrusion.
15. Optionally, inkjet print a lower viscosity material. The lower viscosity material may bond well to the top of the sole and/or may enhance the smoothness of the sole.
16. Deposit an adhesive onto the printed surface
17. Translate a shoe upper attached to shoe last, and stamp it into the shoe sole and mold. Continue to apply pressure until the adhesive is fully bonded.
18. Use the upper on shoe last to demold the shoe.
19. Transfer the shoe to a 4th rotational axis, or have a stamping mechanism and last already be attached to 4th axis.
20. Scan the shoe using a 3D-scanning system.
21. Print specified patterns conformally on the upper and/or on parts of the shoe sole.
22. Print or fabricate shoe insole insert separately, and place it into the shoe.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When the word "about" is used herein in reference to a number, it should be understood that still another embodiment of the invention includes that number not modified by the presence of the word "about."

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method for designing a personalized 3D-printed article for use in footwear, comprising:
    acquiring information from a plurality of pressure sensors distributed within a first 3D-printed article;
    printing a second 3D-printed article having a gradient in a property based on said information.

2. The method of claim 1, wherein said printing of said second 3D printed article comprises providing said gradient by changing at least one property of a material being deposited as a function of time and/or position of a nozzle carrying out said depositing.

3. The method of claim 1, wherein said printing of said second 3D printed article comprises providing said gradient by changing at least one property of a material being deposited, as a function of printing time.

4. The method of claim 1, wherein said property having said gradient is one member of the group consisting of: average pore size, density, stiffness, stiffness of solid components of the article, Shore A hardness, degree of cross-linking, chemical composition, color, abrasion resistance, thermal conductivity, electrical conductivity, stiffness anisotropy, elastic modulus, flexural modulus, filler content, opacity, conductivity, and breathability.

5. The method of claim 1, comprising using said information to generate a recommendation for one or more properties of a second 3D-printed article.

6. The method of claim 1, comprising providing an alert to a user of one or more conclusions derived from said information.

7. The method of claim 3, wherein said alert relates to one member of the group comprising: footwear related aspects of the health and/or fitness of the user, wear and tear information relating to an article of footwear of which the 3D-printed article forms a part; and a recommendation for footwear designs or footwear component designs that may be suitable.

8. The method of claim 1, comprising carrying out together with said 3D printing, at least one non-3D-printing stage to form said second 3D printed article.

9. The method of claim 1, comprising applying to said second 3D printed article an inkjet process to deposit at least one layer of material onto a 3D-printed article.

10. The method of claim 9, wherein said inkjet printing process comprises applying two or more layers consecutively to increase the thickness of a surface finishing layer and/or to form a 3D structure on the surface of the 3D-printed article.

11. A method comprising 3D-printing an article having a gradient in a property between a first portion and a second portion, wherein the article is printed using a foam, said foam comprising a single integrated material.

12. The method of claim 11, wherein said printing of said second 3D printed article comprises providing said gradient by changing at least one property of a material being deposited as a function of time and/or position of a nozzle carrying out said depositing.

13. The method of claim 11, wherein said printing of said second 3D printed article comprises providing said gradient by changing at least one property of a material being deposited, as a function of printing time.

14. The method of claim 11, wherein said property having said gradient is one member of the group consisting of: average pore size, density, stiffness, stiffness of solid components of the article, Shore A hardness, degree of cross-linking, chemical composition, color, abrasion resistance, thermal conductivity, electrical conductivity, stiffness anisotropy, elastic modulus, flexural modulus, filler content, opacity, conductivity, and breathability.

15. The method of claim 12, wherein said changing of said property of said material being deposited is carried out by altering a mixture over time of at least two different materials prior to expelling said mixture via a printing nozzle.

16. The method of claim 15, wherein said altering over time comprises mixing said at least two different materials in a mixing chamber in variable proportions.

17. The method of claim 16, comprising carrying out said mixing in said mixing chamber using an impeller.

18. The method of claim 15, wherein one of said materials comprises an isocyanate group.

19. The method of claim 15, wherein of said materials comprises a dye.

* * * * *